(12) United States Patent
Kawauchi et al.

(10) Patent No.: US 8,045,945 B2
(45) Date of Patent: Oct. 25, 2011

(54) RECEPTION APPARATUS, RECEPTION METHOD AND PROGRAM

(75) Inventors: Hidetoshi Kawauchi, Kanagawa (JP); Tadaaki Yuba, Tokyo (JP); Toshiyuki Miyauchi, Kanagawa (JP); Takashi Yokokawa, Kanagawa (JP); Takuya Okamoto, Chiba (JP); Tamotsu Ikeda, Tokyo (JP); Koji Naniwada, Tokyo (JP); Kazuhiro Shimizu, Kanagawa (JP); Lachlan Bruce Michael, Saitama (JP)

(73) Assignee: Sony Corporation, Tokyo (JP)

( * ) Notice: Subject to any disclaimer, the term of this patent is extended or adjusted under 35 U.S.C. 154(b) by 435 days.

(21) Appl. No.: 12/393,093

(22) Filed: Feb. 26, 2009

(65) Prior Publication Data

US 2009/0221254 A1    Sep. 3, 2009

(30) Foreign Application Priority Data

Feb. 29, 2008   (JP) ................. P2008-049890
Sep. 26, 2008   (JP) ................. P2008-247909

(51) Int. Cl.
*H04B 1/10*    (2006.01)
(52) U.S. Cl. ............... 455/296; 455/63.1; 455/65

(58) Field of Classification Search .............. 455/296
See application file for complete search history.

(56) References Cited

U.S. PATENT DOCUMENTS

| 6,157,847 A * | 12/2000 | Buehrer et al. ............. 455/561 |
| 6,665,526 B2 * | 12/2003 | Tsuji et al. ................. 455/296 |
| 7,813,700 B2 * | 10/2010 | Zheng et al. ............... 455/63.1 |

FOREIGN PATENT DOCUMENTS

| JP | 2004 153831 | 5/2004 |
| JP | 2004 266814 | 9/2004 |
| JP | 2005 312027 | 11/2005 |
| JP | 2006 140987 | 6/2006 |
| JP | 2006 311385 | 11/2006 |
| JP | 2007 28293 | 2/2007 |
| JP | 2007 202081 | 8/2007 |
| JP | 2007 288450 | 11/2007 |
| JP | 2007 318479 | 12/2007 |
| JP | 2008 72225 | 3/2008 |
| WO | WO 2007/142091 | 12/2007 |

* cited by examiner

*Primary Examiner* — Hai L Nguyen
(74) *Attorney, Agent, or Firm* — Frommer Lawrence & Haug LLP; Willam S. Frommer

(57) ABSTRACT

A reception apparatus including an extraction section; a transmission line characteristic estimation section; an interpolation section; a compensation section; a detection section; and a selection section.

18 Claims, 34 Drawing Sheets

△ CENTER OF FILTER BAND

△ CENTER OF FILTER BAND

△ CENTER OF FILTER BAND

△ CENTER OF FILTER BAND

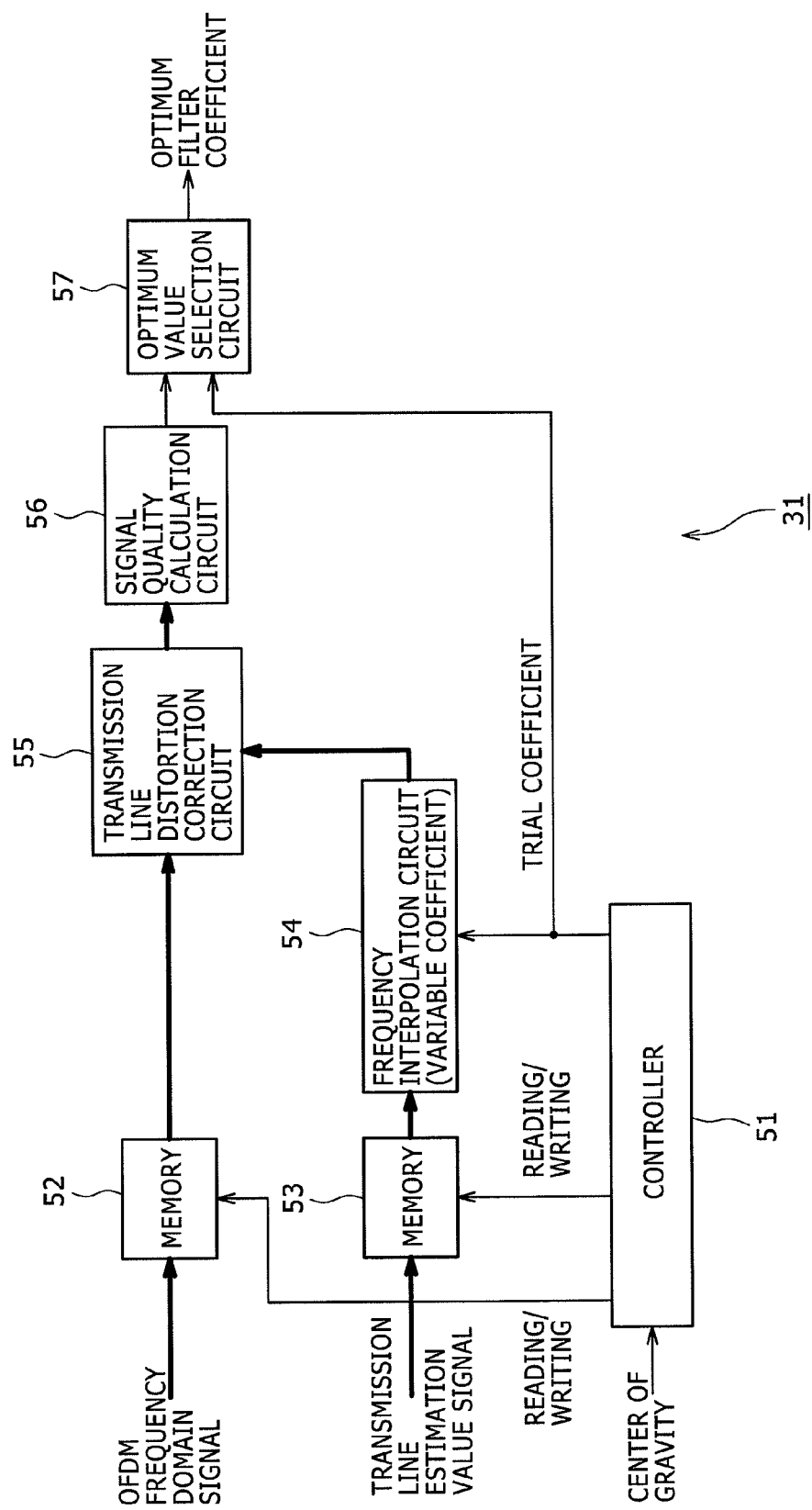

▲ POSITION OF CENTER OF GRAVITY

△ CENTER OF FILTER BAND

▲ POSITION OF CENTER OF GRAVITY

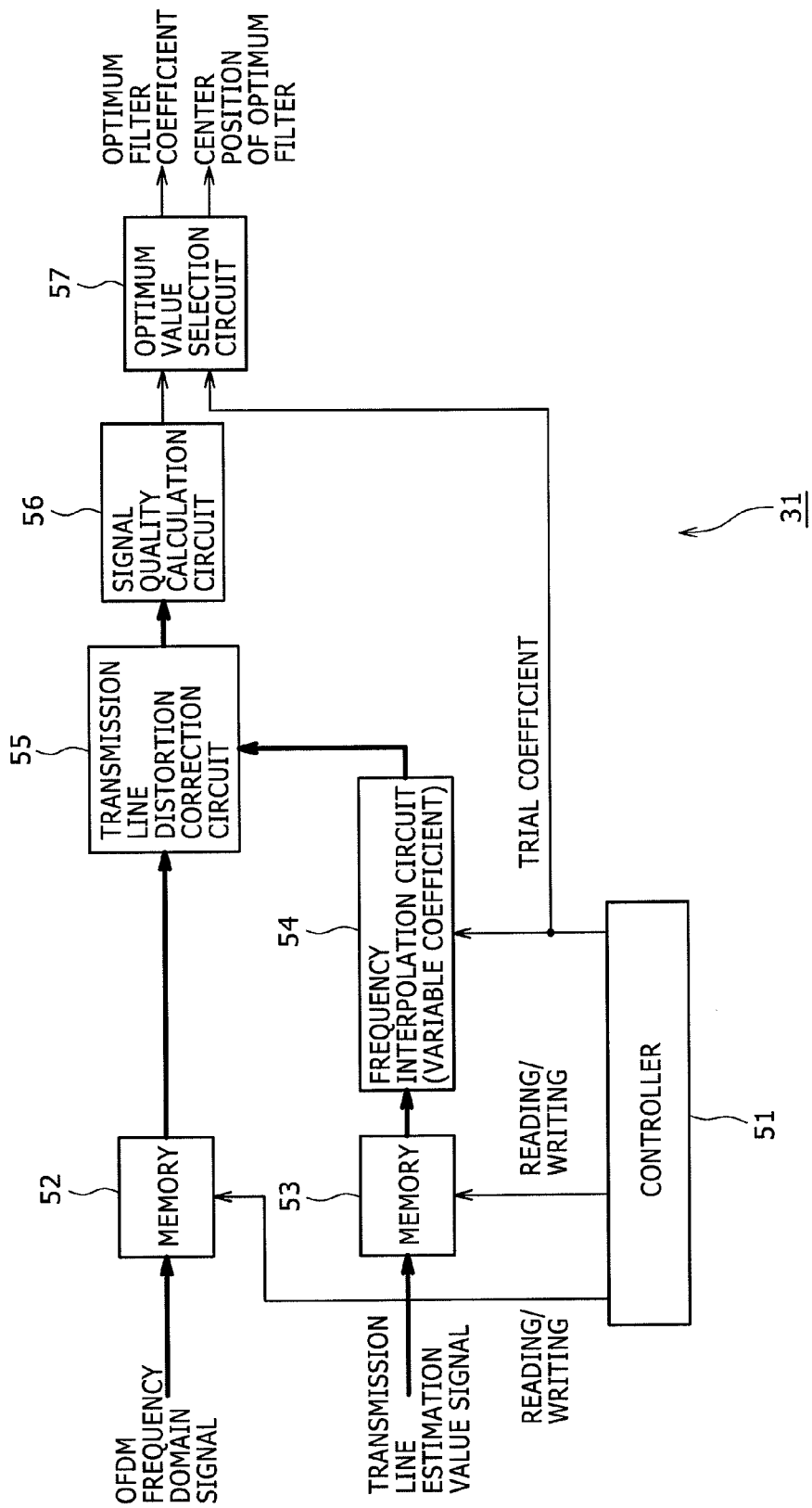

△ CENTER OF FILTER BAND FED BACK FROM OPTIMUM FILTER SELECTION CIRCUIT

△ CENTER OF FILTER BAND FED BACK FROM OPTIMUM FILTER SELECTION CIRCUIT

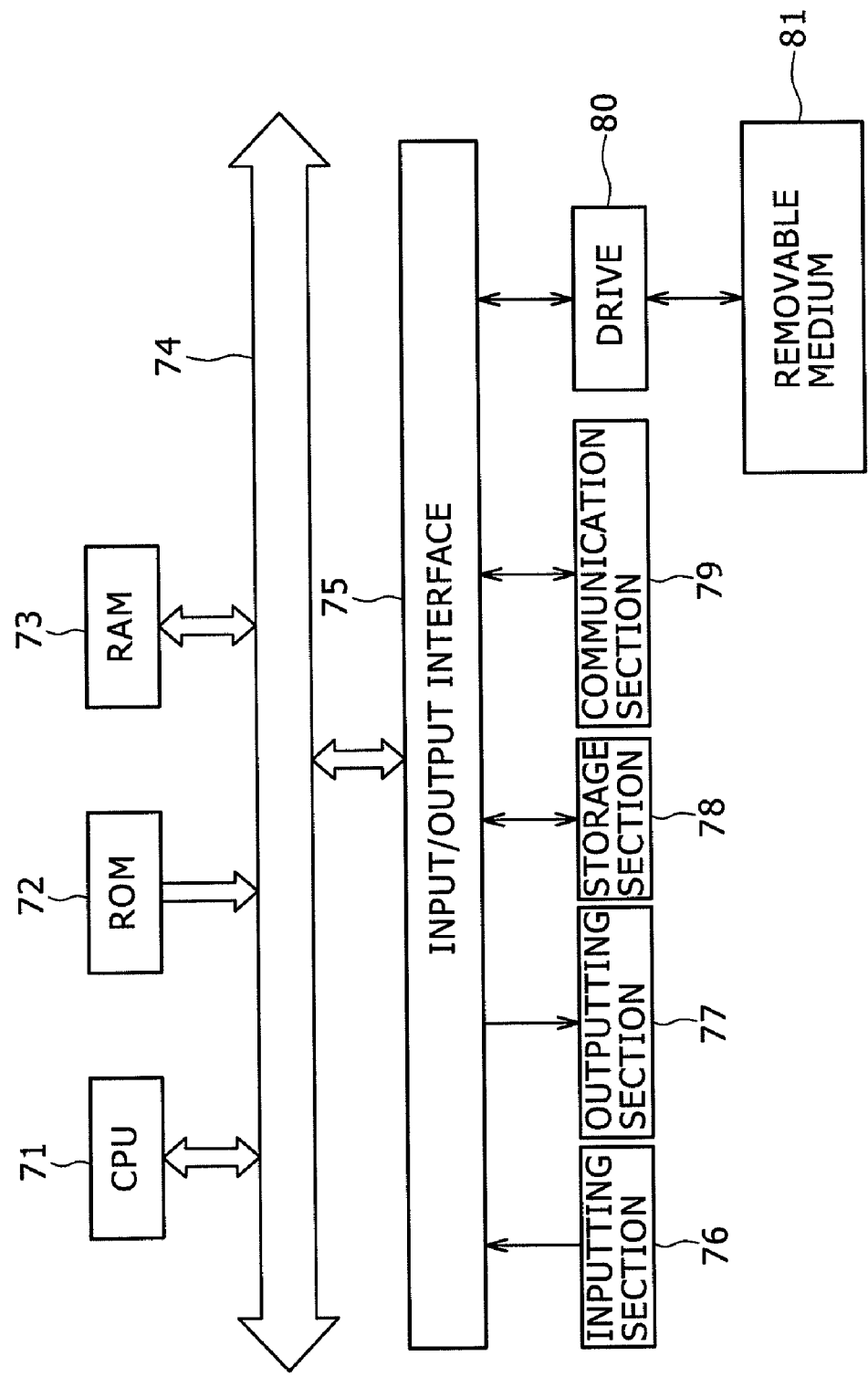

RECEPTION APPARATUS, RECEPTION METHOD AND PROGRAM

BACKGROUND OF THE INVENTION

1. Field of the Invention

This invention relates to a reception apparatus, a reception method and a program.

2. Description of the Related Art

As one of modulation methods for a ground wave digital broadcast, an orthogonal frequency division multiplexing (OFDM) method has been proposed wherein a large number of orthogonal carriers are used and modulated by phase shift keying (PSK) or quadrature amplitude modulation (QAM).

The OFDM method has a characteristic that, since an entire transmission band is divided by a large number of subcarriers, the bandwidth per one subcarrier is narrow and, although the transmission speed per one subcarrier is low, the total transmission speed is equal to that of existing modulation methods.

The OFDM has another characteristic that, since a large number of subcarriers are transmitted in parallel, the symbol rate is low. Therefore, the time length of multipaths relative to the time length of one symbol can be reduced. Consequently, the OFDM method has a further characteristic that the influence of multipaths can be reduced.

Further, the OFDM has a still further characteristic that, since data are allocated to a plurality of subcarriers, a transmission circuit can be configured using an Inverse Fast Fourier Transform (IFFT) mathematical operation circuit which carries out Inverse Fourier Transform upon modulation and a reception circuit can be configured using a Fast Fourier Transform (FFT) mathematical operation circuit which carries out Fourier transform upon demodulation.

From such characteristics as described above, the OFDM method is frequently applied to a ground wave digital broadcast which is influenced significantly by a multipath disturbance. As standards for a ground wave digital broadcast which adopt the OFDM method, for example, DVB-T (Digital Video Broadcasting-Terrestrial), ISDB-T (Integrated Services Digital Broadcasting-Terrestrial) and ISDB-TSB (Integrated Services Digital Broadcasting-Terrestrial for Sound Broadcasting) are available.

FIG. 1 illustrates an OFDM symbol.

According to the OFDM method, transmission of a signal is carried out in a unit called OFDM symbol.

Referring to FIG. 1, one OFDM symbol is composed of an effective symbol which has a signal interval for which IFFT is carried out upon transmission, and a guard interval in which a waveform of part of the effective symbol is copied. The guard interval is inserted into a position before the effective symbol on the time axis.

By insertion of the guard interval, the OFDM method can prevent interference between OFDM symbols which occurs in a multipath environment.

A plurality of such OFDM symbols are gathered to form one OFDM transmission frame. For example, according to the ISDB-T standards, one OFDM transmission frame is formed from 204 OFDM symbols. An insertion position of a pilot signal is determined with reference to a unit of an OFDM transmission frame.

An OFDM method wherein a QAM type modulation method is used as a modulation method for subcarriers is influenced by multipaths and so forth upon transmission. Consequently, for each subcarrier, the amplitude and the phase upon reception become different from those upon transmission. Therefore, it is necessary for the reception side to carry out equalization of a signal so that the amplitude and the phase of a reception signal may be same as those of a transmission signal.

In the OFDM method, the transmission side discretely inserts a pilot signal of a predetermined amplitude and a predetermined phase into transmission symbols. The reception side determines a frequency characteristic of a transmission line based on the amplitude and the phase of the pilot signal and equalizes the reception signal based on the determined characteristic of the transmission line.

The pilot signal used for calculation of a transmission line characteristic in this manner is referred to as scattered pilot signal (hereinafter referred to as SP signal). FIG. 2 illustrates an arrangement pattern of the SP signal in OFDM symbols adopted by the DVB-T standards or the ISDB-T standards.

FIG. 3 is a block diagram showing an example of a configuration of an existing OFDM receiver.

Referring to FIG. 3, the OFDM receiver 100 shown includes a reception antenna 1, a tuner 2, an analog/digital (A/D) conversion circuit 3, an orthogonal demodulation circuit 4, a carrier production circuit 5, an FFT circuit 6, and an FFT interval control circuit 7. The OFDM receiver 100 further includes a transmission line distortion compensation circuit 8, an error correction circuit 9, a delay profile estimation circuit 10 and a frequency interpolation filter selection circuit 11.

The tuner 2 frequency converts an RF signal received by the reception antenna 1 into an IF signal and outputs the IF signal to the A/D conversion circuit 3.

The A/D conversion circuit 3 carries out A/D conversion for the IF signal supplied thereto from the tuner 2 and outputs a resulting digital IF signal to the orthogonal demodulation circuit 4.

The orthogonal demodulation circuit 4 carries out orthogonal demodulation using a carrier supplied thereto from the carrier production circuit 5 to acquire an OFDM signal of a base band from the IF signal supplied from the A/D conversion circuit 3, and outputs the acquired OFDM signal. The base band OFDM signal is a signal in the time domain before FFT mathematical operation is carried out.

In the following description, the OFDM signal of the base band before FFT mathematical operation is carried out is referred to as OFDM time domain signal. The OFDM time domain signal is a complex signal including a real axis component (I channel signal) and an imaginary axis component (Q channel signal) as a result of orthogonal demodulation. The OFDM time domain signal outputted from the orthogonal demodulation circuit 4 is supplied to the carrier production circuit 5, FFT circuit 6, FFT interval control circuit 7 and delay profile estimation circuit 10.

The carrier production circuit 5 produces a carrier of a predetermined frequency synchronized with the reception signal based on the OFDM time domain signal supplied from the orthogonal demodulation circuit 4 and outputs the produced carrier to the orthogonal demodulation circuit 4.

The FFT circuit 6 removes a signal within a range of the guard interval from a signal of one OFDM symbol based on an FFT trigger pulse supplied thereto from the FFT interval control circuit 7 to extract a signal within the range of the effective symbol length.

Further, the FFT circuit 6 carries out FFT mathematical operation for the extracted OFDM time domain signal to extract data orthogonally modulated in subcarriers. In particular, the start position of the FFT mathematical operation by the FFT circuit 6 is a position within a range from a position A in FIG. 1 which is the boundary of the OFDM symbol to another position B which is the boundary position between the guard interval and the effective symbol. The FFT mathematical operation range is called FFT interval, and the start position of the FFT interval is designated by the FFT trigger pulse supplied from the FFT interval control circuit 7.

The FFT circuit 6 outputs the OFDM signal representative of the extracted data. The OFDM signal is a signal in the frequency domain after the FFT mathematical operation is carried out. An OFDM signal after FFT mathematical operation is hereinafter referred to as OFDM frequency domain signal. The OFDM frequency domain signal outputted from the FFT circuit 6 is supplied to an SP extraction circuit 8-1 and a division circuit 8-4 of the transmission line distortion compensation circuit 8.

The FFT interval control circuit 7 determines an FFT interval based on the OFDM time domain signal supplied from the orthogonal demodulation circuit 4 and a delay profile estimated by the delay profile estimation circuit 10. Then, the FFT interval control circuit 7 outputs an FFT trigger pulse which designates the start position of the determined FFT interval to the FFT circuit 6.

The transmission line distortion compensation circuit 8 includes an SP extraction circuit 8-1, a time direction transmission line characteristic estimation circuit 8-2, a frequency interpolation circuit 8-3 and a division circuit 8-4.

The SP extraction circuit 8-1 extracts an SP signal from the OFDM frequency domain signal supplied thereto from the FFT circuit 6 and removes a modulation component of the SP signal to estimate a transmission characteristic of a subcarrier at the arrangement position of the SP signal. The SP extraction circuit 8-1 outputs a signal representative of the estimated transmission line characteristic to the time direction transmission line characteristic estimation circuit 8-2.

The time direction transmission line characteristic estimation circuit 8-2 estimates a transmission characteristic of the subcarrier, at which the SP signal is arranged, at the position of each of the OFDM symbols juxtaposed in the time direction, that is, in the OFDM symbol direction, based on the transmission characteristic estimated by the SP extraction circuit 8-1. In FIG. 2, the vertical direction is the time direction, and the horizontal direction is the frequency direction.

For example, the time direction transmission line characteristic estimation circuit 8-2 uses a transmission line characteristic at the position of an SP signal $SP_1$ and another transmission line characteristic at the position of another SP signal $SP_2$ of FIG. 2 estimated by the SP extraction circuit 8-1 to estimate a transmission line characteristic of a subcarrier at the position of a different symbol in a region $A_1$ of FIG. 2.

Since an SP signal is inserted for every 12 subcarriers at the same time point as seen in FIG. 2, the time direction transmission line characteristic estimation circuit 8-2 estimates a transmission line characteristic of a subcarrier at the position of an OFDM symbol for every three subcarriers. The time direction transmission line characteristic estimation circuit 8-2 outputs a signal representative of the estimated transmission line characteristic for every three subcarriers. The signal outputted from the time direction transmission line characteristic estimation circuit 8-2 is supplied to the frequency interpolation circuit 8-3 and the delay profile estimation circuit 10.

The frequency interpolation circuit 8-3 carries out an interpolation process for interpolating a transmission characteristic in the frequency direction to estimate a transmission characteristic of the subcarrier at the position of each OFDM symbol in the frequency direction from the transmission line characteristics for every three subcarriers supplied from the time direction transmission line characteristic estimation circuit 8-2. The frequency interpolation circuit 8-3 includes a plurality of interpolation filters having different filter bands and carries out an interpolation process using the interpolation filters.

For example, the frequency interpolation circuit 8-3 estimates the transmission characteristic of a subcarrier at the position of an OFDM symbol for which estimation of the transmission characteristic is not carried out as yet from among the positions of OFDM symbols included in a region $A_2$ of FIG. 2. The estimation of the transmission characteristic is carried out using transmission characteristics estimated already by the SP extraction circuit 8-1 and the time direction transmission line characteristic estimation circuit 8-2.

As a result, the transmission line characteristics of all subcarriers at the positions of the OFDM symbols are estimated. The frequency interpolation circuit 8-3 outputs a signal obtained by execution of the interpolation process using the interpolation filter of the filter band designated by the filter selection signal supplied from the frequency interpolation filter selection circuit 11 as a signal representative of an estimation result of the transmission line characteristic to the division circuit 8-4.

The division circuit 8-4 divides a component of the signal representative of the transmission characteristics of all subcarriers supplied from the frequency interpolation circuit 8-3 from the OFDM frequency domain signal supplied from the FFT circuit 6 to remove a component of distortion by the transmission line from the OFDM frequency domain signal. The division circuit 8-4 outputs the OFDM frequency domain signal from which the distortion component is removed to the error correction circuit 9.

The error correction circuit 9 carries out a deinterleave process for a signal interleaved by the transmission side and further carries out such processes as depuncture, Viterbi decoding, spread signal removal and RS (Reed Solomon) decoding. The error correction circuit 9 outputs data obtained by the processes as decoded data to a circuit at a succeeding stage.

The delay profile estimation circuit 10 determines the time response characteristic of the transmission line to estimate a delay profile of the transmission line. For example, the delay profile estimation circuit 10 carries out IFFT for the transmission line characteristic estimated by the time direction transmission line characteristic estimation circuit 8-2 to estimate a delay profile. The transmission line characteristic estimated by the time direction transmission line characteristic estimation circuit 8-2 is a frequency characteristic, and a time response characteristic obtained by carrying out IFFT for the transmission line characteristic is a delay profile.

A signal representative of the delay profile estimated by the delay profile estimation circuit 10 is supplied to the FFT interval control circuit 7 and the frequency interpolation filter selection circuit 11. It is to be noted that, as a method for the delay profile estimation, also a method of utilizing a matched filter (MF) whose tap coefficient is the guard interval period to estimate a delay profile from an OFDM time domain signal is known.

The frequency interpolation filter selection circuit 11 determines a delay spread based on the delay profile, that is, the position of a path on the time axis, estimated by the delay profile estimation circuit 10, and selects a filter band corresponding to the delay spread from among filter bands of the interpolation filters provided for the frequency interpolation circuit 8-3. The frequency interpolation filter selection circuit 11 outputs a filter selection signal which designates the selected filter band to the frequency interpolation circuit 8-3.

FIG. 4 shows an example of a configuration of the frequency interpolation circuit 8-3.

Referring to FIG. 4, the frequency interpolation circuit 8-3 includes frequency interpolation filter circuits 8-3$a_0$ to 8-3$a_{N-1}$ and a selector circuit 8-3b. A signal representative of the transmission characteristic for every three subcarriers outputted from the time direction transmission line characteristic estimation circuit 8-2 is inputted to a corresponding one of the 8-3$a_0$ to 8-3$a_{N-1}$, and a filter selection signal outputted from the frequency interpolation filter selection circuit 11 is inputted to the selector circuit 8-3b.

The frequency interpolation filter circuits 8-3$a_0$ to 8-3$a_{N-1}$ carry out an interpolation process using the interpolation filters provided thereto and output signals representative of a result of the interpolation to the selector circuit 8-3b. In the example of FIG. 4, the frequency interpolation filter circuit 8-3$a_0$ carries out an interpolation process using the interpolation filter for the filter band BW0, and the frequency interpolation filter circuit 8-3$a_1$ carries out an interpolation process using the interpolation filter for the filter band BW1. The frequency interpolation filter circuit 8-3$a_{N-1}$ carries out an interpolation process using the interpolation filter for the filter band BW(N-1). FIG. 5 illustrates the filter bands BW0 to BW3 on the time axis.

In the example of FIG. 5, the filter band BW0 has the greatest bandwidth and the filter band BW3 has the smallest bandwidth. The position of an upwardly directed void triangle represents the position of the center of the filter band. The interpolation process is carried out such that the center position of the filter band becomes same as the center position of the delay spread.

The selector circuit 8-3b selects a signal obtained by carrying out the interpolation process using the interpolation filter of the filter band designated by the filter selection signal from among the signals supplied from the frequency interpolation filter circuits 8-3$a_0$ to 8-3$a_{N-1}$ and outputs the selected signal to the division circuit 8-4.

Japanese Patent Laid-Open No. 2006-311385 discloses a technique for detecting the quality of a signal after equalization and controlling an optimum filter coefficient from among a plurality of filter coefficients in response to the detected quality.

SUMMARY OF THE INVENTION

As described above, an estimated delay profile is used for selection of a filter band by the frequency interpolation filter selection circuit 11.

Accordingly, in a multipath environment which include a path which may not be detected because a detection limit is exceeded, a filter band is sometimes selected in error. Since distortion of the transmission line may not be compensated for sufficiently, this makes a cause of deterioration of the reception performance.

FIG. 6 illustrates an example of a delay profile provided in a three-wave environment. In FIG. 6, the axis of abscissa is the time axis, and the axis of ordinate indicates the power of a path.

In the example of FIG. 6, three paths of a path P, another path Q and a further path R. Among the paths, merely the path P and the path Q can be detected, but the path R may not be detected by the delay profile estimation circuit 10 because the power thereof is low.

In this instance, since merely the path P and the path Q are detected paths, although the delay spread actually exists by an extent corresponding to the distance between the path P and the path R, it is decided that it exists merely by an amount corresponding to the distance between the path P and the path Q and a filter band is selected based on the decision.

In the example of FIG. 6, the filter band BW3 having a filter band which can accommodate the path P and the path Q when the center position of the path P and the path Q and the center position of the filter band are set to the same position is selected. The quality of the OFDM frequency domain signal after transmission line distortion compensation obtained finally is inferior to the quality of the OFDM frequency domain signal obtained by interpolating the transmission line characteristic using an interpolation filter having a filter band which can accommodate also the path R and carrying out compensation for the transmission line distortion.

If a filter band of a great bandwidth like the filter band BW0 of FIG. 5 is typically selected, then interpolation can be carried out in such a form as to include also a path which may not be detected. However, noise of power lower than that of the path R of FIG. 6 is included much in the filter band, and interpolation is carried out in this state. Therefore, the filter band preferably is a band which includes all paths but has a width as near to the width of the delay spread as possible.

Thus, it is desirable to provide a reception apparatus, a reception method and a program which can prevent deterioration of the reception performance.

According to an embodiment of the present invention, there is provided a reception apparatus including extraction means for extracting a pilot signal from an OFDM frequency domain signal, transmission line characteristic estimation means for estimating a transmission line characteristic in a time direction based on the pilot signal extracted by the extraction means, interpolation means for carrying out an interpolation process of interpolating a transmission line characteristic in a frequency direction based on the transmission line characteristic in the time direction estimated by the transmission line characteristic estimation means using a plurality of interpolation filters having different filter bands from each other to produce a plurality of signals representative of transmission line characteristics of all subcarriers, compensation means for producing a plurality of transmission line distortion compensated signals, from which components of distortion of the corresponding transmission lines are removed, based on the OFDM frequency domain signal and the signals representative of the transmission line characteristics of all subcarriers produced by the interpolation means, detection means for detecting the quality of the transmission line distortion compensated signals produced by the compensation means, and selection means for selecting one of the transmission line distortion compensated signals produced by the compensation means based on a result of the detection by the detection means.

The selection means may select that one of the transmission line distortion compensated signals produced by the compensation means which has the best quality.

The interpolation means may include first interpolation means for carrying out the interpolation process using an interpolation filter of a first filter band, and second interpolation means for carrying out the interpolation process using an interpolation filter of a second filter band, and the compensation means may include first compensation means for producing a transmission line distortion compensated signal based on the OFDM frequency domain signal and a signal produced by the first interpolation means, and second compensation means for producing a transmission line distortion compensated signal based on the OFDM frequency domain signal and a signal produced by the second interpolation means.

The reception apparatus may further includes control means for controlling the filter band of the interpolation filter to be used by the interpolation means so as to change the filter band of the interpolation filters used by the interpolation means for production of signals representative of the transmission line characteristics of all subcarriers based on which the transmission line distortion compensated signals which are not selected by the selection means are produced.

According to another embodiment of the present invention, there is provided a reception method or a program for causing a computer to execute a process, including the steps of extracting a pilot signal from an OFDM frequency domain signal, estimating a transmission line characteristic in a time direction based on the extracted pilot signal, carrying out an interpolation process of interpolating a transmission line characteristic in a frequency direction based on the estimated transmission line characteristic in the time direction using a plurality of interpolation filters having different filter bands from each other to produce a plurality of signals representative of transmission line characteristics of all subcarriers, producing a plurality of transmission line distortion compensated signals, from which components of distortion of the corresponding transmission lines are removed, based on the OFDM frequency domain signal and the produced signals representative of the transmission line characteristics of all subcarriers, detecting the quality of the produced transmission line distortion compensated signals, and selecting one of the transmission line distortion compensated signals based on a result of the detection of the quality of the transmission line distortion compensated signals.

According to a further embodiment of the present invention, there is provided a reception apparatus including FFT mathematical operation means for carrying out FFT mathematical operation for an OFDM time domain signal, pilot signal extraction means for extracting pilot signals from an OFDM frequency domain signal obtained by carrying out the FFT mathematical operation by the FFT mathematical operation means, estimation means for estimating a characteristic of a transmission line corresponding to each of the pilot signals and interpolating the characteristic of the transmission line in a time direction to determine transmission line characteristics for every predetermined subcarriers, control means for controlling the width and the center position of the passband of an interpolation filter to be used for a frequency interpolation process of filtering the transmission line characteristics for every predetermined subcarriers to interpolate the transmission line characteristics in a frequency direction, interpolation means for carrying out a process of carrying out the frequency interpolation process using the interpolation filter to determine transmission line characteristics of all subcarriers while varying the width and the center position of the passband of the interpolation filter under the control of the control means with regard to the transmission line characteristics for every predetermined subcarriers determined from the OFDM frequency domain signals representative of the same symbol, distortion correction means for correcting distortion of the OFDM frequency domain signals representative of the same symbol using the transmission line characteristics of all subcarriers determined by the interpolation means, calculation means for calculating the quality of the OFDM frequency domain signals whose distortion is corrected, selection means for selecting, based on the qualities calculated by the calculation means, an interpolation filter which is used to obtain that one of the OFDM frequency domain signals after the distortion correction which exhibits the best quality, variable coefficient interpolation means for carrying out the frequency interpolation process for the transmission line characteristics for every predetermined subcarriers determined by the estimation means using an interpolation filter having the same characteristic as that of the interpolation filter selected by the selection means with regard to the width and the center position of the passband to determine the transmission line characteristics of all subcarriers, and equalization means for correcting distortion of the OFDM frequency domain signals using the transmission line characteristics of all subcarriers determined by the variable coefficient interpolation means to carry out equalization.

The interpolation means may carry out the frequency interpolation processes concurrently using interpolation filters which are different in the width and the center position of the passband from each other.

The control means may change the center position of the passband of the interpolation filter within a range which is centered at a predetermined position between a path along which a signal arrives earliest and another path along which the signal arrives latest from among paths which form a delay profile and extends by an amount equal to one half a width of the passband of the interpolation filter in the opposite directions from the center.

According to a still further embodiment of the present invention, there is provided a reception method or a program for causing a computer to execute a process, including the steps of carrying out FFT mathematical operation for an OFDM time domain signal, extracting pilot signals from an OFDM frequency domain signal obtained by carrying out the FFT mathematical operation, estimating a characteristic of a transmission line corresponding to each of the pilot signals and interpolating the characteristic of the transmission line in a time direction to determine transmission line characteristics for every predetermined subcarriers, controlling the width and the center position of the passband of an interpolation filter to be used for a frequency interpolation process of filtering the transmission line characteristics for every predetermined subcarriers to interpolate the transmission line characteristics in a frequency direction, carrying out a process of carrying out the frequency interpolation process using the interpolation filter to determine transmission line characteristics of all subcarriers while varying the width and the center position of the passband of the interpolation filter with regard to the transmission line characteristics for every predetermined subcarriers determined from the OFDM frequency domain signals representative of the same symbol, correcting distortion of the OFDM frequency domain signals representative of the same symbol using the transmission line characteristics of all subcarriers, calculating the quality of the OFDM frequency domain signals whose distortion is corrected, selecting, based on the calculated qualities, an interpolation filter used to obtain that one of the OFDM frequency domain signals after the distortion correction which exhibits the best quality, carrying out the frequency interpolation process for the transmission line characteristics for every predetermined subcarriers using an interpolation filter having the same characteristic as that of the selected interpolation filter with regard to the width and the center position of the passband to determine the transmission line characteristics of all subcarriers, and correcting distortion of the OFDM frequency domain signals using the determined transmission line characteristics of all subcarriers to carry out equalization.

According to a yet further embodiment of the present invention, there is provided a reception apparatus including FFT mathematical operation means for carrying out FFT mathematical operation for an OFDM time domain signal, pilot signal extraction means for extracting pilot signals from the OFDM frequency domain signal obtained by the FFT mathematical operation carried out by the FFT mathematical operation means, estimation means for estimating a characteristic of a transmission line corresponding to each of the pilot signals to interpolate the characteristic to determine transmission line characteristics for every predetermined subcarriers, control means for controlling the center position of the passband of an interpolation filter to be used for a frequency interpolation process of filtering the transmission line characteristics for every predetermined subcarriers to interpolate the transmission line characteristics in a frequency direction, interpolation means for carrying out a process of carrying out the frequency interpolation process using the interpolation filter to determine transmission line characteristics of all subcarriers while varying the center position of the passband of the interpolation filter under the control of the control means with regard to the transmission line characteristics for every predetermined subcarriers determined from the OFDM frequency domain signals representative of the same symbol, distortion correction means for correcting distortion of the OFDM frequency domain signals representative of the same symbol using the transmission line characteristics of all subcarriers determined by the interpolation means, calculation means for calculating the quality of the OFDM frequency domain signals whose distortion is corrected, selection means for selecting, based on the qualities calculated by the calculation means, an interpolation filter which is used to obtain that one of the OFDM frequency domain signals after the distortion correction which exhibits the best quality, and delay profile estimation means for determining a delay profile formed from paths included in a predetermined frequency band centered at a position same as the center position of the passband of the interpolation filter selected by the selection means from among paths in a frequency region obtained by applying IFFT to data representing the transmission line characteristics for every predetermined subcarriers estimated by the estimation means.

The width of the predetermined frequency band may be equal to the width of the passband of the interpolation filter.

According to a yet further embodiment of the present invention, there is provided a reception method or a program for causing a computer to execute a process, including the steps of carrying out FFT mathematical operation for an OFDM time domain signal, extracting pilot signals from the OFDM frequency domain signal obtained by carrying out the FFT mathematical operation, estimating a characteristic of a transmission line corresponding to each of the pilot signals to interpolate the characteristic to determine transmission line characteristics for every predetermined subcarriers, controlling the center position of the passband of an interpolation filter to be used for a frequency interpolation process of filtering the transmission line characteristics for every predetermined subcarriers to interpolate the transmission line characteristics in a frequency direction, carrying out a process of carrying out the frequency interpolation process using the interpolation filter to determine transmission line characteristics of all subcarriers while varying the center position of the passband of the interpolation filter with regard to the transmission line characteristics for every predetermined subcarriers determined from the OFDM frequency domain signals representative of the same symbol, correcting distortion of the OFDM frequency domain signals representative of the same symbol using the determined transmission line characteristics of all subcarriers, calculating the quality of the OFDM frequency domain signals whose distortion is corrected, selecting, based on the calculated qualities, an interpolation filter used to obtain that one of the OFDM frequency domain signals after the distortion correction which exhibits the best quality, and determining a delay profile formed from paths included in a predetermined frequency band centered at a position same as the center position of the passband of the selected interpolation filter from among paths in a frequency region obtained by applying IFFT to data representing the estimated transmission line characteristics for every predetermined subcarriers.

In the reception apparatus, reception method and program, a pilot signal is extracted from an OFDM frequency domain signal, and a transmission line characteristic in a time direction is estimated based on the extracted pilot signal. Then, an interpolation process of interpolating a transmission line characteristic in a frequency direction is carried out based on the estimated transmission line characteristic in the time direction using a plurality of interpolation filters having different filter bands from each other to produce a plurality of signals representative of transmission line characteristics of all subcarriers. Further, a plurality of transmission line distortion compensated signals, from which components of distortion of the corresponding transmission lines are removed, are produced based on the OFDM frequency domain signal and the produced signals representative of the transmission line characteristics of all subcarriers. Thereafter, the quality of the produced transmission line distortion compensated signals is detected, and one of the transmission line distortion compensated signals is selected based on a result of the detection of the quality of the transmission line distortion compensated signals.

In the reception apparatus, reception method and program, FFT mathematical operation is carried out for an OFDM time domain signal, and pilot signals are extracted from an OFDM frequency domain signal obtained by carrying out the FFT mathematical operation. Then, a characteristic of a transmission line corresponding to each of the pilot signals and the characteristic of the transmission line is interpolated in a time direction to determine transmission line characteristics for every predetermined subcarriers. Thereafter, the width and the center position of the passband of an interpolation filter to be used for a frequency interpolation process of filtering the transmission line characteristics for every predetermined subcarriers to interpolate the transmission line characteristics in a frequency direction. Then, a process of carrying out the frequency interpolation process using the interpolation filter to determine transmission line characteristics of all subcarriers is carried out while the width and the center position of the passband of the interpolation filter are varied with regard to the transmission line characteristics for every predetermined subcarriers determined from the OFDM frequency domain signals representative of the same symbol. Further, distortion of the OFDM frequency domain signals representative of the same symbol is corrected using the transmission line characteristics of all subcarriers, and the quality of the OFDM frequency domain signals whose distortion is corrected is calculated. Then, based on the calculated qualities, an interpolation filter used to obtain that one of the OFDM frequency domain signals after the distortion correction which exhibits the best quality is selected. Further, the frequency interpolation process is carried out for the transmission line characteristics for every predetermined subcarriers using an interpolation filter having the same characteristic as that of the selected interpolation filter with regard to the width and the center position of the passband to determine the transmission line characteristics of all subcarriers. Then, distortion of the OFDM frequency domain signals is corrected using the determined transmission line characteristics of all subcarriers to carry out equalization.

In the reception apparatus, reception method and program, FFT mathematical operation for an OFDM time domain signal is carried out, and pilot signals are extracted from the OFDM frequency domain signal obtained by carrying out the FFT mathematical operation. Then, a characteristic of a transmission line corresponding to each of the pilot signals is estimated to interpolate the characteristic to determine transmission line characteristics for every predetermined subcarriers. Then, the center position of the passband of an interpolation filter to be used for a frequency interpolation process of filtering the transmission line characteristics for every predetermined subcarriers to interpolate the transmission line characteristics in a frequency direction are controlled. Then, a process of carrying out the frequency interpolation process is carried out using the interpolation filter to determine transmission line characteristics of all subcarriers while the center position of the passband of the interpolation filter is varied with regard to the transmission line characteristics for every predetermined subcarriers determined from the OFDM frequency domain signals representative of the same symbol. Then, distortion of the OFDM frequency domain signals representative of the same symbol corrected using the determined transmission line characteristics of all subcarriers, and the quality of the OFDM frequency domain signals whose distortion is corrected is calculated. Then, based on the calculated qualities, an interpolation filter used to obtain that one of the OFDM frequency domain signals after the distortion correction which exhibits the best quality is selected. Then, a delay profile formed from paths included in a predetermined frequency band centered at a position same as the center position of the passband of the selected interpolation filter from among paths in a frequency region obtained by applying IFFT to data representing the estimated transmission line characteristics for every predetermined subcarriers is determined.

With the reception apparatus, reception methods and programs, deterioration of the reception performance can be prevented.

The above and other aims, features and advantages of the embodiment of the present invention will become apparent from the following description and the appended claims, taken in conjunction with the accompanying drawings in which like parts or elements denoted by like reference symbols.

BRIEF DESCRIPTION OF THE DRAWINGS

FIG. 29 is a block diagram showing an example of a configuration of an optimum filter coefficient selection circuit shown in FIG. 28;

FIG. 32 is a block diagram showing an example of a configuration of an optimum filter coefficient selection circuit shown in FIG. 31;

FIG. 34 is a block diagram showing an example of a configuration of a personal computer.

DETAILED DESCRIPTION OF THE PREFERRED EMBODIMENTS

First Embodiment

Figure 7:
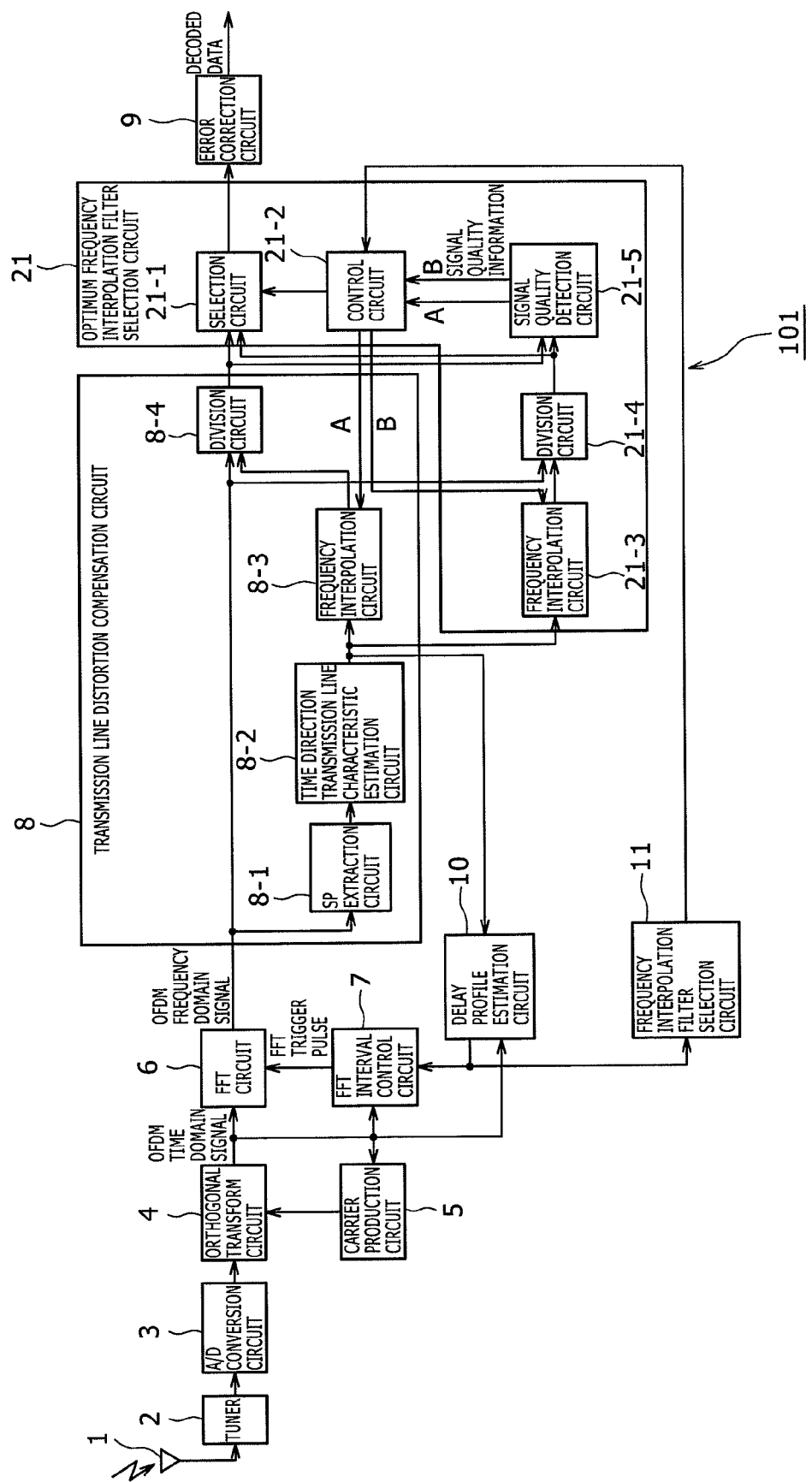
FIG. 7 is a block diagram showing an example of a configuration of an OFDM receiver according to a first embodiment of the present invention.

FIG. 7 shows an example of a configuration of an OFDM receiver according to an embodiment of the present invention.

Figure 3:
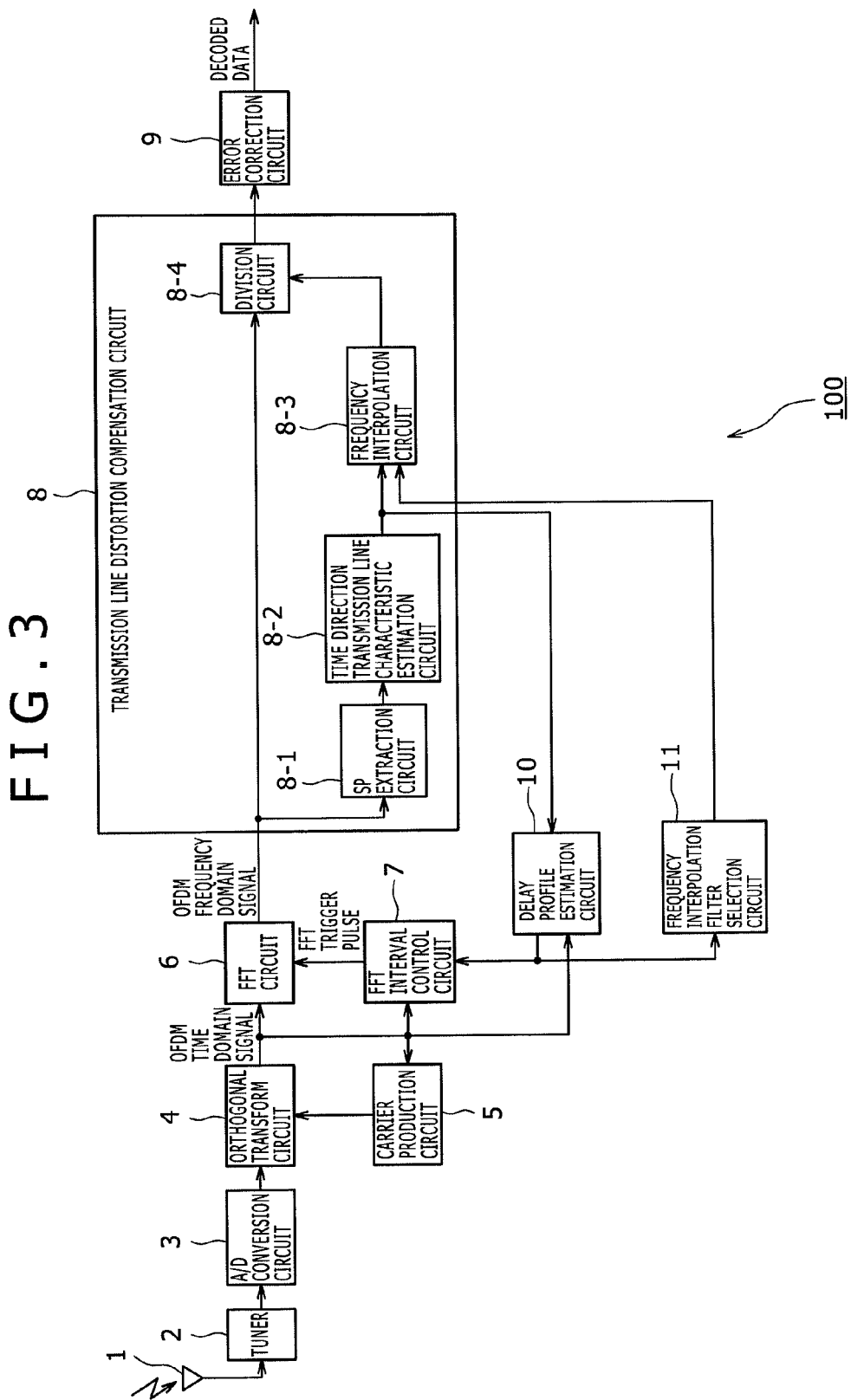
FIG. 3 is a block diagram showing an example of a configuration of an existing OFDM receiver.

Referring to FIG. 7, the OFDM receiver 101 shown includes a reception antenna 1, a tuner 2, an A/D conversion circuit 3, an orthogonal demodulation circuit 4, a carrier production circuit 5, an FFT circuit 6, an FFT interval control circuit 7, a transmission line distortion compensation circuit 8, an error correction circuit 9, a delay profile estimation circuit 10, a frequency interpolation filter selection circuit 11 and an optimum frequency interpolation filter selection circuit 21. The OFDM receiver 101 is different from the OFDM receiver 100 shown in FIG. 3 in that it additionally includes the optimum frequency interpolation filter selection circuit 21.

The tuner 2 frequency converts an RF signal received by the reception antenna 1 into an IF signal and outputs the IF signal to the A/D conversion circuit 3.

The A/D conversion circuit 3 carries out A/D conversion for the IF signal supplied thereto from the tuner 2 and outputs a resulting digital IF signal to the orthogonal demodulation circuit 4.

The orthogonal demodulation circuit 4 carries out orthogonal demodulation using a carrier supplied thereto from the carrier production circuit 5 to acquire an OFDM time domain signal from the IF signal supplied from the A/D conversion circuit 3, and outputs the acquired OFDM time domain signal. The OFDM time domain signal outputted from the orthogonal demodulation circuit 4 is supplied to the carrier production circuit 5, FFT circuit 6, FFT interval control circuit 7 and delay profile estimation circuit 10.

The carrier production circuit 5 produces a carrier of a predetermined frequency based on the OFDM time domain signal supplied from the orthogonal demodulation circuit 4 and outputs the produced carrier to the orthogonal demodulation circuit 4.

The FFT circuit 6 removes a signal within a range of the guard interval from a signal of one OFDM symbol based on an FFT trigger pulse supplied thereto from the FFT interval control circuit 7 to extract a signal within the range of the effective symbol length.

Further, the FFT circuit 6 carries out FFT mathematical operation for the extracted OFDM time domain signal to extract data orthogonally modulated in subcarriers and outputs an OFDM frequency domain signal representative of the extracted data. The OFDM frequency domain signal outputted from the FFT circuit 6 is supplied to an SP extraction circuit 8-1 and a division circuit 8-4 of the transmission line distortion compensation circuit 8 and a division circuit 21-4 of the optimum frequency interpolation filter selection circuit 21.

The FFT interval control circuit 7 determines an FFT interval based on the OFDM time domain signal supplied form the orthogonal demodulation circuit 4 and a delay profile estimated by the delay profile estimation circuit 10, and outputs an FFT trigger pulse which designates the start position of the determined FFT interval to the FFT circuit 6.

Where an OFDM time domain signal is used to determine an FFT interval, the FFT interval control circuit 7 determines correlation values of part of a rear half of an effective symbol used as a copy source of the guard interval in the OFDM time domain symbol for one OFDM symbol to different portions of the effective symbol and detects the portion having the highest correlation value as a guard interval. The FFT interval control circuit 7 determines the boundary position of the detected guard interval and the effective symbol as the start position of the FFT interval.

On the other hand, when a delay profile is used to determine an FFT interval, the FFT interval control circuit 7 determines the boundary position of the guard interval and the effective symbol represented by the delay profile as the start position of the FFT interval.

The transmission line distortion compensation circuit 8 includes an SP extraction circuit 8-1, a time direction transmission line characteristic estimation circuit 8-2, a frequency interpolation circuit 8-3 and a division circuit 8-4.

The SP extraction circuit 8-1 extracts an SP signal from the OFDM frequency domain signal supplied thereto from the FFT circuit 6 and removes a modulation component of the SP signal to estimate a transmission characteristic of a subcarrier at the arrangement position of the SP signal. The SP extraction circuit 8-1 outputs a signal representative of the estimated transmission line characteristic to the time direction transmission line characteristic estimation circuit 8-2.

The time direction transmission line characteristic estimation circuit 8-2 estimates a transmission line characteristic of the subcarrier, at which the SP signal is arranged, at the position of each of the OFDM symbols juxtaposed in the time direction based on the transmission characteristic estimated by the SP extraction circuit 8-1. The time direction transmission line characteristic estimation circuit 8-2 outputs a signal representative of the estimated transmission line characteristic for every three subcarriers. The signal outputted from the time direction transmission line characteristic estimation circuit 8-2 is supplied to the frequency interpolation circuit 8-3, the delay profile estimation circuit 10 and a frequency interpolation circuit 21-3 of the optimum frequency interpolation filter selection circuit 21.

The frequency interpolation circuit 8-3 interpolates a transmission characteristic in the frequency direction to estimate the transmission characteristic of the subcarrier at the position of each OFDM symbol in the frequency direction from the transmission line characteristics for every three subcarriers supplied from the time direction transmission line characteristic estimation circuit 8-2.

Figure 4:
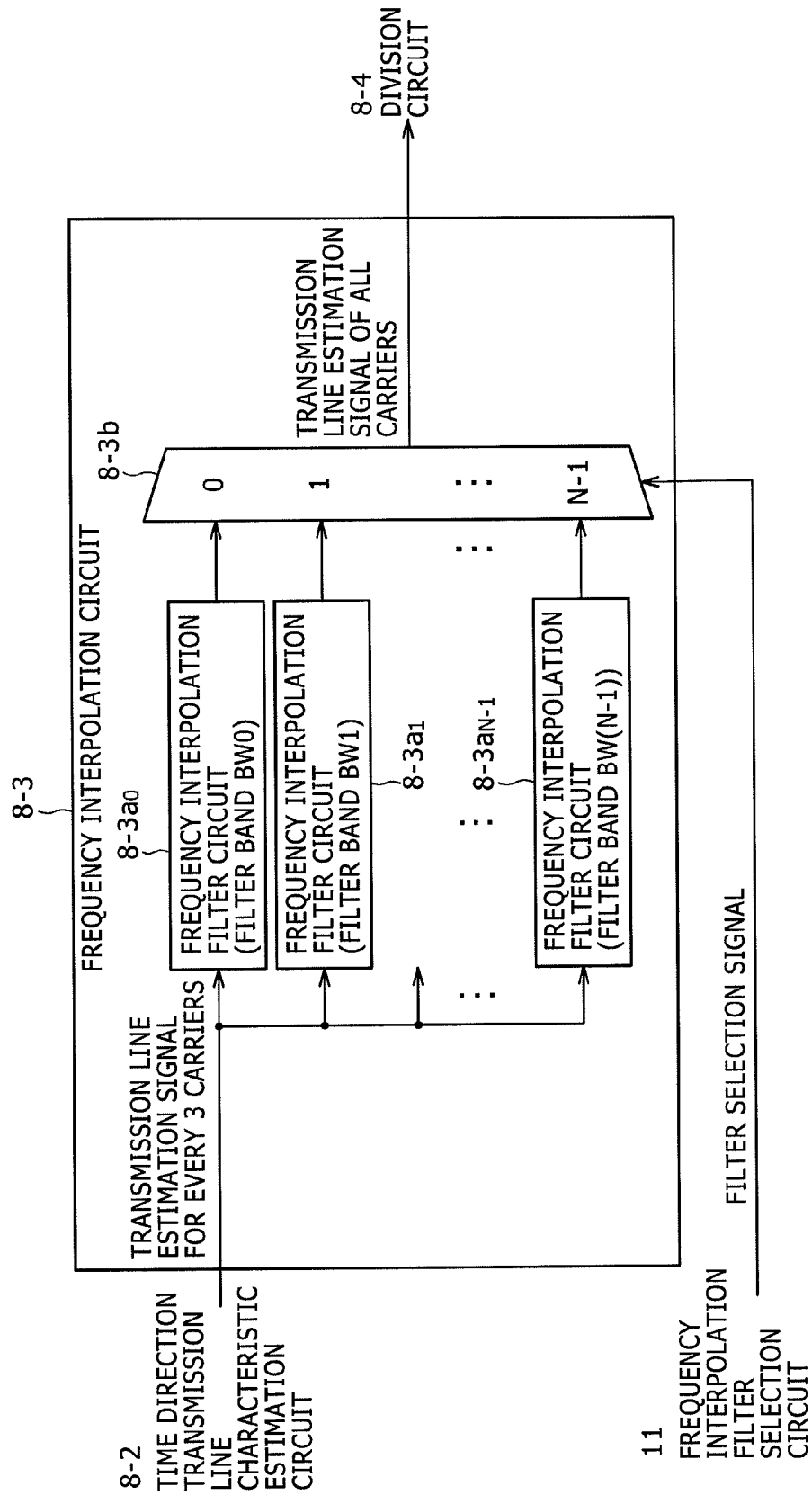
FIG. 4 is a block diagram showing an example of a configuration of a frequency interpolation circuit shown in FIG. 3.
Figure 5:
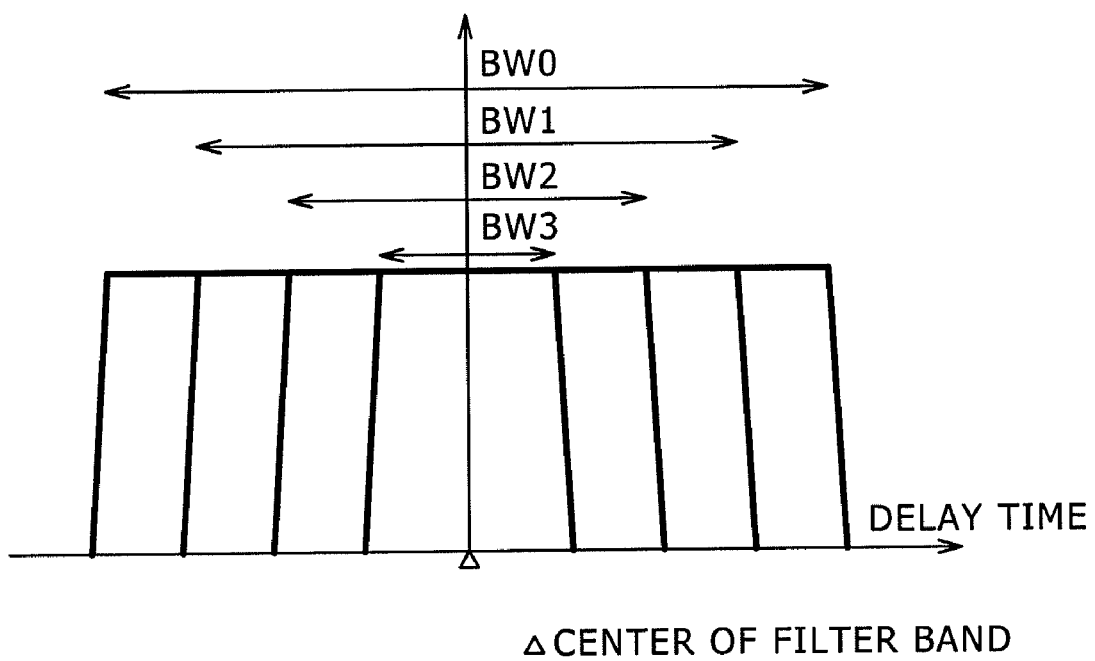
FIG. 5 is a diagrammatic view illustrating an example of filter bands.

The frequency interpolation circuit 8-3 has a configuration same as that shown in FIG. 4. The frequency interpolation circuit 8-3 selects one of signals representative of results of interpolation obtained using the plural interpolation filters having different filter bands as seen in FIG. 5 in accordance with a filter selection signal supplied from a control circuit 21-2. The frequency interpolation circuit 8-3 outputs the selected signal as a signal representative of an estimation result of the transmission line characteristic to the division circuit 8-4.

The division circuit 8-4 divides a component of a signal representative of the transmission characteristics of all subcarriers supplied from the frequency interpolation circuit 8-3 from the OFDM frequency domain signal supplied from the FFT circuit 6 to remove a component of distortion by the transmission line from the OFDM frequency domain signal. The division circuit 8-4 outputs the OFDM frequency domain signal after the transmission line distortion compensation from which the distortion component is removed. The OFDM frequency domain signal after the transmission line distortion compensation outputted from the division circuit 8-4 is supplied to a selection circuit 21-1 and a signal quality detection circuit 21-5 of the optimum frequency interpolation filter selection circuit 21.

The error correction circuit 9 carries out a deinterleave process for the OFDM frequency domain signal supplied thereto from the selection circuit 21-1 of the optimum frequency interpolation filter selection circuit 21 and further carries out such processes as depuncture, Viterbi decoding, spread signal removal and RS decoding. The error correction circuit 9 outputs data obtained by the processes as decoded data to a circuit at a succeeding stage.

The delay profile estimation circuit 10 determines the time response characteristic of the transmission line to estimate a delay profile of the transmission line and outputs a signal representative of the estimated delay profile. The signal outputted from the delay profile estimation circuit 10 is supplied to the FFT interval control circuit 7 and the frequency interpolation filter selection circuit 11.

The frequency interpolation filter selection circuit 11 determines a delay spread based on the delay profile estimated by the delay profile estimation circuit 10 and outputs a filter selection signal representative of the filter band corresponding to the delay spread to the control circuit 21-2 of the optimum frequency interpolation filter selection circuit 21.

The optimum frequency interpolation filter selection circuit 21 includes a selection circuit 21-1, a control circuit 21-2, a frequency interpolation circuit 21-3, a division circuit 21-4 and a signal quality detection circuit 21-5. Of the components of the optimum frequency interpolation filter selection circuit 21, the frequency interpolation circuit 21-3 carries out the same process as that of the frequency interpolation circuit 8-3 of the transmission line distortion compensation circuit 8, and therefore, they may be implemented collectively as a single circuit. Meanwhile, since the division circuit 21-4 carries out the same process as that of the division circuit 8-4 of the transmission line distortion compensation circuit 8, they may be implemented collectively as a single circuit.

The selection circuit 21-1 selects one of an OFDM frequency domain signal after transmission line distortion compensation supplied from the division circuit 8-4 and another OFDM frequency domain signal after transmission line distortion compensation supplied from the division circuit 21-4 in accordance with a selection signal supplied from the control circuit 21-2. Then, the selection circuit 21-1 outputs the selected OFDM frequency domain signal to the error correction circuit 9.

The control circuit 21-2 outputs a selection signal indicating that one of the OFDM frequency domain signals which exhibits high quality based on the information supplied from the signal quality detection circuit 21-5 to the selection circuit 21-1. From the signal quality detection circuit 21-5 to the control circuit 21-2, information representative of the quality of the OFDM frequency domain signal obtained by transmission line distortion compensation carried out by the division circuit 8-4 and information representative of the quality of the OFDM frequency domain signal obtained by transmission line distortion compensation carried out by the division circuit 21-4 are supplied. The control circuit 21-2 outputs a filter selection signal to the frequency interpolation circuit 8-3 and the frequency interpolation circuit 21-3.

The frequency interpolation circuit 21-3 interpolates a transmission line characteristic in the frequency direction to estimate the transmission line characteristic of the subcarrier at the position of each of the OFDM symbols in the frequency direction from the transmission line characteristics for every three subcarriers supplied from the time direction transmission line characteristic estimation circuit 8-2 of the transmission line distortion compensation circuit 8.

Also the frequency interpolation circuit 21-3 has a configuration same as that shown in FIG. 4. The frequency interpolation circuit 21-3 selects one of signals representative of results of interpolation obtained using the plural interpolation filters having different filter bands as seen in FIG. 5 in accordance with a filter selection signal supplied from the control circuit 21-2. The frequency interpolation circuit 21-3 outputs the selected signal as a signal representative of a result of the estimation of the transmission line characteristic to the division circuit 21-4.

The division circuit 21-4 divides a component of a signal representative of the transmission line characteristics of all subcarriers supplied from the frequency interpolation circuit 21-3 from the OFDM frequency domain signal supplied from the FFT circuit 6 to remove a component of the distortion by the transmission line from the OFDM frequency domain signal. The division circuit 21-4 outputs the OFDM frequency domain signal after the transmission line distortion compensation from which the component of the distortion is removed to the selection circuit 21-1 and the signal quality detection circuit 21-5.

The signal quality detection circuit 21-5 detects the quality of the OFDM frequency domain signal after the transmission line distortion compensation supplied from the division circuit 8-4 and the quality of the OFDM frequency domain signal after the transmission line distortion compensation supplied from the division circuit 21-4 and outputs signal quality information representative of the detected qualities to the control circuit 21-2. For example, the quality is defined by the amount of noise, and the signal quality detection circuit 21-5 detects the amount of noise included in the OFDM frequency domain signals after the transmission line distortion compensation.

Figure 8:
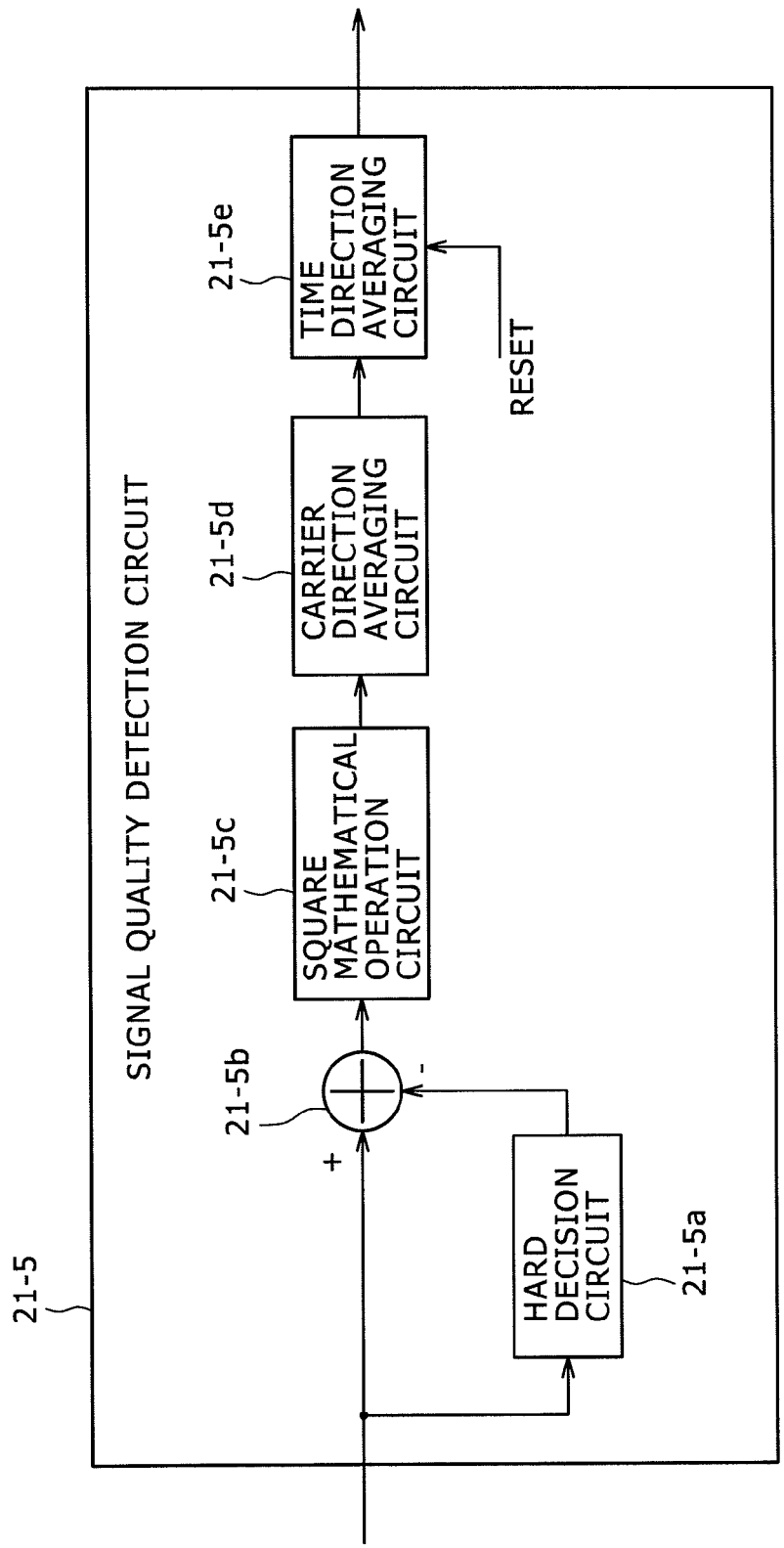
FIG. 8 is a block diagram showing an example of a configuration of a signal quality detection circuit shown in FIG. 7.

FIG. 8 shows an example of a configuration of the signal quality detection circuit 21-5.

Referring to FIG. 8, the signal quality detection circuit 21-5 includes a hard decision circuit 21-5a, a subtraction circuit 21-5b, a square mathematical operation circuit 21-5c, a carrier direction averaging circuit 21-5d and a time direction averaging circuit 21-5e. The OFDM frequency domain signal after the transmission line distortion compensation outputted from the division circuit 8-4 or the division circuit 21-4 is supplied to the hard decision circuit 21-5a and the subtraction circuit 21-5b.

The hard decision circuit 21-5a carries out a hard decision of the signals after the transmission line distortion compensation in accordance with a modulation method such as the PSK or the QAM. The hard decision circuit 21-5a outputs a hard decision value as a result of the decision to the subtraction circuit 21-5b.

The subtraction circuit 21-5b outputs the difference between the hard decision value and the value of the OFDM frequency domain signal after the transmission line distortion compensation to the square mathematical operation circuit 21-5c. The difference between the hard decision value and the OFDM frequency domain signal represents a noise amount.

The square mathematical operation circuit 21-5c squares the noise amount calculated by the subtraction circuit 21-5b to convert the noise amount into power. The square mathematical operation circuit 21-5c outputs the power of the noise determined by the squaring mathematical operation to the carrier direction averaging circuit 21-5d.

The carrier direction averaging circuit 21-5d averages the power determined by the square mathematical operation circuit 21-5c in the carrier direction to enhance the accuracy of the power. The carrier direction averaging circuit 21-5d outputs the average value of the power in the carrier direction to the time direction averaging circuit 21-5e.

Where one filter selection signal is applied over a plurality of symbols, it is possible to calculate an average in the time direction. In this instance, the time direction averaging circuit 21-5e calculates an average in the time direction of the power of the noise included in the OFDM frequency domain signal after the transmission line distortion compensation produced when the same filter selection signal was outputted from the control circuit 21-2 and outputs information representative of the calculated average in the time direction to the control circuit 21-2. To the time direction averaging circuit 21-5e, a reset signal for canceling the information used for the mathematical operation till that point of time is inputted every time the filter selection signal is changed.

Here, a sequence of selection of a filter band by the control circuit 21-2 and selection of an OFDM frequency domain signal after transmission line distortion compensation is described.

Figure 9:
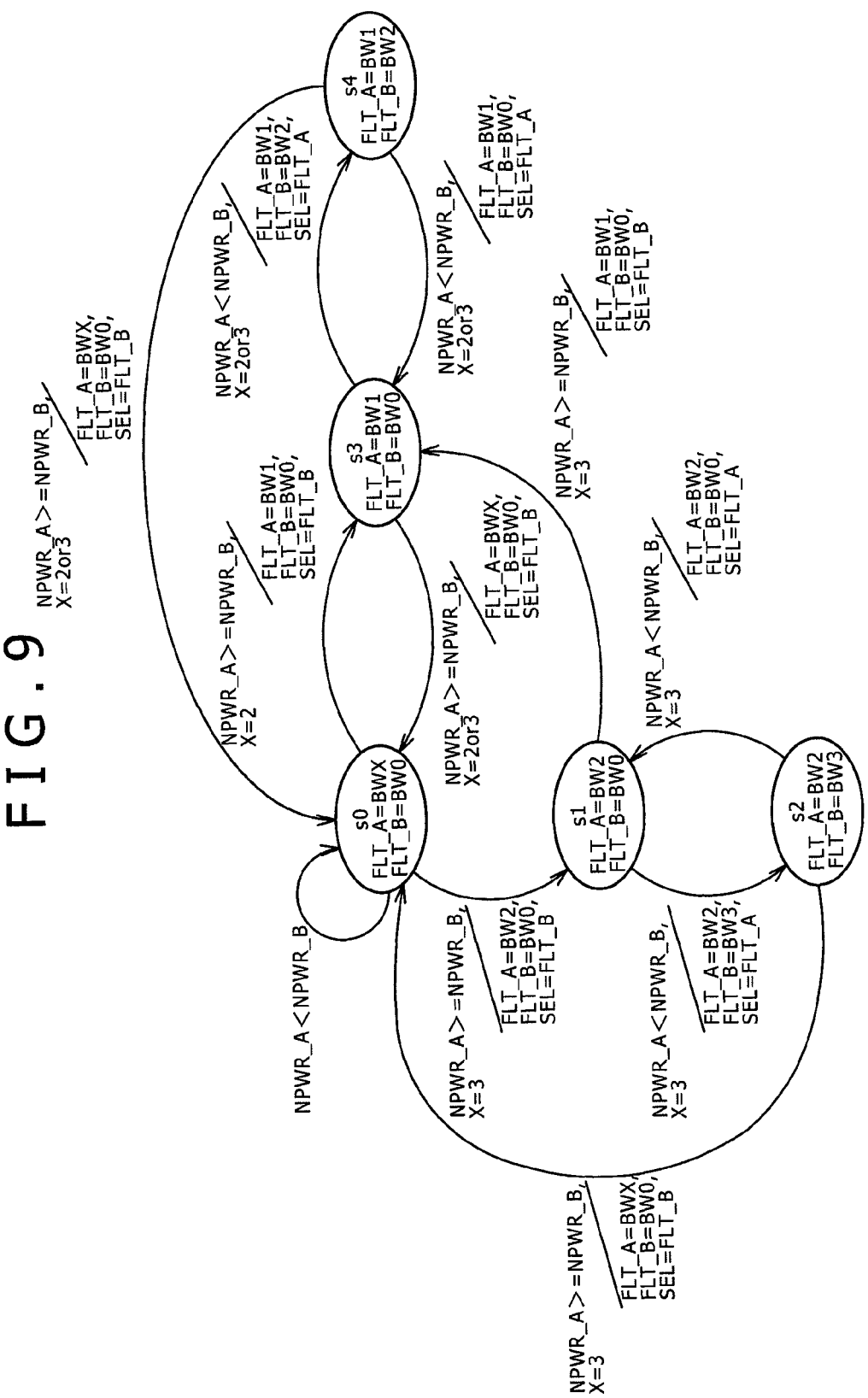
FIG. 9 is a diagrammatic view illustrating a selection sequence in the OFDM receiver of FIG. 7.

FIG. 9 illustrates an example of the selection sequence.

Referring to FIG. 9, characters indicated in each of ellipses representative of different states represent filter selection signals outputted from the control circuit 21-2 to the frequency interpolation circuit 8-3 and the frequency interpolation circuit 21-3, and characters indicated in the proximity of an arrow mark representative of a change from a certain state to another state represent a condition in which the change occurs and contents of signals outputted from the control circuit 21-2 at this time. Of the characters indicated in the proximity of each arrow mark, those on the left side with respect to a slash (/) represent a changing condition (action list) and those on the right side represent contents of the signals, that is, the states of the destination of the change.

In the following description, the filter selection signal outputted from the control circuit 21-2 to the frequency interpolation circuit 8-3 is represented by FLT_A, and the filter selection signal outputted from the control circuit 21-2 to the frequency interpolation circuit 21-3 is represented by FLT_B. Further, the quality of the OFDM frequency domain signal obtained by transmission line distortion compensation by the division circuit 8-4 is represented as signal quality information NPWR_A, and the quality of the OFDM frequency domain signal obtained by transmission line distortion compensation carried out by the division circuit 21-4 is represented as signal quality information NPWR_B.

Figure 6:
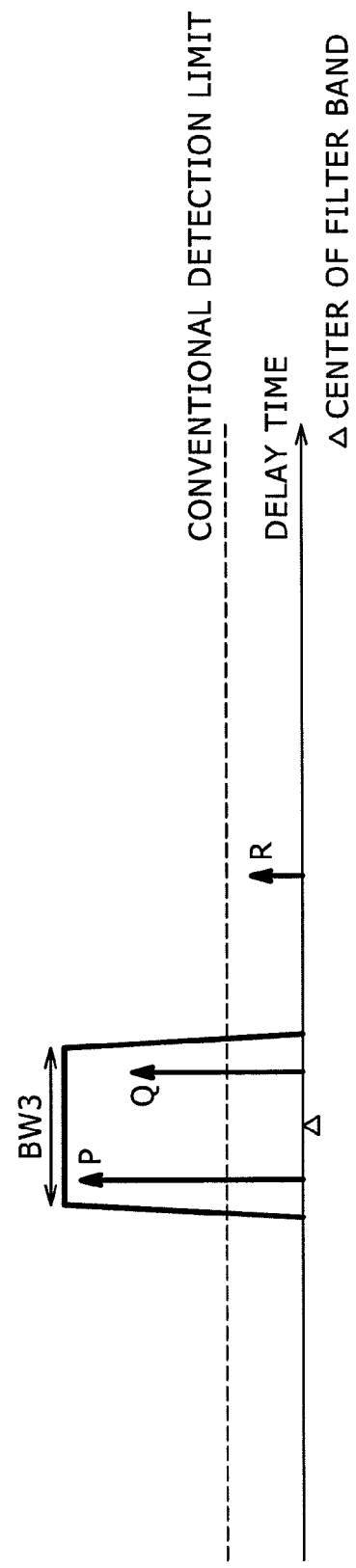
FIG. 6 is a diagrammatic view illustrating an example of a delay profile.

Further, the filter band selected by the frequency interpolation filter selection circuit 11 based on the delay profile estimated by the delay profile estimation circuit 10 is represented by BWX (X=0 to 3). The filter selection signal supplied from the frequency interpolation filter selection circuit 11 to the control circuit 21-2 represents this filter band BWX. It is to be noted that the delay profile here has such a state as described hereinabove with reference to FIG. 6. In particular, three paths of the path P, path Q and path R are involved, and of the three paths, merely the path P and the path Q can be detected by the delay profile estimation circuit 10 while the path R may not be detected because the power thereof is low.

The state s0 is an initial state wherein FLT_A=BWX and FLG_B=BW0. In the state s0, an instruction to select a filter band selected based on the delay profile is provided to the frequency interpolation circuit 8-3. The control circuit 21-2 compares, based on the signal quality information NPWR_A and NPWR_B, the amount of noise included in the OFDM frequency domain signal produced by the division circuit 8-4 and the amount of noise included in the OFDM frequency domain signal produced by the division circuit 21-4 when FLT_A=BWX and FLT_B=BW0.

Figure 10:
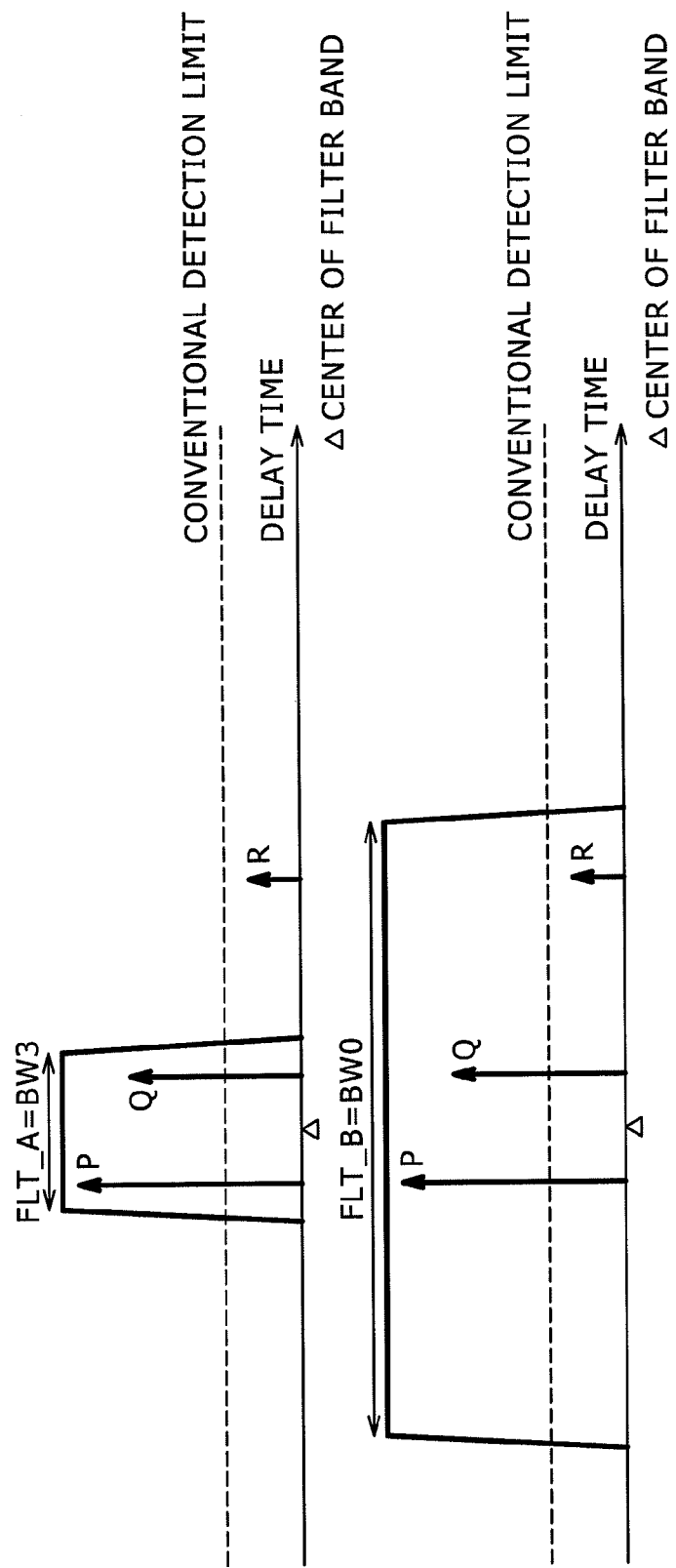
FIGS. 10 to 12 are diagrammatic views illustrating different examples of a filter band selected by a control circuit shown in FIG. 7.

As seen on the upper stage in FIG. 10, where BWX=BW3, since the path R which is not detected as yet exists, the division circuit 8-4 may not fully compensate for the transmission line distortion and deterioration of the reception performance occurs. In contrast, as seen on the lower stage in FIG. 10, the frequency interpolation circuit 21-3 carries out interpolation using the interpolation filter for the filter band BW0 which includes also the path R which is not detected as yet, and the division circuit 21-4 compensates for the transmission line distortion based on a signal representative of a result of the interpolation.

Referring back to FIG. 9, the signal quality information supplied from the signal quality detection circuit 21-5 becomes NPWR_A>=NPWR_B, and since X=3, the state of the control circuit 21-2 changes from the state s0 to another state s1. Where the value of the signal quality information is high, the amount of noise is great and the quality of the OFDM frequency domain signal based on which the amount of noise is detected is low.

At this time, the filter selection signal to the frequency interpolation circuit 8-3 is changed over to FLT_A=BW2. Further, as a selection signal SEL to the selection circuit 21-1, SEL=FLT_B which indicates that the OFDM frequency domain signal outputted from the division circuit 21-4 should be selected is outputted from the control circuit 21-2.

In the state s1, FLT_A=BW2 and FLT_B=BW0. The control circuit 21-2 compares, based on the signal quality information NPWR_A and NPWR_B supplied from the signal quality detection circuit 21-5, the amount of noise included in the OFDM frequency domain signal produced by the division circuit 8-4 and the amount of noise included in the OFDM frequency domain signal produced by the division circuit 21-4 when FLT_A=BW2 and FRT_B=WS0.

Figure 11:
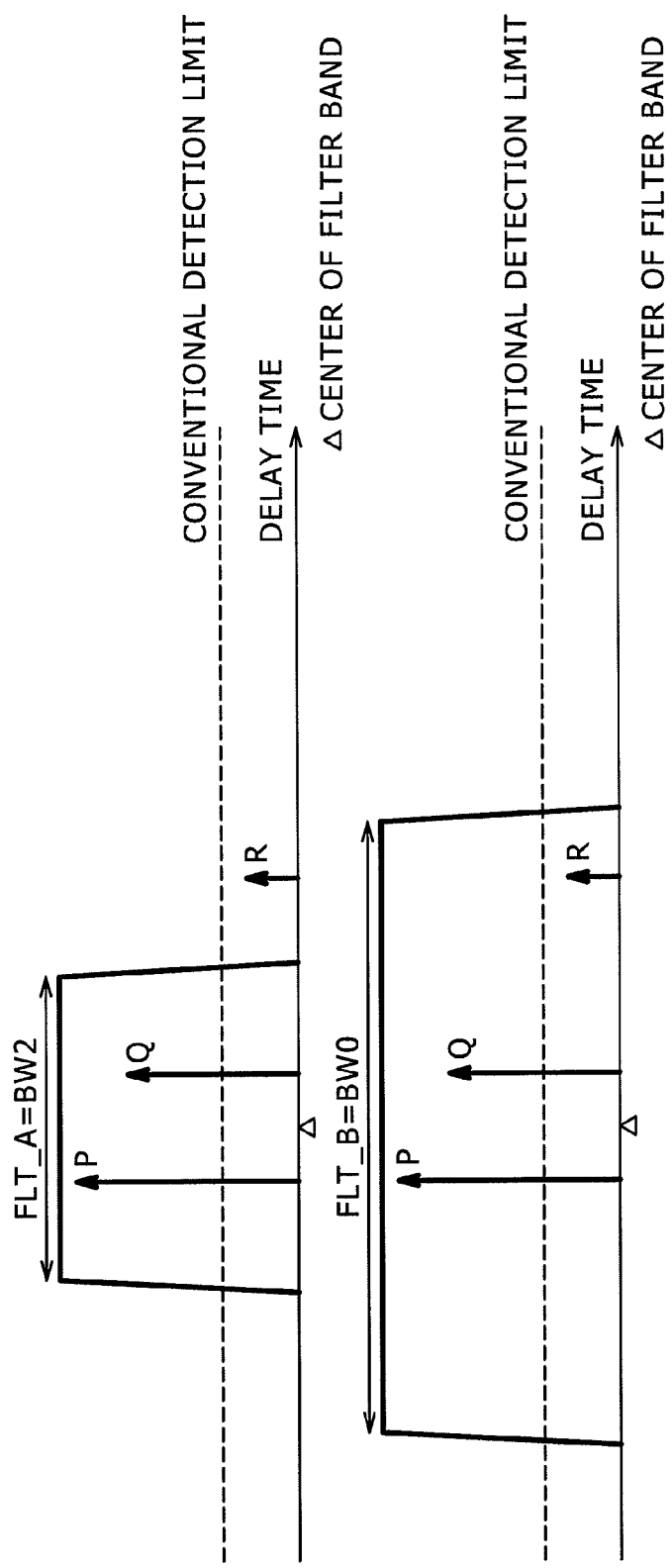

Since, also in the state s1, such a path R which is not detected as yet as seen from the upper stage of FIG. 11 exists, the division circuit 8-4 may not fully compensate for the transmission line distortion, and deterioration of the reception performance occurs. In contrast, as seen from the lower stage of FIG. 11, the frequency interpolation circuit 21-3 carries out interpolation using the interpolation filter for the filter band BW0 which includes also the path R which is not detected as yet, and the division circuit 21-4 compensates for the transmission line distortion based on a signal representative of a result of the interpolation.

The signal quality information supplied from the signal quality detection circuit 21-5 becomes NPWR_A>=NPWR_B, and since X=3, the state of the control circuit 21-2 changes from the state s1 to a different state s3.

At this time, the filter selection signal to the frequency interpolation circuit 8-3 is changed over to FLT_A=BW1. Further, as the selection signal SEL to the selection circuit 21-1, SEL=FLT_B which indicates that the OFDM frequency domain signal outputted from the division circuit 21-4 should be selected is outputted from the control circuit 21-2.

In the state s3, FLT_A=BW1 and FLT_B=BW0. The control circuit 21-2 compares, based on the signal quality information NPWR_A and NPWR_B supplied from the signal quality detection circuit 21-5, the amount of noise included in the OFDM frequency domain signal produced by the division circuit 8-4 and the amount of noise included in the OFDM frequency domain signal produced by the division circuit 21-4 when FLT_A=BW1 and FRT_B=WS0.

Figure 12:
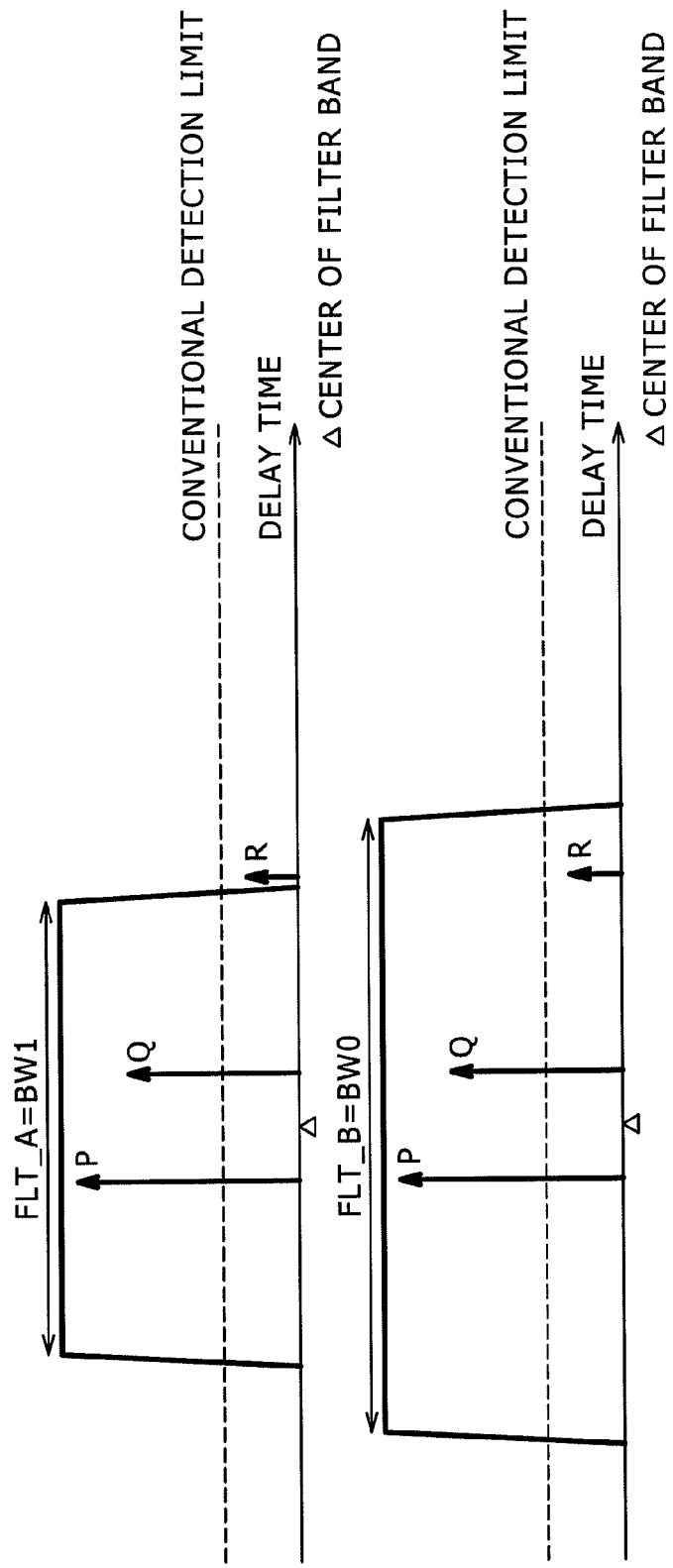

Since, also in the state s3, such a path R which is not detected as yet as seen from the upper stage of FIG. 12 exists, the division circuit 8-4 may not fully compensate for the transmission line distortion, and deterioration of the reception performance occurs. In contrast, as seen from the lower stage of FIG. 12, the frequency interpolation circuit 21-3 carries out interpolation using the interpolation filter for the filter band BW0 which includes also the path R which is not detected as yet, and the division circuit 21-4 compensates for the transmission line distortion based on a signal representative of a result of the interpolation.

The signal quality information supplied from the signal quality detection circuit 21-5 becomes NPWR_A>=NPWR_B, and since X=3, the state of the control circuit 21-2 changes from the state s3 to the state s0. Also when X=2, the state of the control circuit 21-2 changes from the state s3 to the state s0 similarly.

At this time, the filter selection signal to the frequency interpolation circuit 8-3 is changed over to FLT_A=BWX. Further, as the selection signal SEL to the selection circuit

21-1, SEL=FLT_B which indicates that the OFDM frequency domain signal outputted from the division circuit 21-4 should be selected is outputted from the control circuit 21-2.

In this manner, also where the OFDM receiver 101 is in an environment wherein the path R which exceeds the detection limit of the delay profile estimation circuit 10 exists and the division circuit 8-4 may not fully compensate for the transmission line distortion, since the OFDM frequency domain signal produced by the division circuit 21-4 is selected in accordance with the selection signal SEL=FLT_B, a result of transmission line distortion compensation carried out including also the path R can be supplied to the error correction circuit 9. Consequently, deterioration of the reception performance can be prevented.

Also in other cases, the state of the control circuit 21-2 similarly changes suitably. For example, where NPWR_A<NPWR_B in the state s0, the state s0 is maintained.

On the other hand, where NPWR_A>=NPWR_B and X=2 in the state s0, the state of the control circuit 21-2 changes from the state s0 to the state s3. At this time, the filter selection signal to the frequency interpolation circuit 8-3 is changed over to FLT_A=BW1. Further, as the selection signal SEL to the selection circuit 21-1, SEL=FLT_B indicating that the OFDM frequency domain signal outputted from the division circuit 21-4 should be selected is outputted from the control circuit 21-2.

Where NPWR_A<NPWR_B and X=3 in the state s1, the state of the control circuit 21-2 changes from the state s1 to a different state s2. At this time, the filter selection signal to the frequency interpolation circuit 21-3 is changed over to FLT_B=BW3. Further, as the selection signal SEL to the selection circuit 21-1, SEL=FLT_A indicating that the OFDM frequency domain signal outputted from the division circuit 8-4 should be selected is outputted from the control circuit 21-2.

In the state s2, FLT_A=BW2 and FLT_B=BW3. The control circuit 21-2 compares, based on the signal quality information NPWR_A and NPWR_B supplied from the signal quality detection circuit 21-5, the amount of noise included in the OFDM frequency domain signal produced by the division circuit 8-4 and the amount of noise included in the OFDM frequency domain signal produced by the division circuit 21-4 when FLT_A=BW2 and FRT_B=WS0.

Where NPWR_A<NPWR_B and X=3 in the state s2, the state of the control circuit 21-2 changes from the state s1 to the state s1. At this time, the filter selection signal to the frequency interpolation circuit 21-3 is changed over to FLT_B=BW0. Further, as the selection signal SEL to the selection circuit 21-1, SEL=FLT_A indicating that the OFDM frequency domain signal outputted from the division circuit 8-4 should be selected is outputted from the control circuit 21-2.

On the other hand, where NPWR_A>=NPWR_B and X=3 in the state s2, the state of the control circuit 21-2 changes from the state s2 to the state s0. At this time, the filter selection signal to the frequency interpolation circuit 8-3 is changed over to FLT_A=BWX and the filter selection signal to the frequency interpolation circuit 21-3 is changed over to FLT_B=BW0. Further, as the selection signal SEL to the selection circuit 21-1, SEL=FLT_B indicating that the OFDM frequency domain signal outputted from the division circuit 21-4 should be selected is outputted from the control circuit 21-2.

Where NPWR_A<NPWR_B and X=2 or 3 in the state s3, the state of the control circuit 21-2 changes from the state s3 to a different state s4. At this time, the filter selection signal to the frequency interpolation circuit 21-3 is changed over to FLT_B=BW2. Further, as the selection signal SEL to the selection circuit 21-1, SEL=FLT_A indicating that the OFDM frequency domain signal outputted from the division circuit 8-4 should be selected is outputted from the control circuit 21-2.

In the state s4, FLT_A=BW1 and FLT_B=BW2. The control circuit 21-2 compares, based on the signal quality information NPWR_A and NPWR_B supplied from the signal quality detection circuit 21-5, the amount of noise included in the OFDM frequency domain signal produced by the division circuit 8-4 and the amount of noise included in the OFDM frequency domain signal produced by the division circuit 21-4 when FLT_A=BW1 and FRT_B=BW2.

Where NPWR_A<NPWR_B and X=2 or 3 in the state s4, the state of the control circuit 21-2 changes from the state s4 to the state s3. At this time, the filter selection signal to the frequency interpolation circuit 21-3 is changed over to FLT_B=BW0. Further, as the selection signal SEL to the selection circuit 21-1, SEL=FLT_A indicating that the OFDM frequency domain signal outputted from the division circuit 8-4 should be selected is outputted from the control circuit 21-2.

On the other hand, where NPWR_A>=NPWR_B and X=2 or 3 in the state s4, the state of the control circuit 21-2 changes from the state s4 to the state s0. At this time, the filter selection signal to the frequency interpolation circuit 8-3 is changed over to FLT_A=BWX and the filter selection signal to the frequency interpolation circuit 21-3 is changed over to FLT_B=BW0. Further, as the selection signal SEL to the selection circuit 21-1, SEL=FLT_B indicating that the OFDM frequency domain signal outputted from the division circuit 21-4 should be selected is outputted from the control circuit 21-2.

Such a selection sequence as described above can normally operate while a reception process is carried out by the OFDM receiver 101, and consequently, an optimum OFDM frequency domain signal can typically be selected. In other words, it is considered that the OFDM receiver 101 has a high follow-up performance even in such an environment that the profile fluctuates successively.

Further, the filter band of the interpolation filters used in the two frequency interpolation circuits can be controlled adaptively, and it is possible to prevent deterioration of the reception performance without giving rise to failure of data. Basically, the filter band is controlled adaptively so as to change the filter band of the frequency interpolation circuit used to determine the transmission line characteristic based on which the transmission line distortion compensated signal which is not selected by the selection circuit 21-1 is produced.

Processing of the OFDM receiver 101 having such a configuration as described above is described below. The processes at steps of the flow charts described below may be carried out in order of the step number or may be carried out suitably in parallel to processing at another step.

First, an OFDM demodulation process of the OFDM receiver 101 is described with reference to FIG. 13.

At step S1, the tuner 2 frequency converts an RF signal received by the reception antenna 1 and outputs a resulting IF signal to the A/D conversion circuit 3.

At step S2, the A/D conversion circuit 3 carries out A/D conversion for the IF signal and outputs a resulting digital IF signal to the orthogonal demodulation circuit 4.

At step S3, the orthogonal demodulation circuit 4 carries out orthogonal demodulation and outputs a resulting OFDM time domain signal to the carrier production circuit 5, FFT circuit 6, FFT interval control circuit 7 and delay profile estimation circuit 10.

At step S4, the FFT circuit 6 sets an FFT interval based on an FFT trigger pulse supplied from the FFT interval control circuit 7 and carries out FFT mathematical operation. The FFT circuit 6 outputs an OFDM frequency domain signal obtained by the FFT mathematical operation to the SP extraction circuit 8-1, division circuit 8-4 and division circuit 21-4.

At step S5, the SP extraction circuit 8-1 extracts SP signals from the OFDM frequency domain signal to estimate a transmission line characteristic of the subcarrier at the arranged position of each SP signal. The SP extraction circuit 8-1 outputs a signal representative of the estimated transmission line characteristics to the time direction transmission line characteristic estimation circuit 8-2.

At step S6, the time direction transmission line characteristic estimation circuit 8-2 estimates the transmission line characteristics in the time direction for every three subcarriers and outputs a signal representative of the estimated transmission line characteristics to the frequency interpolation circuit 8-3, delay profile estimation circuit 10 and frequency interpolation circuit 21-3.

At step S7, the delay profile estimation circuit 10 estimates a delay profile and outputs the delay profile to the FFT interval control circuit 7 and the frequency interpolation filter selection circuit 11.

At step S8, the frequency interpolation filter selection circuit 11 determines a delay spread based on the delay profile estimated by the delay profile estimation circuit 10 and selects a filter band corresponding to the delay spread. The frequency interpolation filter selection circuit 11 outputs a filter selection signal for designating the selected filter band to the control circuit 21-2.

At step S9, the FFT interval control circuit 7 determines an FFT interval based on the OFDM time domain signal supplied from the orthogonal demodulation circuit 4 and the delay profile estimated by the delay profile estimation circuit 10 and outputs an FFT trigger pulse for designating the determined FFT interval to the FFT circuit 6.

At step S10, the frequency interpolation circuit 8-3 interpolates the transmission characteristic in the frequency direction to estimate the transmission line characteristic of the subcarrier at the position of each of the OFDM symbols in the frequency direction from the transmission line characteristics for every three subcarriers supplied from the time direction transmission line characteristic estimation circuit 8-2, and outputs a signal representing a result of the estimation to the division circuit 8-4. Which one of the plural signals representative of the results of interpolation should be outputted as a signal representative of a result of the estimation of the transmission line characteristic is selected based on a filter selection signal FLT_A supplied from the control circuit 21-2.

At step S11, the division circuit 8-4 removes a component of distortion by the transmission line from the OFDM frequency domain signal supplied from the FFT circuit 6 based on the signal supplied from the frequency interpolation circuit 8-3. The division circuit 8-4 outputs the OFDM frequency domain signal from which the component of the distortion is removed to the selection circuit 21-1 and the signal quality detection circuit 21-5.

At step S12, a signal selection process of selecting an OFDM frequency domain signal to be outputted to the error correction circuit 9 is carried out. The signal selection process is hereinafter described with reference to FIG. 14.

At step S13, the error correction circuit 9 carries out various processes such as deinterleave, depuncture, Viterbi decoding, spread signal removal and RS decoding for the OFDM frequency domain signal supplied from the selection circuit 21-1 and outputs resulting decoded data to the circuit on the succeeding stage.

The processes described above are repeated by the OFDM receiver 101 while the OFDM receiver 101 carries out reception of a signal.

Figure 13:
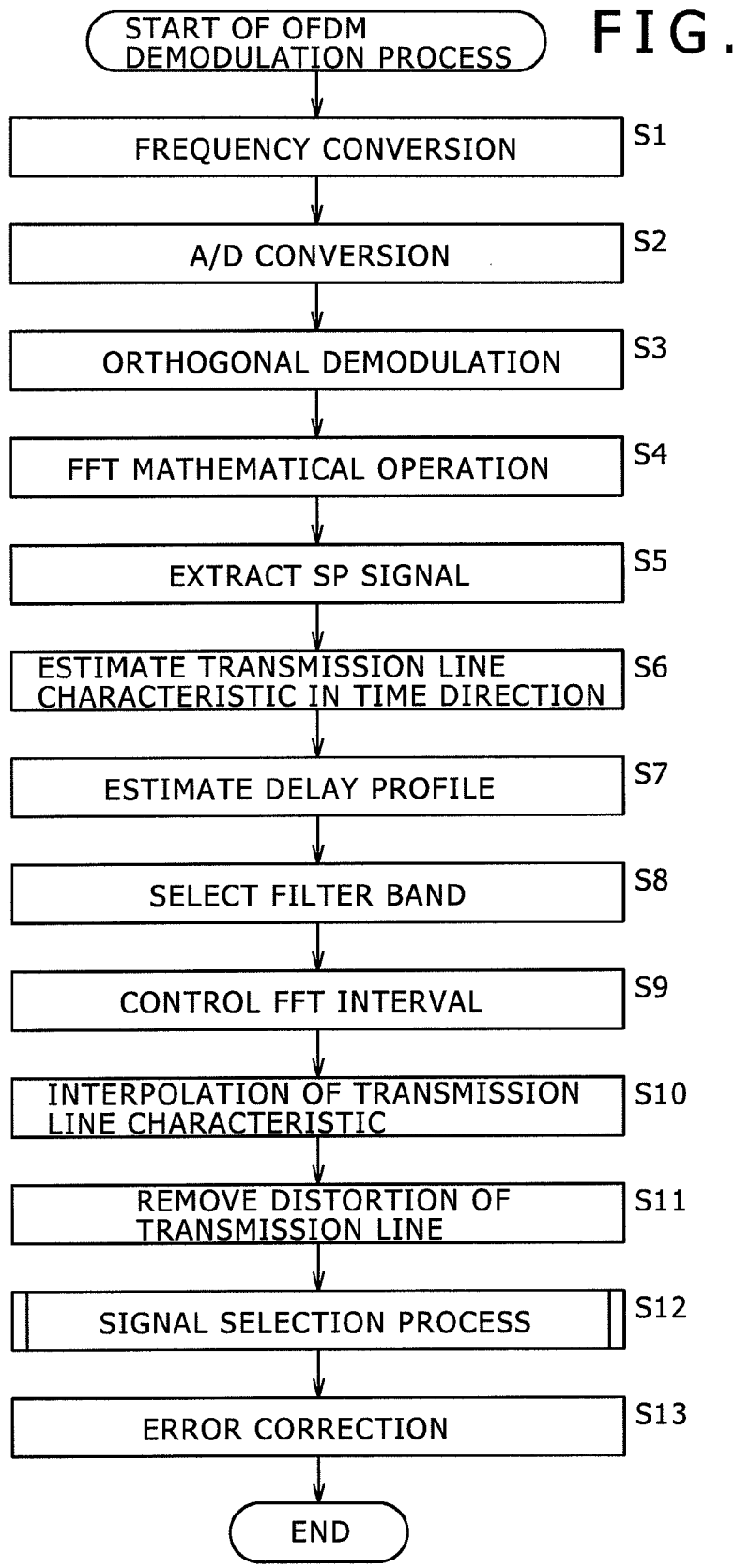
FIG. 13 is a flow chart illustrating an OFDM demodulation process of the OFDM receiver of FIG. 7.

Now, the signal selection process carried out at step S12 of FIG. 13 is described with reference to FIG. 14.

Figure 14:
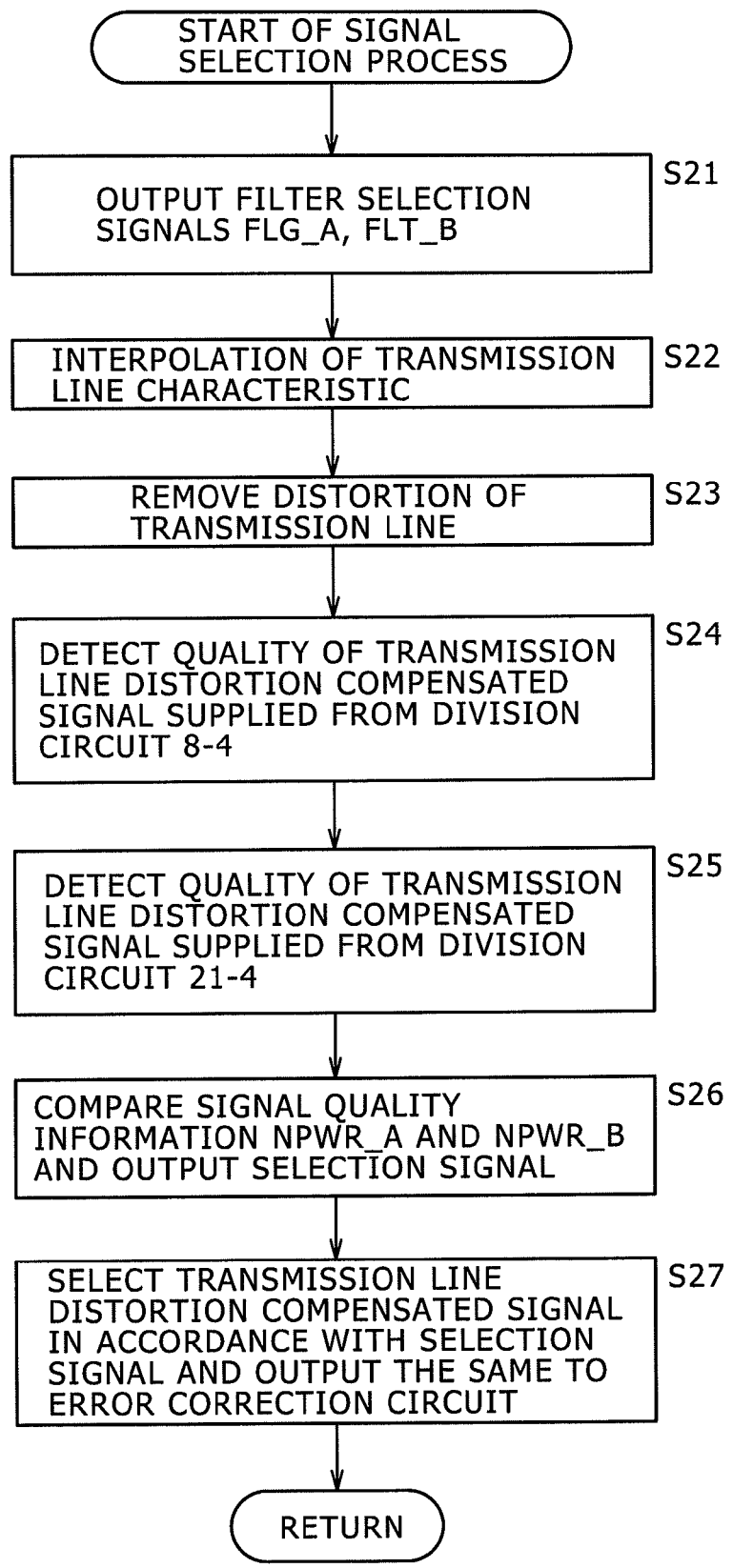
FIG. 14 is a flow chart illustrating a signal selection process carried out at step S12 of FIG. 13.

While signal reception is carried out, the OFDM receiver 101 normally carries out the process of FIG. 14 in parallel to the process of FIG. 13.

At step S21, the control circuit 21-2 outputs a filter selection signal FLT_A to the frequency interpolation circuit 8-3 and outputs a filter selection signal FLT_B to the frequency interpolation circuit 21-3. The filter selection signals FLT_A and FLT_B are selected in accordance with the selection sequence described hereinabove with reference to FIG. 9.

At step S22, the frequency interpolation circuit 21-3 interpolates the transmission line characteristic in the frequency information to estimate the transmission line characteristic of the subcarrier at the position of each of OFDM symbols in the frequency direction from the transmission line characteristics for every three subcarriers supplied from the time direction transmission line characteristic estimation circuit 8-2. Then, the frequency interpolation circuit 21-3 outputs a result of a result of the estimation to the division circuit 21-4. Which one of the plural signals representative of the results of interpolation should be outputted as a signal representative of a result of the estimation of the transmission line characteristic is selected based on the filter selection signal FLT_B supplied from the control circuit 21-2.

At step S23, the division circuit 21-4 removes a component of distortion by the transmission line from the OFDM frequency domain signal supplied form the FFT circuit 6 based on the signal supplied from the frequency interpolation circuit 21-3. The division circuit 21-4 outputs the OFDM frequency domain signal from which the component of distortion is removed to the selection circuit 21-1 and the signal quality detection circuit 21-5. It is to be noted that the interpolation of the transmission line characteristic by the frequency interpolation circuit 8-3 has been carried out at step S10, and the compensation for the transmission line distortion by the division circuit 8-4 has been carried out at step S11.

At step S24, the signal quality detection circuit 21-5 detects the amount of noise included in the OFDM frequency domain signal after the transmission line distortion compensation supplied from the division circuit 8-4 and outputs a signal quality information NPWR_A to the control circuit 21-2.

At step S25, the signal quality detection circuit 21-5 detects the amount of noise included in the OFDM frequency domain signal after the transmission line distortion compensation supplied from the division circuit 21-4 and outputs a signal quality information NPWR_B to the control circuit 21-2.

At step S26, the control circuit 21-2 outputs a selection signal SEL indicating that the signal quality information NPWR_A and NPWR_B should be compared with each other and that one of the OFDM frequency domain signals which has higher quality should be detected to the selection circuit 21-1.

At step S27, the selection circuit 21-1 selects, from between the OFDM frequency domain signal supplied from the division circuit 8-4 and the OFDM frequency domain signal supplied from the division circuit 21-4, the OFDM frequency domain signal which has higher quality in accordance with the selection signal supplied from the control circuit 21-2. Then, the selection circuit 21-1 outputs the selected OFDM frequency domain signal to the error correction circuit 9. Thereafter, the processing returns to step S11 of FIG. 13 to carry out the processes at the steps beginning with step S11.

By the processes described above, deterioration of the reception performance can be prevented.

<Modifications>

Figure 15:
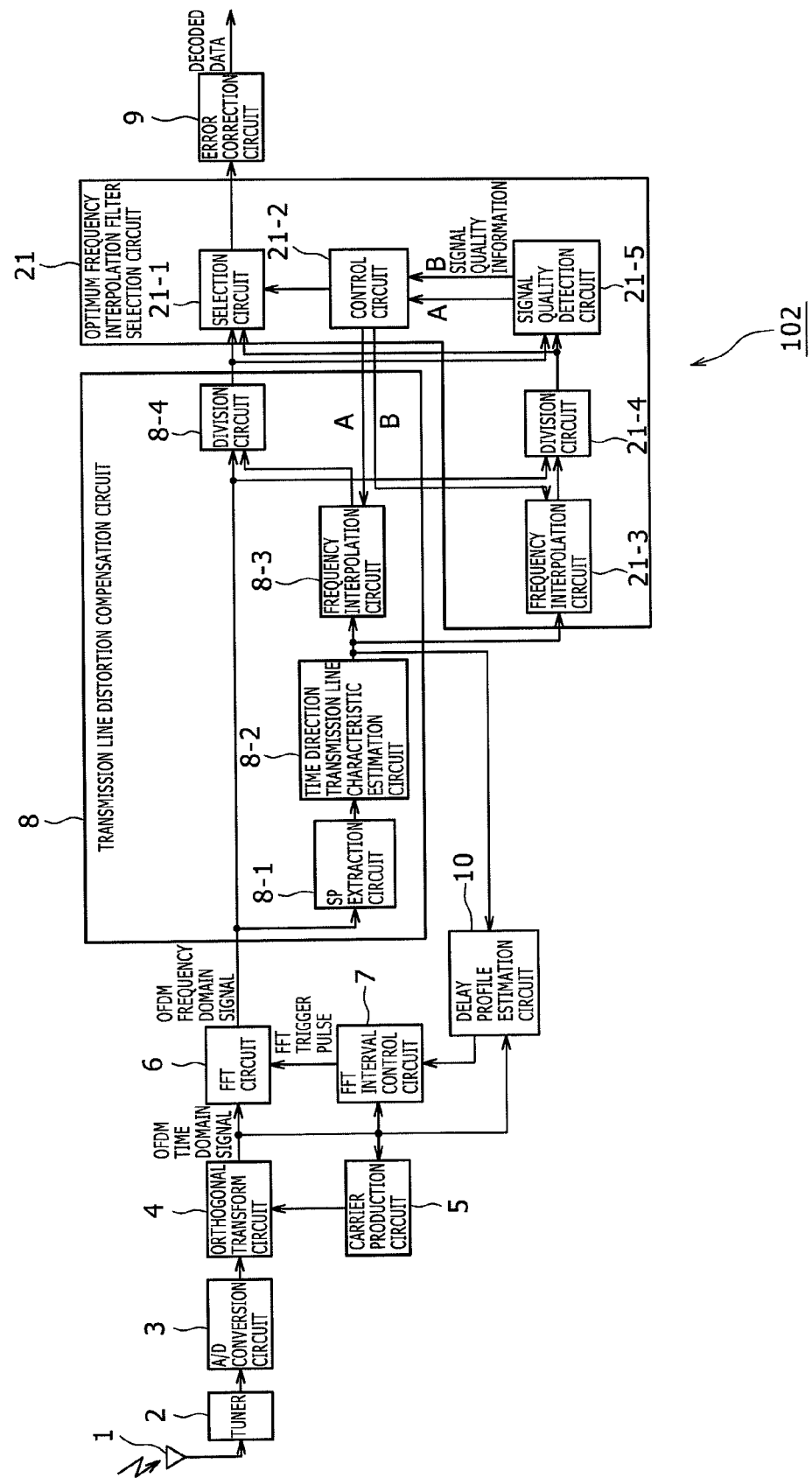
FIG. 15 is a block diagram showing another example of a configuration of a modified form of the OFDM receiver of FIG. 7.

FIG. 15 shows an example of a configuration of a modified OFDM receiver.

Referring to FIG. 15, the modified OFDM receiver 102 is common in configuration to the OFDM receiver 101 of FIG. 7 except that it does not include the frequency interpolation filter selection circuit 11. In particular, in the OFDM receiver 101 of FIG. 7, a filter selection signal indicating that a filter band same as a filter band selected by the frequency interpolation filter selection circuit 11 based on a delay profile estimated by the delay profile estimation circuit 10 should be selected is suitably outputted from the selection circuit 21-1 in accordance with the selection sequence described hereinabove with reference to FIG. 9. However, in the modified OFDM receiver 102, a filter band is normally selected by the control circuit 21-2 itself. The selection of a filter band by the control circuit 21-2 itself is carried out with reference to signal quality information NPWR_A and NPWR_B.

Also where the frequency interpolation filter selection circuit 11 is not provided in this manner, an optimum OFDM frequency domain signal can be selected from between an OFDM frequency domain signal outputted from the division circuit 8-4 and another OFDM frequency domain signal outputted from the division circuit 21-4 based on the quality. Consequently, deterioration of the reception performance can be prevented.

Although it is described above that the frequency interpolation circuit 8-3 and the frequency interpolation circuit 21-3 can be implemented by a single circuit and the division circuit 8-4 and the division circuit 21-4 can be implemented by a single circuit, conversely a signal quality detection circuit for detecting the quality of an OFDM frequency domain signal produced by the division circuit 8-4 and another signal quality detection circuit for detecting the quality of an OFDM frequency domain signal produced by the division circuit 21-4 may be implemented by separate circuits from each other.

In particular, if a plurality of interpolation filters having different filter bands are used to carry out an interpolation process, a plurality of transmission line characteristics can be obtained for all subcarriers, and if transmission line distortion compensation is carried out based on the plural transmission line characteristics, then a plurality of signals after transmission line distortion compensation can be obtained. Besides, merely if the quality of each of the signals after the transmission line distortion compensation can be detected, the frequency interpolation circuit, division circuit and signal quality detection circuit may be implemented in any form.

Further, as a signal of an object for detection of the quality, not a signal after compensation for or equalization of transmission line distortion but a signal after error correction may be used.

Further, not the method of producing two signals after transmission line distortion compensation and selecting one of the two signals but another method of producing three or more signals and selecting one of the signals which has the highest quality may be used.

Second Embodiment

While the foregoing description relates to a case wherein the width of the passband or filter band of an interpolation filter is adjusted to improve the signal quality, the center position or center frequency of the passband may be adjusted in addition to the width of the passband.

FIGS. 16A to 16D illustrate the signal quality where the width of the passband of an interpolation filter is variable while the center position of the passband is fixed.

In FIGS. 16A to 16D, the horizontal direction indicates the time direction and the vertical direction indicates the power of the path. An upwardly directed void triangle represents the position of the center of the passband of an interpolation filter.

Figure 16A:
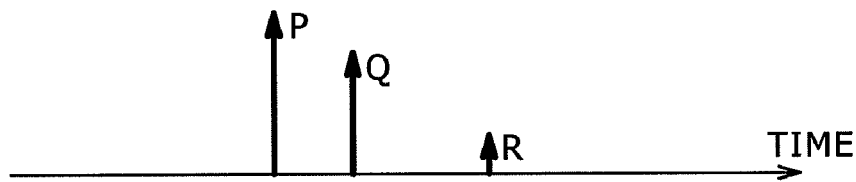
FIGS. 16A to 16D, 17A to 17D and 18A to 18B are diagrammatic views illustrating different examples of signal quality.

FIG. 16A illustrates an example of a profile of a reception signal. The reception signal is received through paths P, Q and R.

Figure 16B:
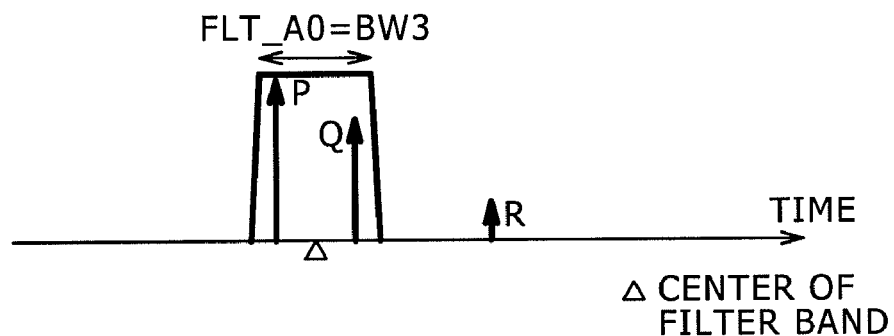
Figure 16C:
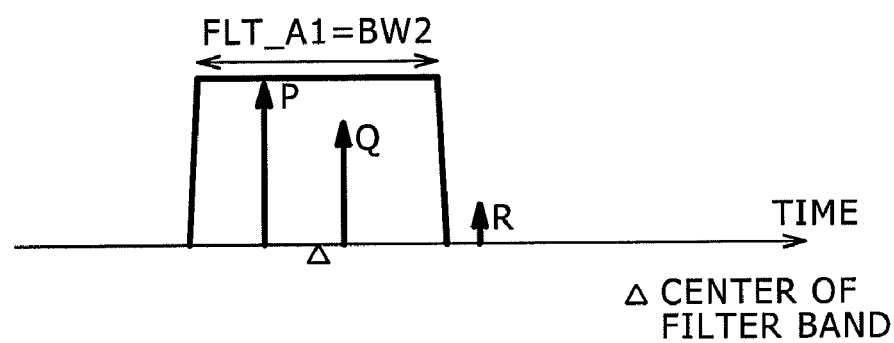

If such an interpolation filter which may not include some of the paths in the passband thereof is applied as seen in FIG. 16B or 16C, then the quality of a finally obtained OFDM frequency domain signal after distortion correction is inferior to the signal quality obtained where an interpolation filter is applied so as to include all paths.

Figure 16D:
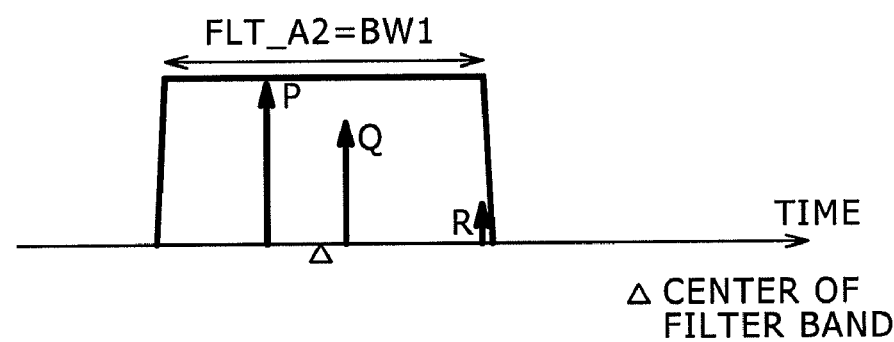

An example wherein an interpolation filter is applied so that all paths are included in the passband is illustrated in FIG. 16D. The quality of the OFDM frequency domain signal after distortion correction is best among the signal qualities obtained using the interpolation filters for the bands BW3, BW2 and BW1.

FIGS. 17A to 17D illustrate the signal quality where the width of the passband of an interpolation filter is fixed to BW2 while the center position of the passband is variable.

Figure 17A:
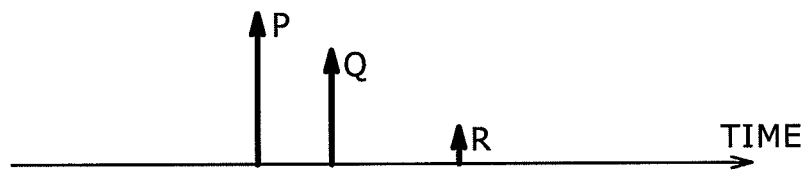

FIG. 17A illustrates the same paths P, Q and R as those of FIG. 16A.

Figure 17B:
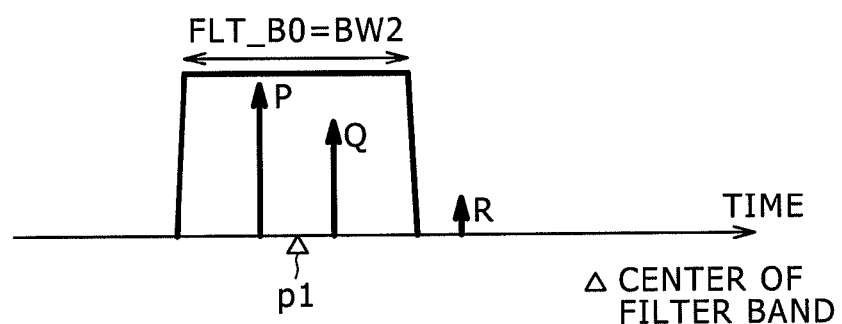

If an interpolation filter is applied such that the position p1 shown in FIG. 17B may become the center position of the passband, then the passband does not include the path R.

Figure 17C:
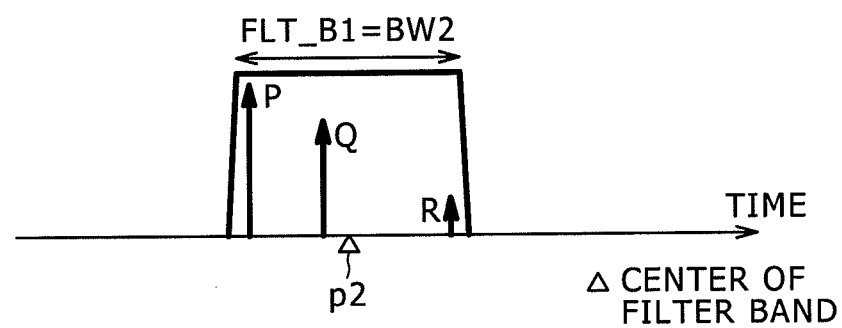

If an interpolation filter is applied such that the position p2 shown in FIG. 17C displaced a little in the rightward direction from the position p1 may become the center position of the passband, then all of the paths P, Q and R are included in the passband. The quality of the OFDM frequency domain signal after distortion correction is improved in comparison with the signal quality in an alternative case wherein the center position of the passband is set to a position with which all paths are not included in the passband as seen in FIG. 17B or the like.

Figure 17D:
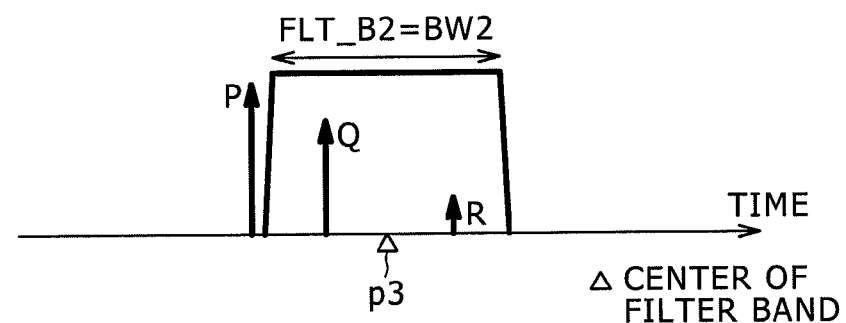

If an interpolation filter is applied such that the position p3 shown in FIG. 17D displaced a little in the rightward direction from the position p2 may become the center position of the passband, the path P is excluded from the passband.

In both of the case of FIGS. 16A to 16D wherein the width of the passband of the application filter is variable and the center position of the passband is fixed and the case of FIGS. 17A to 17D wherein the width of the passband is fixed and the center position of the passband is variable, usually all paths can be included in the passband depending upon the manner of adjustment.

Figure 18A:
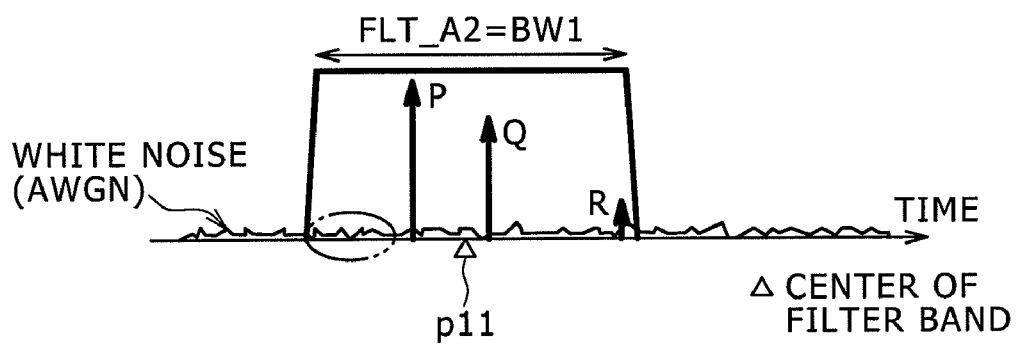
Figure 18B:
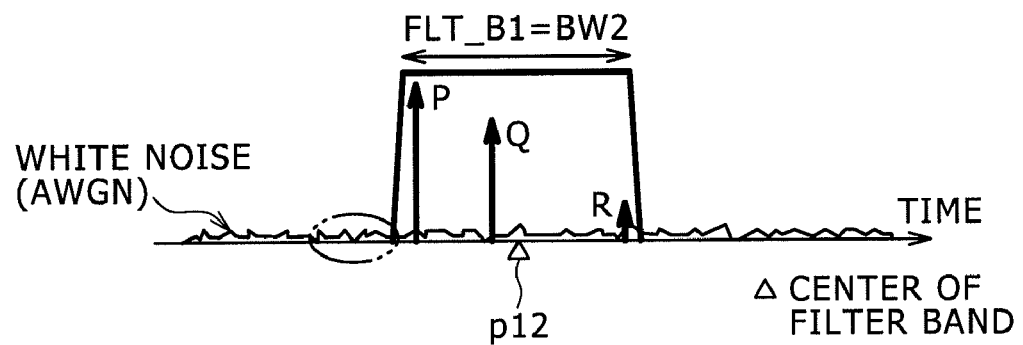

FIGS. 18A and 18B illustrate the signal quality where both of the width and the center position of the passband of an interpolation filter are variable.

FIG. 18A illustrates an example wherein an application filter is applied such that the width of the passband is BW1 and the center position of the passband is a position p11.

FIG. 18B illustrates another example wherein an application filter is applied such that the width of the passband is BW2 and the center position of the passband is a position p12 displaced a little in the rightward direction from the position p11.

Although all paths can be included in the passbands of the interpolation filters of FIGS. 18A and 18B, where the qualities of OFDM frequency domain signals after distortion corrections obtained using the interpolation filters are compared with each other, the signal quality where the interpolation filter of FIG. 18B is used is better.

This is because white noise is actually superposed over an overall area as seen from FIGS. 18A and 18B and it is desirable to set an interpolation filter whose passband includes such white noise as little as possible. Where the interpolation filter of FIG. 18A and the interpolation filter of FIG. 18B are compared with each other, the amount of white noise included in the passband of the interpolation filter of FIG. 18B is smaller by an amount of white noise included in a range surrounded by an alternate long and short dash line.

In the receiver described below, an interpolation filter is set such that it has a passband which includes all paths but includes white noise as little as possible.

Figure 19:
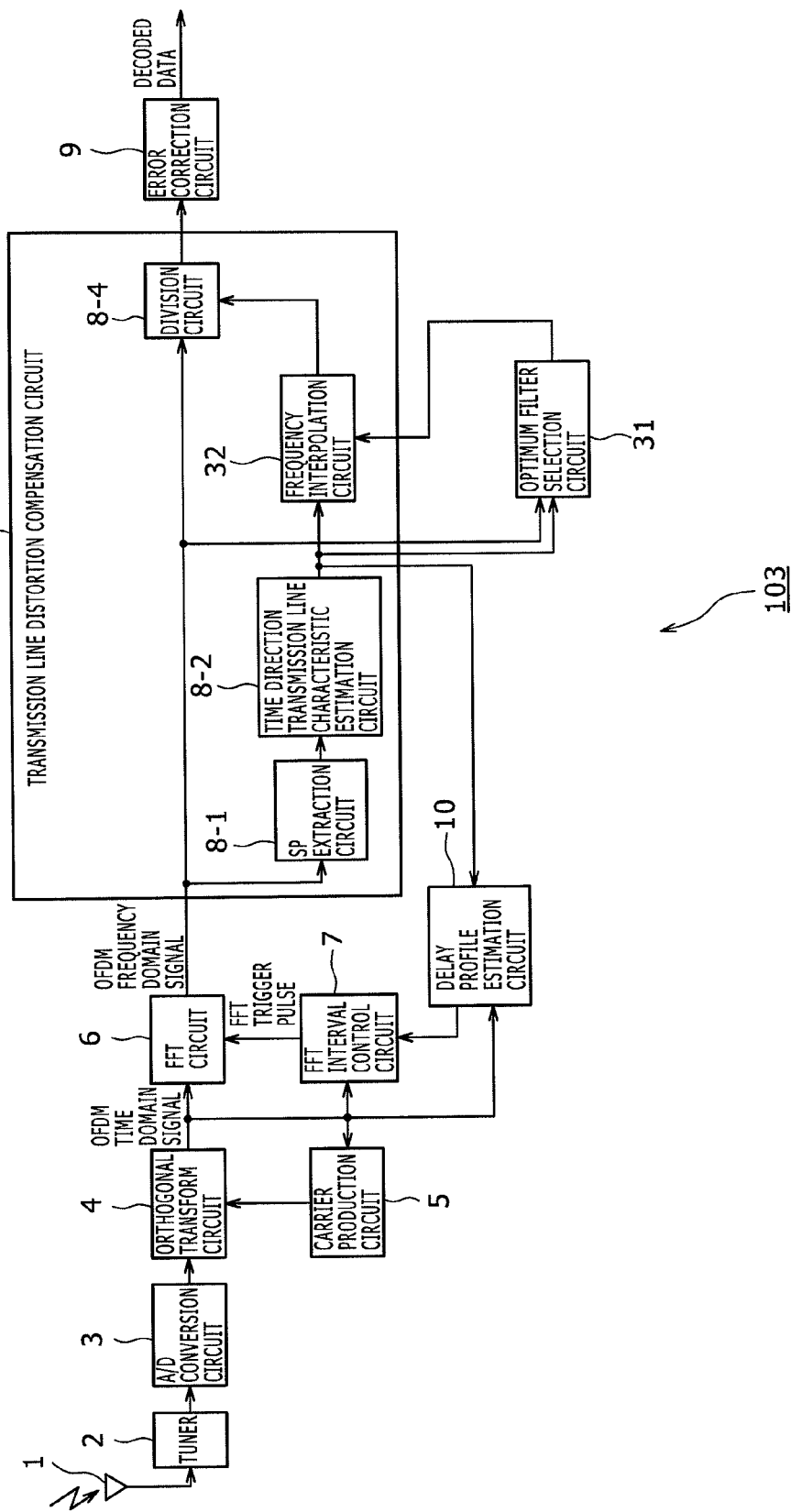
FIG. 19 is a block diagram showing an example of a configuration of an OFDM receiver according to a second embodiment of the present invention.

FIG. 19 shows an example of a configuration of an OFDM receiver 103 according to the second embodiment of the present invention.

Referring to FIG. 19, the OFDM receiver 103 has a configuration similar to but different from that of the OFDM receiver 101 described hereinabove with reference to FIG. 7 principally in that it does not include the frequency interpolation filter selection circuit 11 and includes an optimum filter coefficient selection circuit 31 in place of the optimum frequency interpolation filter selection circuit 21. Further, the transmission line distortion compensation circuit 8 includes, as a circuit for carrying out a frequency interpolation process for interpolating a transmission line characteristic in the frequency direction, a frequency interpolation circuit 32 for changing the width and the center position of the passband of an interpolation filter in accordance with a coefficient to carry out a frequency interpolation process.

The tuner 2 frequency converts an RF signal received by the reception antenna 1 into an IF signal and outputs the IF signal to the A/D conversion circuit 3.

The A/D conversion circuit 3 carries out A/D conversion for the IF signal and outputs a resulting digital IF signal to the orthogonal demodulation circuit 4.

The orthogonal demodulation circuit 4 carries out orthogonal demodulation using a carrier supplied thereto from the carrier production circuit 5 to acquire an OFDM time domain signal and outputs the acquired OFDM time domain signal.

The carrier production circuit 5 produces a carrier of a predetermined frequency and outputs the produced carrier to the orthogonal demodulation circuit 4.

The FFT circuit 6 sets an FFT interval based on an FFT trigger pulse supplied thereto from the FFT interval control circuit 7 and carries out an FFT mathematical operation for the OFDM time domain signal within the FFT interval. The FFT circuit 6 outputs an OFDM frequency domain signal representative of data orthogonally modulated in the subcarrier extracted by the FFT mathematical operation to the SP extraction circuit 8-1, division circuit 8-4 and optimum filter coefficient selection circuit 31.

The FFT interval control circuit 7 determines an FFT interval based on a delay profile estimated by the delay profile estimation circuit 10 and outputs an FFT trigger pulse to the FFT circuit 6.

The SP extraction circuit 8-1 of the transmission line distortion compensation circuit 8 extracts an SP signal from the OFDM frequency domain signal and estimates a transmission characteristic corresponding to the SP signal. The SP extraction circuit 8-1 outputs transmission line characteristic data representative of the estimated transmission line characteristic to the time direction transmission line characteristic estimation circuit 8-2.

The time direction transmission line characteristic estimation circuit 8-2 estimates a transmission line characteristic of the subcarrier, at which the SP signal is arranged, at the position of each of the OFDM symbols juxtaposed in the time direction. The time direction transmission line characteristic estimation circuit 8-2 outputs time direction characteristic estimation data representative of the transmission line characteristic for every three subcarriers to the optimum filter coefficient selection circuit 31, frequency interpolation circuit and delay profile estimation circuit 10.

The frequency interpolation circuit 32 changes the width and the center position of the passband of the interpolation filter based on a coefficient supplied from the optimum filter coefficient selection circuit 31 to carry out a frequency interpolation process.

Figure 20:
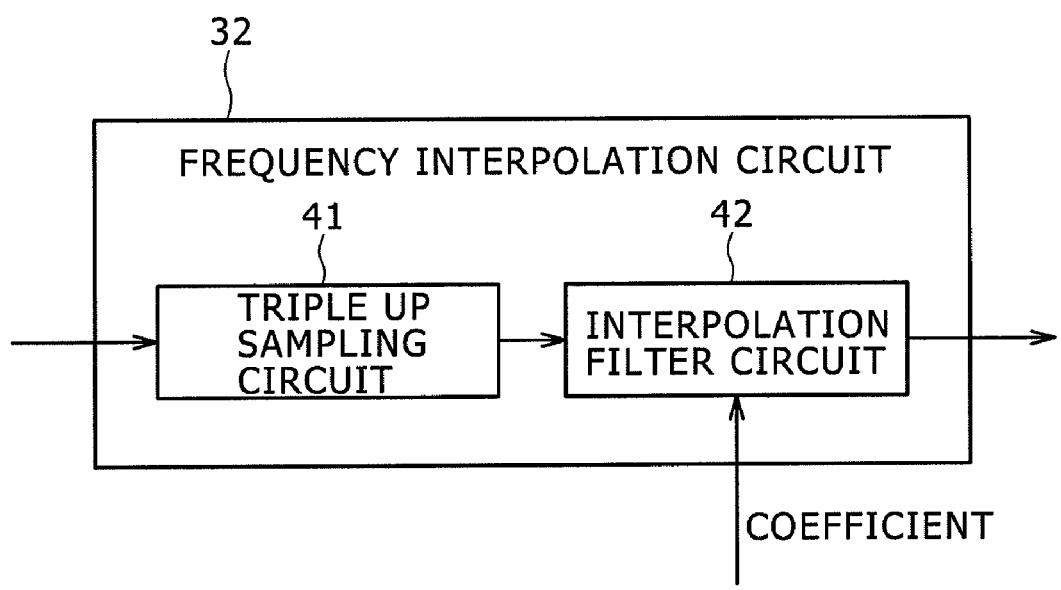
FIG. 20 is a block diagram showing an example of a configuration of a frequency interpolation circuit shown in FIG. 19.

FIG. 20 shows an example of a configuration of the frequency interpolation circuit 32.

Referring to FIG. 20, the frequency interpolation circuit 32 includes a triple up sampling circuit 41 and a interpolation filter circuit 42.

The triple up sampling circuit 41 inserts, for example, two zeros as new sample values between each two adjacent sample values of time direction characteristic estimation data supplied from the time direction transmission line characteristic estimation circuit 8-2. The triple up sampling circuit 41 outputs the time direction characteristic estimation data, the number of whose sample values is increased to three times that of the original data, to the interpolation filter circuit 42.

The interpolation filter circuit 42 is composed of a low pass filter (LPF) which carries out filtering for interpolation of transmission line characteristics in the frequency direction and filters the time direction characteristic estimation data from the triple up sampling circuit 41. The width and the center position of the passband of the LPF or interpolation filter used for the filtering are adjusted with a coefficient supplied from the optimum filter coefficient selection circuit 31.

The interpolation filter circuit 42 uses the interpolation filter having the passband whose width and center position are adjusted to carry out filtering to remove reflection components produced in the time direction characteristic estimation data by the insertion of the zeros to determine transmission line characteristics interpolated in the frequency direction. The interpolation filter circuit 42 outputs frequency direction characteristic interpolation data representative of the transmission line characteristics interpolated in the frequency direction, that is, of the transmission characteristics of all subcarriers, to the division circuit 8-4.

If the effective symbol length which is the length of the interval where the guard interval is removed from one symbol is represented by Tu, for example, a width smaller than the width corresponding to approximately Tu/3 [seconds] is used as the width of the passband of the interpolation filter.

Now, the width of the passband of the interpolation filter is described.

Figure 21:
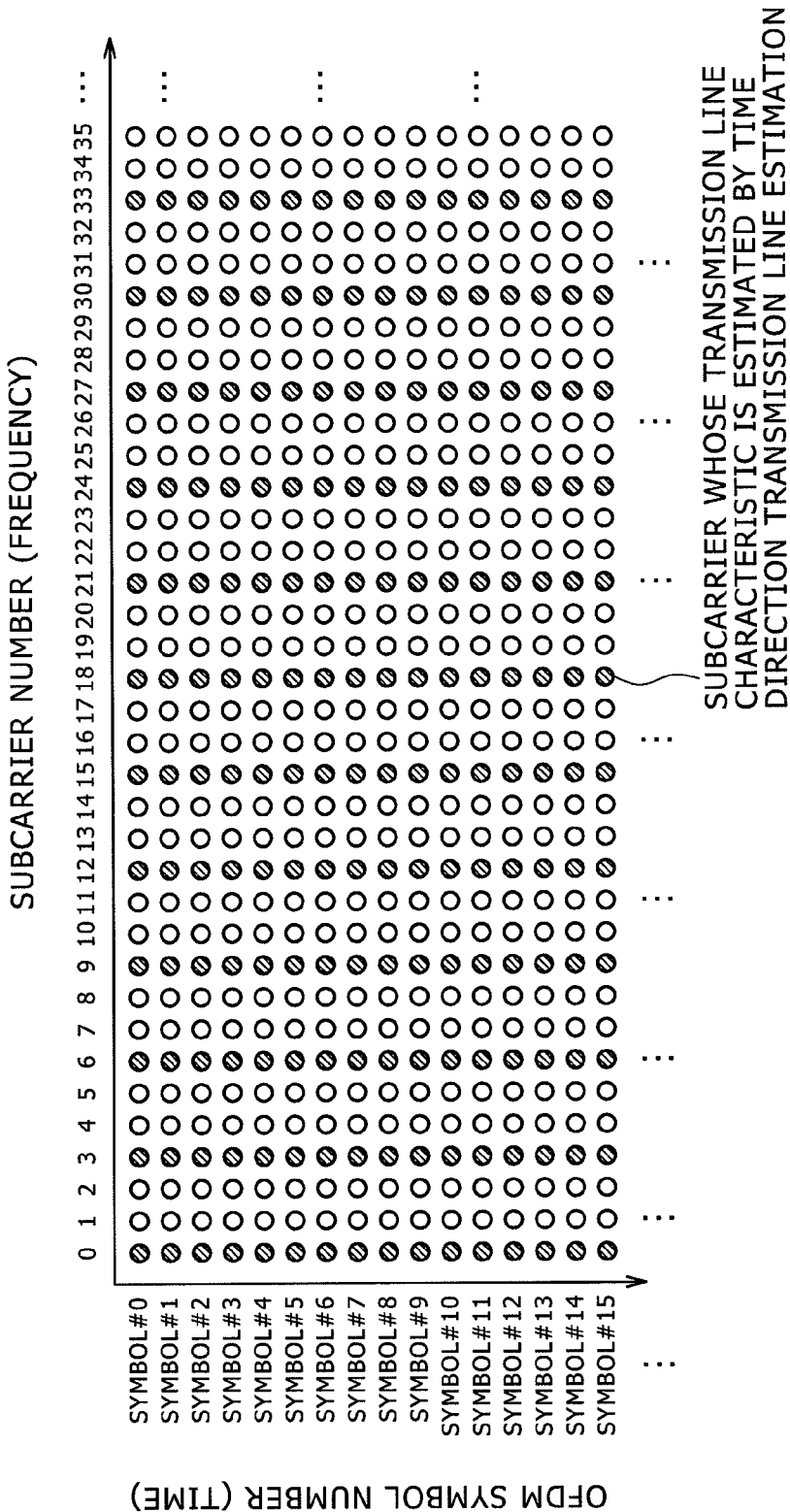
FIG. 21 is a view illustrating time direction characteristic estimation data.

FIG. 21 illustrates time direction characteristic estimation data.

Figure 1:
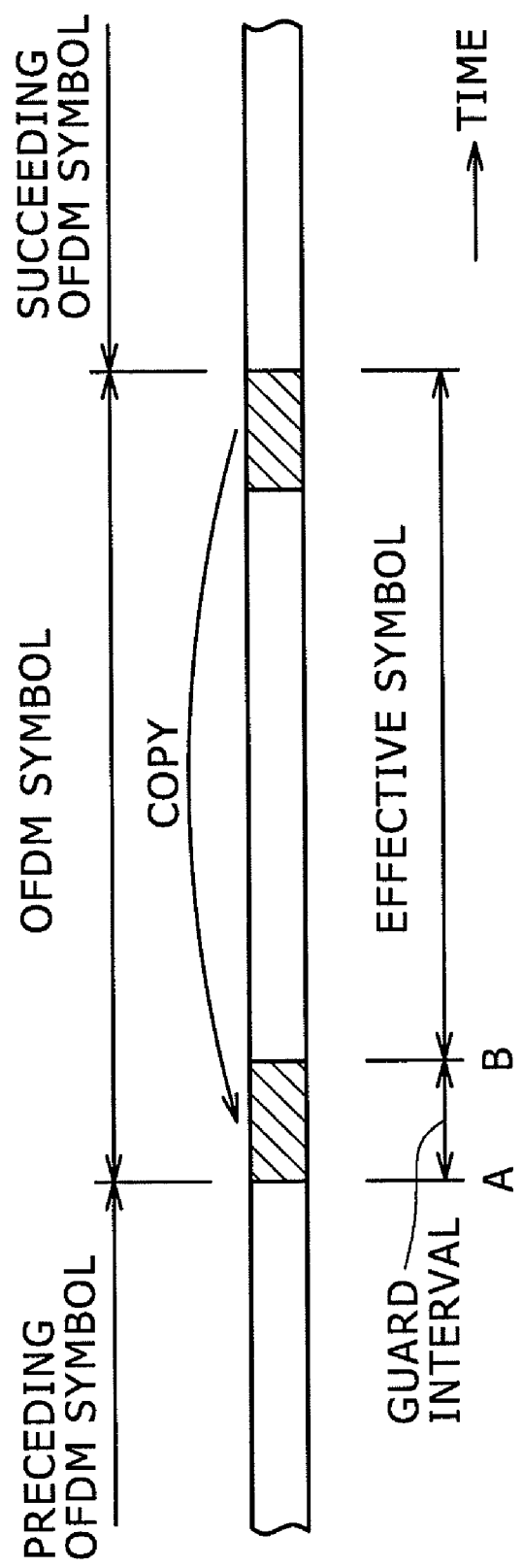
FIG. 1 is a diagrammatic view illustrating an OFDM symbol.
Figure 2:
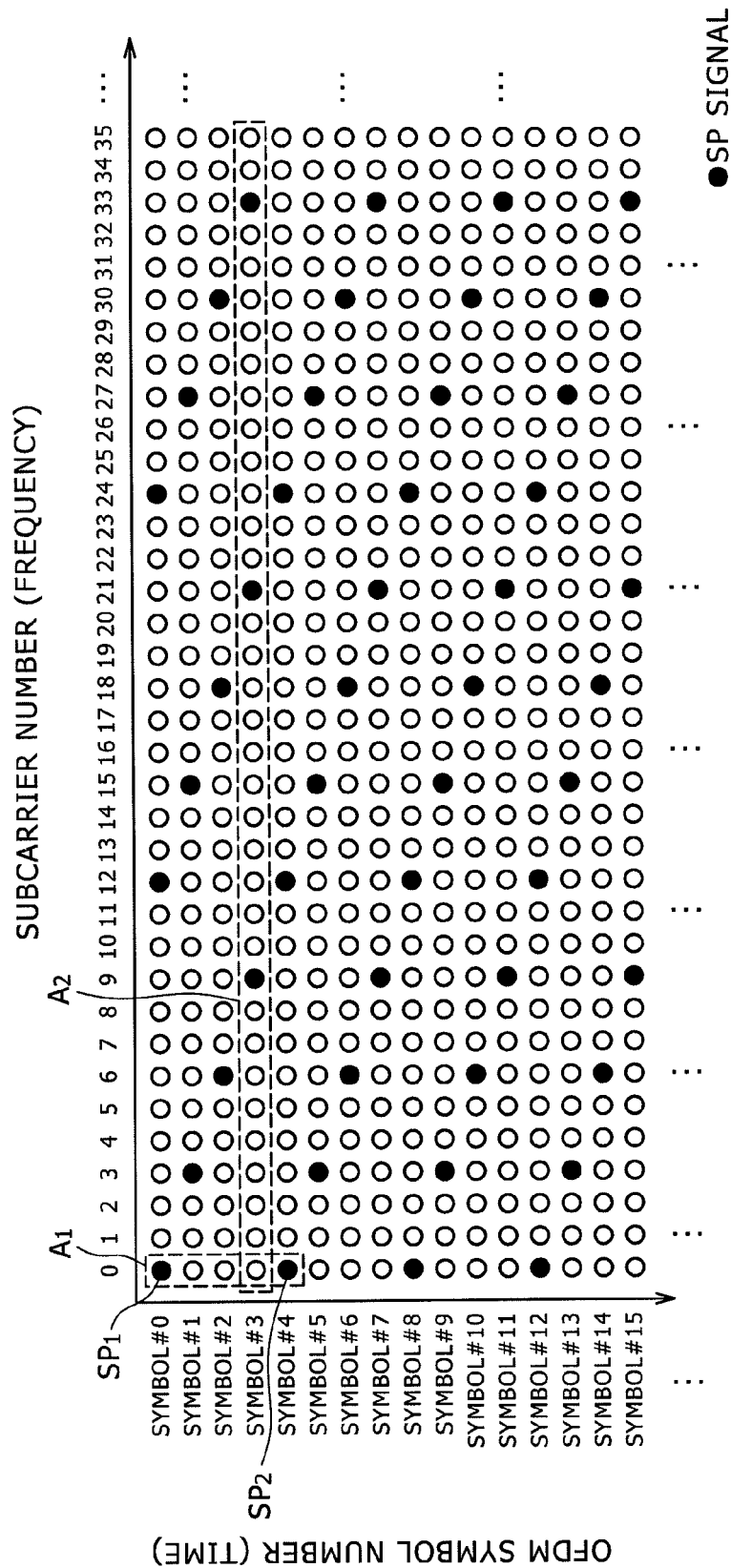
FIG. 2 is a view illustrating an example of arrangement of SP signals.

Such time direction characteristic estimation data as seen in FIG. 21 are determined using transmission line characteristic data regarding SP signals arranged in such a manner as seen in FIG. 2 by the time direction transmission line characteristic estimation circuit 8-2. Referring to FIG. 21, void circles and circles indicated by slanting lines represent subcarriers or transmission symbols of an OFDM signal. Meanwhile, the circles indicated by slanting lines represent transmission symbols whose transmission line characteristic is estimated after processing by the time direction transmission line characteristic estimation circuit 8-2.

Estimation of the transmission line characteristic is carried out in the time direction using transmission line characteristic data regarding SP signals to determine the transmission line characteristic for each OFDM symbol for every three subcarriers as seen in FIG. 21. Such time direction characteristic estimation data representative of transmission line characteristics as seen in FIG. 21 are supplied from the time direction transmission line characteristic estimation circuit 8-2 to the frequency interpolation circuit 32.

Figure 22:
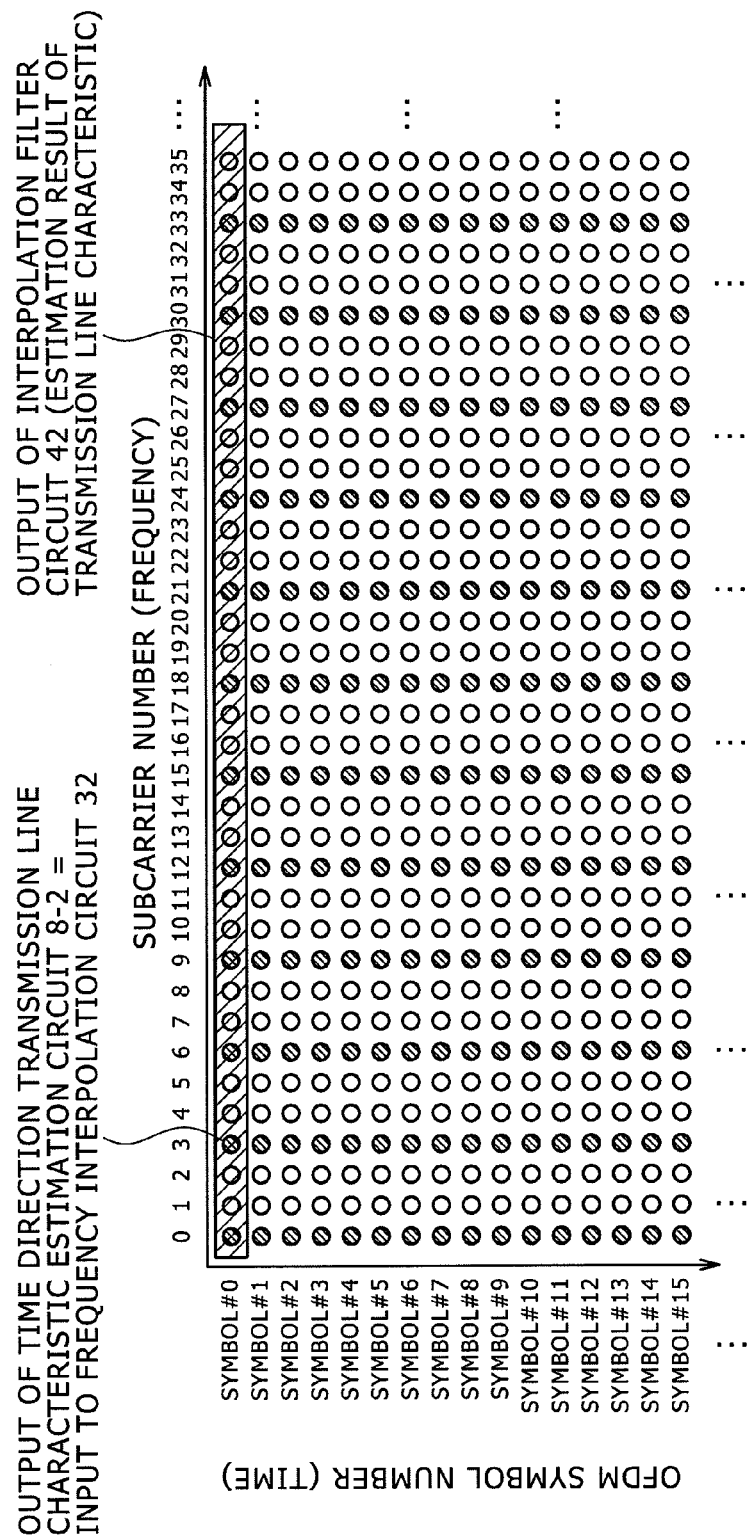
FIG. 22 is a similar view but illustrating frequency direction characteristic interpolation data.

FIG. 22 illustrates frequency direction characteristic interpolation data.

The frequency interpolation circuit 32 uses time direction characteristic estimation data representative of the transmission line characteristics for three subcarriers as a subcarrier number direction to determine transmission line characteristics of subcarriers of OFDM symbols indicated by a range to which slanting lines are applied in FIG. 22.

In particular, the triple up sampling circuit 41 inserts two zeros between each two adjacent sample values of the time direction characteristic estimation data to produce time direction characteristic estimation data the amount of which is increased to three times that of the original data.

The time direction characteristic estimation data inputted to the triple up sampling circuit 41 are such a sequence of sample values representative of transmission line characteristics for every three sub carriers as illustrated in FIG. 21. Accordingly, in the time direction characteristic estimation data, two subcarriers whose transmission characteristic is not estimated exist between each two adjacent subcarriers whose transmission characteristic is estimated. Therefore, the triple up sampling circuit 41 inserts two zeros which make sample points for the transmission line characteristic corresponding to the two subcarriers whose transmission line characteristic is not estimated.

It is to be noted that the number of zeros to be inserted depends upon for every what number of subcarriers the time direction characteristic estimation data obtained by the time direction transmission line characteristic estimation circuit 8-2 represent the transmission line characteristic.

Where two zeros are inserted between each two adjacent sample values of the time direction characteristic estimation data in this manner, the time direction characteristic estimation data obtained as a result of the insertion include reflection components in the time domain. In the following description, time direction characteristic estimation data in which zeros are inserted are suitably referred to as zero value interpolation characteristic data.

The reason why the time direction characteristic estimation data include reflection components is described.

The time direction characteristic estimation data are data determined from an OFDM frequency domain signal and are data in the frequency domain.

Then, the time direction characteristic estimation data and the zero value interpolation characteristic data obtained by insertion of zeros into the time direction characteristic estimation data are the same signal as analog signals. Data in the time domain of the time direction characteristic estimation data and data in the time domain of the zero value interpolation characteristic data include the same frequency components.

Further, the time direction characteristic estimation data are a sequence of sample values representative of transmission characteristics for every three subcarriers. Where the effective symbol length is represented by Tu [seconds] and the distance between the subcarriers is represented by Fc [Hz], the expression Fc=1/Tu [Hz] is satisfied. Therefore, the distance between sample values of the time direction characteristic estimation data which are a sequence of sample values representative of transmission line characteristics for every three subcarriers is 3Fc=3/Tu [Hz].

Therefore, the distance between sample values of the zero value interpolation characteristic data obtained by insertion of two zeros between each two adjacent sample values of the time direction characteristic estimation data is Fc=1/Tu [Hz].

Meanwhile, the time direction characteristic interpolation data wherein the distance between sample values is 3Fc=3/Tu [Hz] are, in the time domain, data whose one period is 1/3Fc=Tu/3 [seconds].

The zero value interpolation characteristic data wherein the distance between sample values is Fc=1/Tu [Hz] have, in the time domain, data whose one period is 1/Fc=Tu [seconds], that is, whose one period is three times the period of the time direction characteristic estimation data.

In this manner, data in the time domain of zero value interpolation data which include frequency components same as those of data in the time domain of time direction characteristic estimation data and whose one period is three times the frequency of the data in the time domain data of the time direction characteristic estimation data include repetitions by three times of the data in the time domain of the time direction characteristic estimation data.

Figure 23:
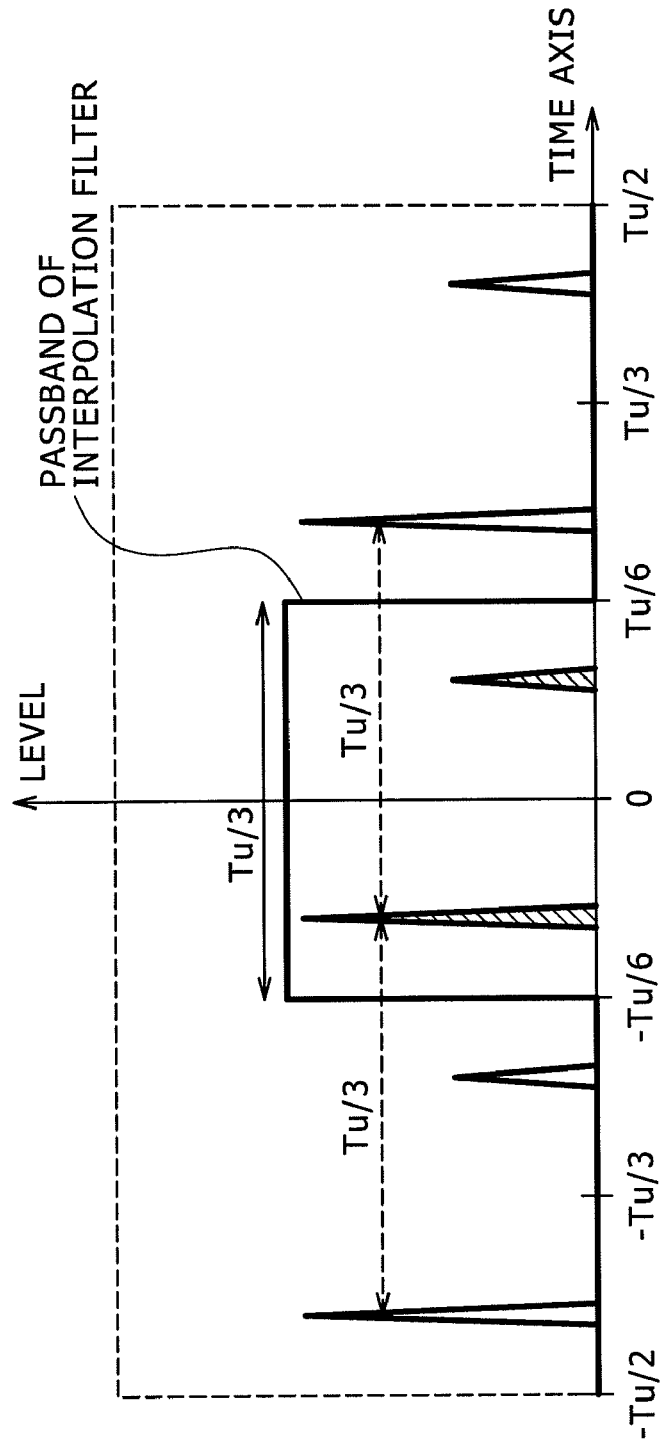
FIG. 23 is a diagrammatic view illustrating an example of data in the time domain of 0-value insertion characteristic data.

FIG. 23 illustrates an example of data in the time domain of the zero value interpolation characteristic data.

Here, description is given of a case wherein two paths for a main wave and a delay wave exist. In FIG. 23, the axis of abscissa indicates the time and the axis of ordinate indicates the power level of the paths.

Where the zero value interpolation characteristic data whose period is Tu [seconds] are viewed in the time domain, they include repetitions by three times of multipaths corresponding to time direction characteristic estimation data whose period is Tu/3 [seconds].

Now, if it is assumed to extract multipaths at the center indicated by slanting lines in FIG. 23 as frequency direction characteristic interpolation data, then it is necessary to remove the other multipaths in order to obtain the desired multipaths corresponding to the frequency direction characteristic interpolation data.

Therefore, the interpolation filter circuit 42 filters the zero value interpolation characteristic data to remove multipaths other than the desired multipaths to extract the desired multipaths corresponding to the frequency direction characteristic interpolation data.

It is to be noted that the zero value interpolation characteristic data are data in the frequency domain, and the filtering of the zero value interpolation characteristic data by the interpolation filter circuit 42 is convolution of the filter coefficient of the interpolation filter and the zero value interpolation characteristic data which are data in the frequency domain.

Since convolution in the frequency region is multiplication by a window function in the frequency domain, the filtering of the zero value interpolation characteristic data can be represented, in the time domain, as multiplication of the zero value interpolation characteristic data and the window function corresponding to the passband of the interpolation filter circuit 42. The window function represented by thick lines in FIG. 23 represents a function corresponding to the passband of the interpolation filter circuit 42, which is used for multiplication as the filtering of the zero value interpolation characteristic data.

The period of the multipaths repeated three times is Tu/3 [seconds]. Therefore, for example, if the interpolation filter is set as an LPF whose passband is a band from −Tu/6 to +Tu/6 having a width equal to the period Tu/3 [seconds] of the multipaths repeated three times, then the desired multipaths corresponding to the frequency direction characteristic interpolation data can be extracted.

The width Tu/3 of the passband of the interpolation filter which is used suitably in the interpolation filter circuit 42 depends upon for every what number of subcarriers a transmission line characteristic can be determined by estimation of the transmission line characteristic in the time direction in this manner.

The interpolation filter circuit 42 outputs a result of estimation of the transmission line characteristics of all subcarriers estimated by the frequency interpolation process to the division circuit 8-4 of FIG. 19.

Referring back to FIG. 19, the division circuit 8-4 corrects distortion included in the OFDM frequency domain signal to carry out equalization based on the transmission characteristics of all subcarriers supplied from the frequency interpolation circuit 32. The division circuit 8-4 outputs the OFDM frequency domain signal whose distortion is corrected, that is, the OFDM frequency domain signal after the transmission line distortion compensation, to the error correction circuit 9.

Distortion arising from multipaths or the like from which an OFDM signal suffers in a transmission line is multiplication to the OFDM signal. Correction of the distortion from which the OFDM suffers in the transmission line is implemented by dividing the actually received OFDM signal by the transmission line characteristic.

The error correction circuit 9 outputs data obtained by application of various processes as decoded data to the circuit on the succeeding stage.

The delay profile estimation circuit 10 estimates a delay profile of the transmission line and outputs the delay profile to the FFT interval control circuit 7.

The optimum filter coefficient selection circuit 31 tries a frequency interpolation process in a plurality of conditions using interpolation filters which are different in width and center position of the passband. For example, the optimum filter coefficient selection circuit 31 tries a frequency interpolation process in various conditions wherein the center position of the passbands of, for example, the filter bands BW0 to BW3 of FIG. 5 is successively displaced by a predetermined width.

Further, the optimum filter coefficient selection circuit 31 corrects the distortion of the OFDM frequency domain signal supplied from the FFT circuit 6 based on the transmission characteristics of all subcarriers determined by trying the frequency interpolation. The optimum filter coefficient selection circuit 31 calculates the quality of the OFDM frequency domain signals whose distortion is corrected.

The optimum filter coefficient selection circuit 31 selects the interpolation filter which exhibits the best quality and outputs a coefficient representative of the width and the center position of the passband of the selected interpolation filter to the frequency interpolation circuit 32.

In particular, the optimum filter coefficient selection circuit 31 determines, for example, for each symbol, the width and the center position of the interpolation filter with which a signal of the best quality can be obtained.

Figure 24:
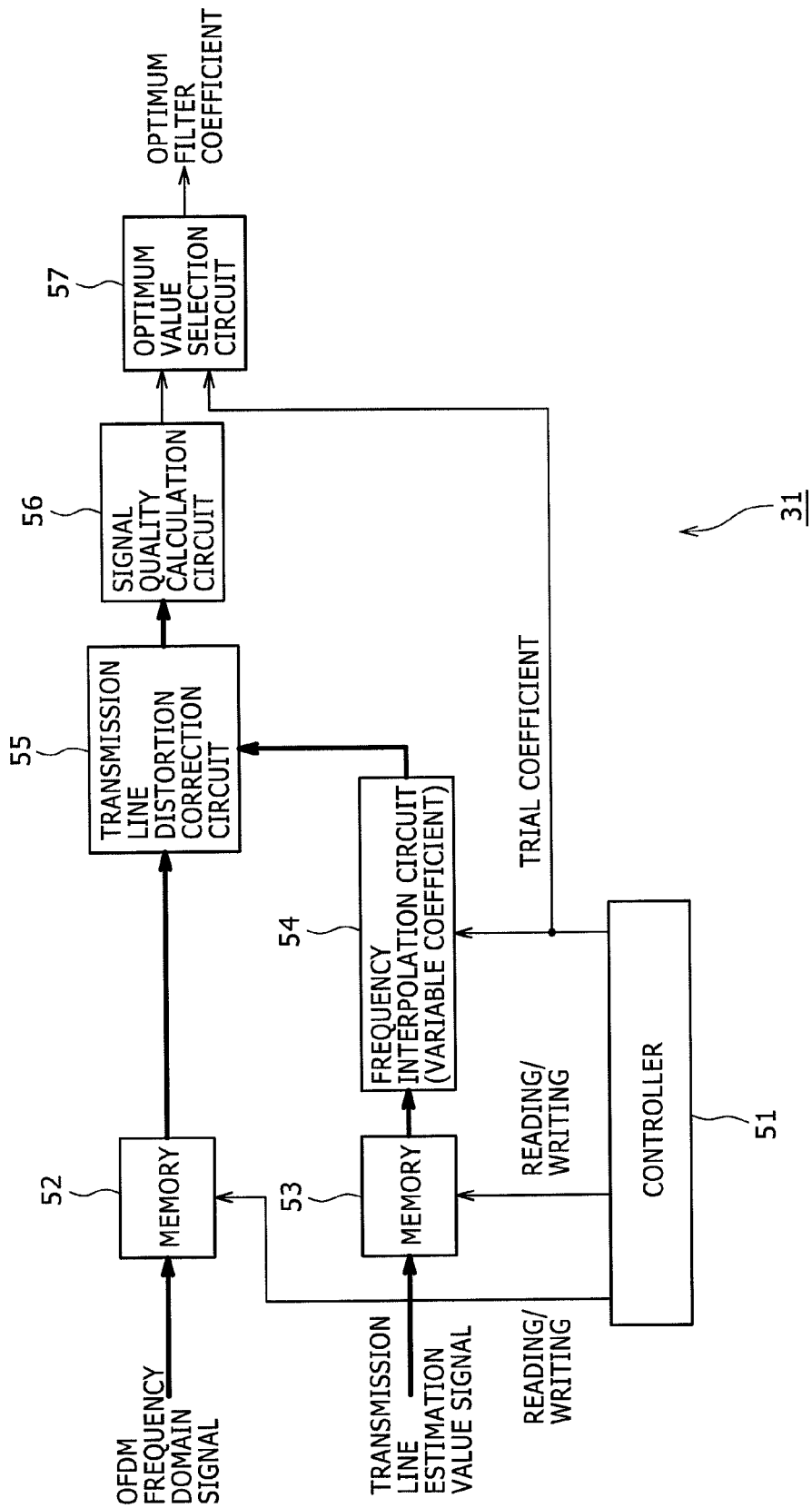
FIG. 24 is a block diagram showing an example of a configuration of an optimum filter coefficient selection circuit shown in FIG. 19.

FIG. 24 shows an example of a configuration of the optimum filter coefficient selection circuit 31.

Referring to FIG. 24, the optimum filter coefficient selection circuit 31 controls writing and reading out of memories 52 and 53 so as to store data of the same symbol and read out the stored data of the same symbol. Further, a controller 51 outputs a trial coefficient representative of the width and the center position of the passband of an interpolation filter for trial to a frequency interpolation circuit 54 and an optimum value selection circuit 57.

The memory 52 stores OFDM frequency domain signals supplied from the FFT circuit 6 for one symbol under the control of the controller 51. The OFDM frequency domain signals for one symbol stored in the memory 52 are read out by a transmission line distortion correction circuit 55.

The memory 53 stores OFDM time domain signals, which are data representative of transmission line characteristics for every three subcarriers estimated by the time direction transmission line characteristic estimation circuit 8-2, for one symbol under the control of the controller 51. The time direction characteristic estimation data for one symbol stored in the memory 53 are read out by the frequency interpolation circuit 54.

The frequency interpolation circuit 54 has a configuration similar to that of the frequency interpolation circuit 32 of FIG. 20. The frequency interpolation circuit 54 up samples sample values of the time direction characteristic estimation data to three times and carries out a frequency interpolation process using an interpolation filter wherein the width and the center position of the passband are adjusted in accordance with the trial coefficients supplied from the controller 51.

The frequency interpolation circuit 54 outputs the transmission line characteristics of all subcarriers obtained by the carrying out the frequency interpolation process to the transmission line distortion correction circuit 55.

The frequency interpolation circuit 54 carries out a frequency interpolation process for the data obtained from the same symbol by a plural number of times changing the width and the center position of the passband of the interpolation filter and outputs transmission characteristics obtained by the frequency interpolation processes. Since a path may be included or may not be included in the passband of the interpolation filter depending upon the width and the center position of the passband as described hereinabove, the transmission line characteristic determined by the frequency interpolation process differs suitably for each trial coefficient set by the controller 51.

The transmission line distortion correction circuit 55 corrects, every time a transmission line characteristic is supplied from the frequency interpolation circuit 54, the distortion of the transmission line included in the OFDM frequency domain signals of one symbol read out from the memory 52. The transmission line distortion correction circuit 55 outputs the OFDM frequency domain signal whose distortion is corrected to a signal quality calculation circuit 56.

The signal quality calculation circuit 56 calculates, every time OFDM frequency domain signals of one symbol are supplied thereto from the transmission line distortion correction circuit 55, the quality of the OFDM frequency domain signals and outputs the calculated quality as a trial result to the optimum value selection circuit 57. For example, the signal quality calculation circuit 56 calculates the power of noise included in the OFDM frequency domain signal and outputs the value of the power.

The optimum value selection circuit 57 successively stores the qualities calculated by the signal quality calculation circuit 56 until the trial for all patterns is completed by varying the width and the center position of the passband of the interpolation filter with regard to the OFDM frequency domain signals of the one symbol of the object.

When the optimum value selection circuit 57 acquires the trial results of all patterns, it selects an interpolation center used for the production of the OFDM frequency domain signal which has the best quality and specifies the width and the center position of the passband of the selected interpolation filter. The optimum value selection circuit 57 thus specifies, regarding the OFDM frequency domain signals of the one symbol of the object, what width the transmission band of the interpolation process used should have and what position should be selected as the center position of the passband in order to obtain a signal of the best quality.

The optimum value selection circuit 57 outputs a coefficient representative of the width and the center position of the selected interpolation filter to the frequency interpolation circuit 32.

In the following description, an interpolation filter used to produce an OFDM frequency domain signal of the best quality is suitably referred to as optimum filter. The frequency interpolation circuit 32 uses an interpolation filter having a characteristic same as that of the optimum filter with regard to the width and the center position of the passband, that is, an interpolation filter having a passband of the same width and the same center position.

[Operation of the Receiver]

Now, operation of the OFDM receiver 103 having such a configuration as described above is described.

First, a reception process of the OFDM receiver 103 is described with reference to FIG. 25.

The processes at steps of the flow chart may be carried out in order of the step number or may be carried out suitably in parallel to processing at another step.

At step S51, the tuner 2 frequency converts an RF signal received by the reception antenna 1 and outputs a resulting IF signal to the A/D conversion circuit 3.

At step S52, the A/D conversion circuit 3 carries out A/D conversion for the IF signal and outputs a resulting digital IF signal.

At step S53, the orthogonal demodulation circuit 4 carries out orthogonal demodulation and outputs a resulting OFDM time domain signal.

At step S54, the FFT circuit 6 carries out FFT mathematical operation under the control of the FFT interval control circuit 7 and outputs an OFDM frequency domain signal.

At step S55, the SP extraction circuit 8-1 extracts SP signals from the OFDM frequency domain signal to estimate a transmission line characteristic of the subcarrier corresponding to each SP signal.

At step S56, the time direction transmission line characteristic estimation circuit 8-2 estimates the transmission line characteristics for every three subcarriers and outputs time direction characteristic estimation data.

At step S57, the delay profile estimation circuit 10 estimates a delay profile based on the time direction characteristic estimation data.

At step S58, the optimum filter coefficient selection circuit 31 carries out a filter coefficient selection process. The coefficient selected by the filter coefficient selection process is outputted to the frequency interpolation circuit 32. The filter coefficient selection process is hereinafter described with reference to FIG. 26.

At step S59, the FFT interval control circuit 7 controls FFT mathematical operation by the FFT circuit 6.

At step S60, the frequency interpolation circuit 32 carries out up sampling of sample values of the time direction characteristic estimation data and carries out a frequency interpolation process using an interpolation filter wherein the width and the center position of the passband are adjusted based on the coefficient selected by the filter coefficient selection process.

At step S61, the division circuit 8-4 corrects the distortion included in the OFDM frequency domain signal based on the transmission characteristics of all subcarriers obtained by the frequency interpolation process.

At step S62, the error correction circuit 9 carries out such processes as error correction for the OFDM frequency domain signal whose distortion is corrected and outputs resulting decoded data.

The processes described above are repeated by the OFDM receiver 103 while the OFDM receiver 103 carries out reception of a signal.

Figure 25:
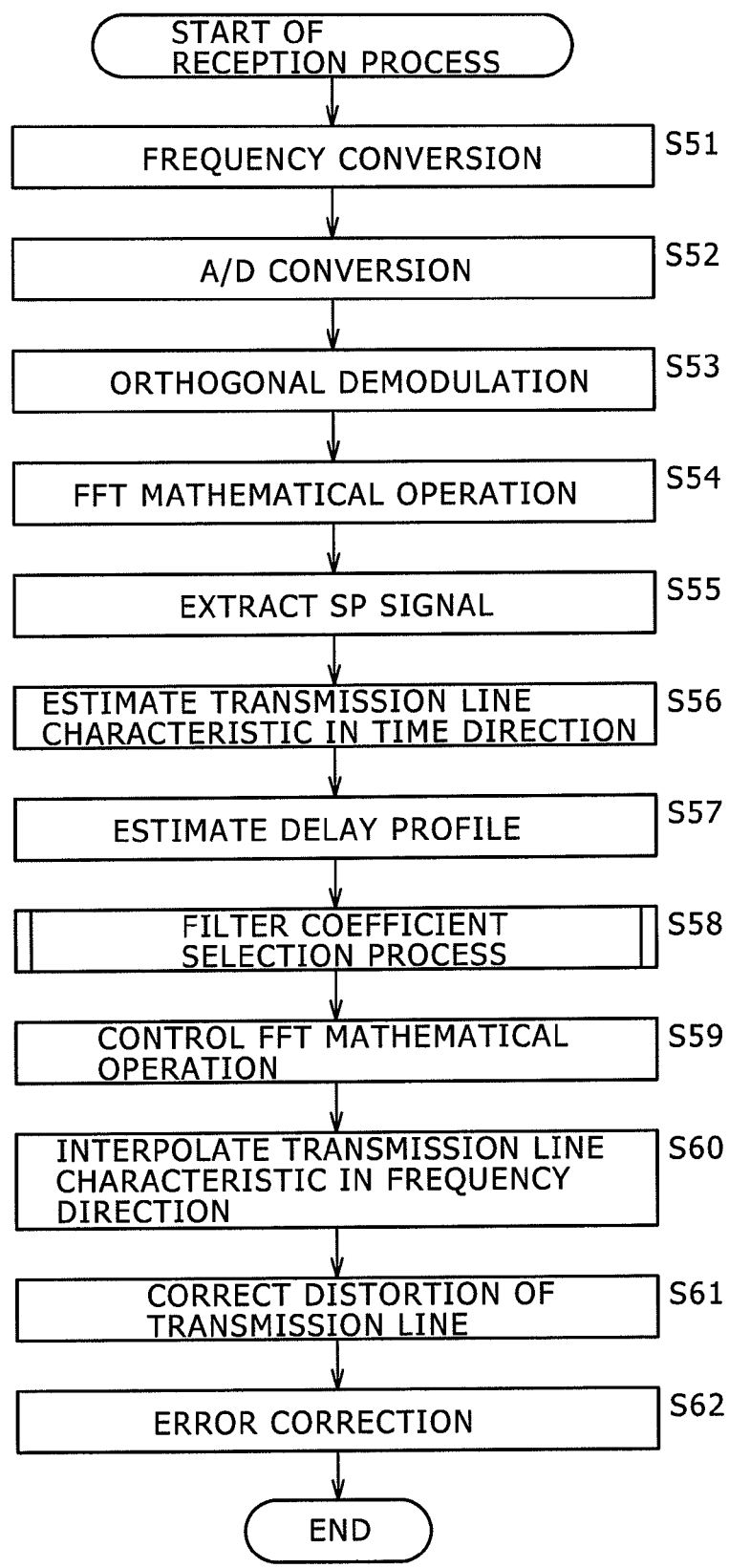
FIG. 25 is a flow chart illustrating a reception process of the OFDM receiver of FIG. 19.
Figure 26:
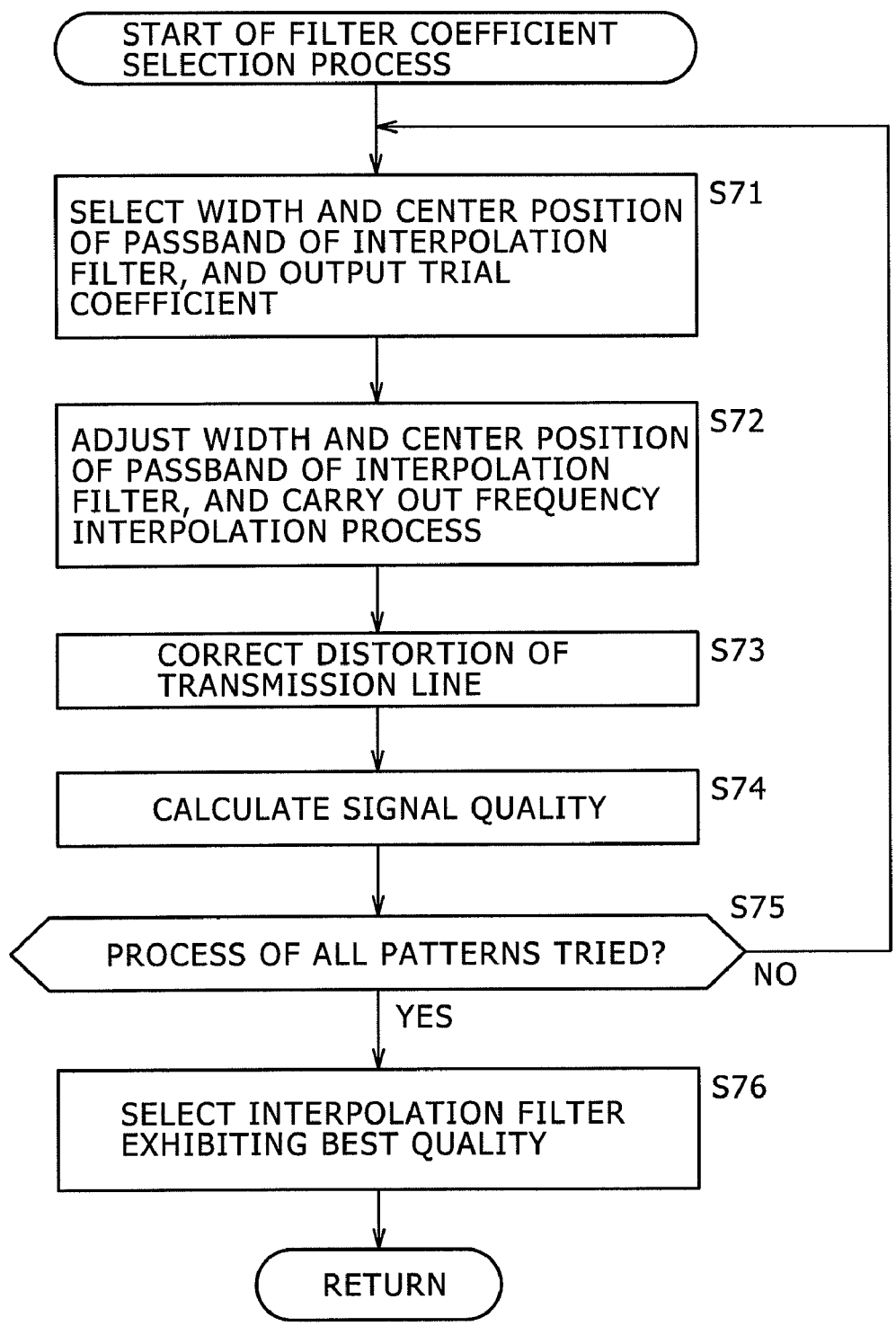
FIG. 26 is a flow chart illustrating a filter coefficient selection process carried out at step S58 of FIG. 25.

Now, the filter correction selection process carries out at step S58 of FIG. 25 is described with reference to FIG. 26.

This process is started when OFDM frequency domain signals of one symbol are read out from the memory 52 of FIG. 24 and time direction characteristic estimation data for one symbol are read out from the memory 53. The OFDM frequency domain signals read out from the memory 52 and the time direction characteristic estimation data read out from the memory 53 are signals and data regarding the same symbol.

At step S71, the controller 51 selects the width and the center position of an interpolation filter and outputs a trial coefficient representative of the selected width and center position.

At step S72, the frequency interpolation circuit 54 carries out a frequency interpolation process using the interpolation filter wherein the width and the center position of the passband are adjusted in accordance with the trial coefficient.

At step S73, the transmission line distortion correction circuit 55 corrects the distortion of the transmission line included in the OFDM frequency domain signal based on the transmission line characteristic determined by the frequency interpolation process.

At step S74, the signal quality calculation circuit 56 calculates the quality of the OFDM frequency domain signal whose distortion is corrected. The quality calculated by the signal quality calculation circuit 56 is stored by the optimum value selection circuit 57.

At step S75, the signal quality calculation circuit 56 decides whether or not the frequency interpolation process for all patterns is carried out by the trial changing the width and the center position of the passband of the interpolation filter in the symbol of the object. If it is decided at step S75 that the frequency interval process for all patterns is not carried out by the trial as yet, then the processing returns to step S71, at which the sequence of processes described above is repeated changing at least one of the width and the center position of the passband.

On the other hand, if it is decided at step S75 that the frequency interpolation process for all patterns is carried out by the trial, then the optimum value selection circuit 57 selects an optimum filter based on the results of the trial for all patterns at step S76. The optimum value selection circuit 57 outputs a coefficient representative of the width and the center position of the passband of the optimum filter.

Thereafter, the processing returns to step S58 of FIG. 25 to carry out the processes at the steps beginning with step S58.

By the process described above, the frequency interpolation circuit 32 can carry out a frequency interpolation process using an interpolation filter wherein the width and the center position of a passband with which an OFDM frequency domain signal after distortion compensation which has the best quality can be obtained finally. Thus, the frequency interpolation process is carried out using such an interpolation filter which includes all paths in the passband thereof but includes white noise as little as possible as illustrated in FIG. 18B.

Where the passband of an optimum filter is determined by the sequence process described hereinabove with reference to FIG. 9, a sufficient number of times of integration are required in order to obtain a correct solution. This is because, also in a fixed reception environment, the reception situation in regard to white noise and so forth varies finely and, if a frequency interpolation process, a distortion correction process and so forth are carried out for data of different symbols and the signal qualities of results of the trial are compared with each other, then an inversion phenomenon may possibly occur. The inversion phenomenon is a phenomenon that, although an interpolation filter can provide a signal of higher quality than that of the other interpolation filters, it can provide a signal of lower quality than that of the other interpolation filters because of an influence of the reception situation.

Accordingly, by selecting the width and the center position of the passband of an interpolation filter in such a manner as described above, the time before a correct solution is obtained can be reduced in comparison with the alternative case wherein the sequence process of FIG. 9 is carried out.

Further, the synchronization time can be reduced, and even where the OFDM receiver 103 is a mobile body and the reception environment is a time-varying environment, a sufficient follow-up performance with respect to the variation of the environment can be provided.

Furthermore, since the qualities of signals obtained by carrying out a process for the same symbol in a plurality of conditions are compared, even where the reception situation varies with respect to time, the comparison result can be stabilized without being influenced by the variation of the reception situation.

<Modification 1>

Figure 27:
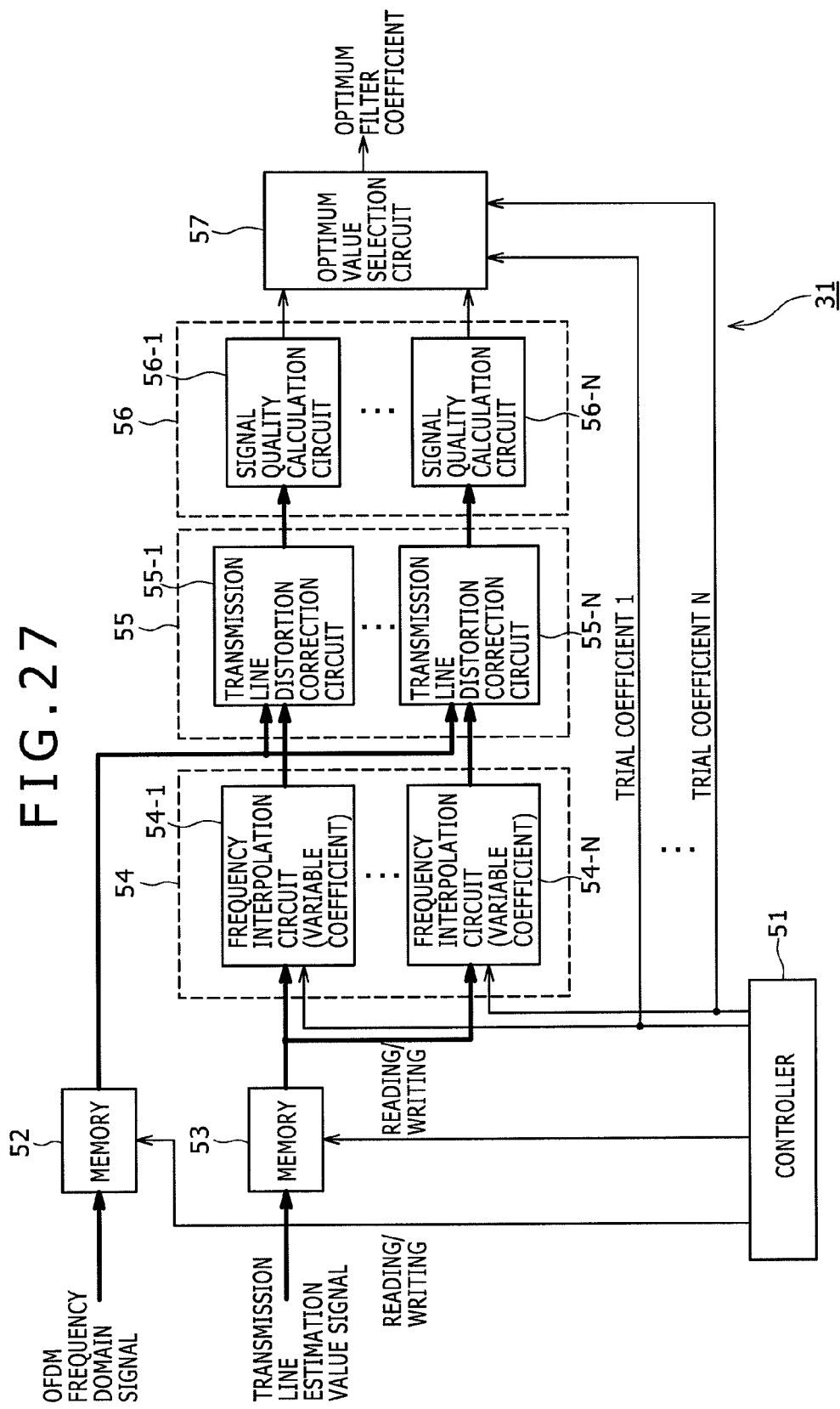
FIG. 27 is a block diagram showing another example of a configuration of the optimum filter coefficient selection circuit shown in FIG. 19.

FIG. 27 is a block diagram showing a modified form of the optimum filter coefficient selection circuit 31.

Referring to FIG. 27, the modified optimum filter coefficient selection circuit 31 shown includes same components as those of the optimum filter coefficient selection circuit 31 shown in FIG. 24.

However, the frequency interpolation circuit 54 includes frequency interpolation circuits 54-1 to 54-N, and the transmission line distortion correction circuit 55 includes transmission line distortion correction circuits 55-1 to 55-N. Further, the signal quality calculation circuit 56 includes signal quality calculation circuits 56-1 to 56-N.

The controller 51 outputs trial coefficients 1 to N each representative of the width and the center position of the passband of the interpolation filter to the frequency interpolation circuits 54-1 to 54-N and the optimum value selection circuit 57. The trial coefficients 1 to N represent different characteristics of the interpolation filter.

Each of the frequency interpolation circuits 54-1 to 54-N uses an interpolation filter wherein the width and the center position of the passband are adjusted in accordance with a corresponding trial coefficient supplied thereto from the controller 51 to carry out a frequency interpolation process. Frequency interpolation processes in different conditions are carried out concurrently by the frequency interpolation circuits 54-1 to 54-N.

The frequency interpolation circuits 54-1 to 54-N output the transmission line characteristics of all subcarriers obtained by the respective frequency interpolation processes to the transmission line distortion correction circuits 55-1 to 55-N, respectively.

The transmission line distortion correction circuits 55-1 to 55-N use the transmission line characteristics supplied from the frequency interpolation circuits 54-1 to 54-N, respectively, to correct the distortion of the transmission line included in the OFDM frequency domain signals of the one symbol read out from the memory 52. The transmission line distortion correction circuits 55-1 to 55-N output the OFDM frequency domain signals after the distortion correction to the signal quality calculation circuits 56-1 to 56-N, respectively.

The signal quality calculation circuits 56-1 to 56-N calculate the quality of the OFDM frequency domain signals of the one symbol every time such OFDM frequency domain signals are supplied thereto from the transmission line distortion correction circuits 55-1 to 55-N, respectively, and output the calculated qualities to the optimum value selection circuit 57.

The optimum value selection circuit 57 stores the qualities calculated by the signal quality calculation circuits 56-1 to 56-N. The optimum value selection circuit 57 selects an optimum filter based on the trial results of all patterns and outputs a coefficient representative of the width and the center of the passband of the optimum filter to the frequency interpolation circuit 32.

Since the frequency interpolation process, the process of correcting the distortion of a transmission line and the process of calculating the signal quality are carried out concurrently in different conditions, the time required to output a coefficient to the frequency interpolation circuit 32 can be reduced.

The optimum filter coefficient selection circuit 31 may be configured not such that each of the frequency interpolation circuit 54, transmission line distortion correction circuit 55 and signal quality calculation circuit 56 is composed of a plurality of circuits as seen in FIG. 27 but such that merely the frequency interpolation circuit 54 is composed of a plurality of circuits while each of the transmission line distortion correction circuit 55 and the signal quality calculation circuit 56 is composed of a single circuit.

<Modification 2>

Figure 28:
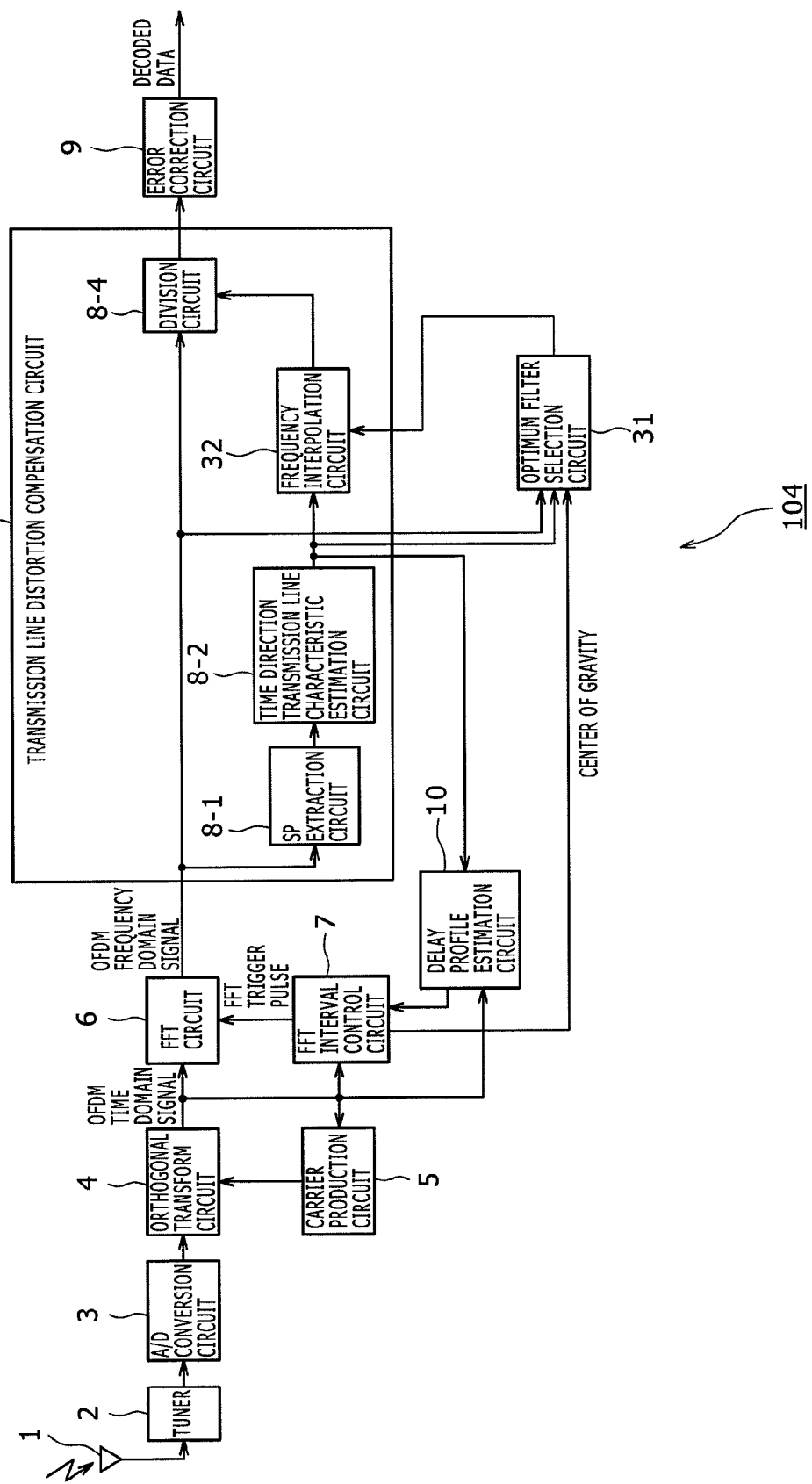
FIG. 28 is a block diagram showing an example of a configuration of a modified form of the OFDM receiver of FIG. 19.

FIG. 28 is a block diagram showing an example of a configuration of a modified OFDM receiver 104.

Referring to FIG. 28, the modified OFDM receiver 104 shown is composed of the same components as those of the OFDM receiver 104 shown in FIG. 19.

The modified OFDM receiver 104 of FIG. 28 is different from the OFDM receiver 104 of FIG. 19 in that information of the position of the center of gravity is supplied from the FFT interval control circuit 7 to the optimum filter coefficient selection circuit 31.

The FFT interval control circuit 7 determines an FFT interval based on a delay profile estimated by the delay profile estimation circuit 10 and outputs an FFT trigger pulse. Further, the FFT interval control circuit 7 outputs information of the position of the center of gravity determined, for example, based on the following expression (1):

$$\text{position of center of gravity} = \Sigma(\text{path power} \times \text{path arriving time})/\Sigma(\text{path power}) \qquad (1)$$

to the optimum filter coefficient selection circuit 31. The arriving time and the power of each path are represented by the delay profile estimated by the delay profile estimation circuit 10.

It is to be noted that the delay profile may otherwise be determined based on a correlation of the interval of the guard interval to the other intervals making use of the fact that, when attention is paid to a certain one symbol, the interval of the guard interval and the interval of the copy source have the same signal. Also the determination method of the position of the center of gravity may be changed suitably.

The optimum filter coefficient selection circuit 31 carries out a frequency interpolation process changing the width and the center position of the passband of the interpolation filter. Thereupon, the optimum filter coefficient selection circuit 31 changes the center position of the passband merely by a range determined with respect to the center provided by the position of the center of gravity determined by the FFT interval control circuit 7 to carry out the process.

FIG. 29 shows an example of a configuration of the optimum filter coefficient selection circuit 31 shown in FIG. 28.

The optimum filter coefficient selection circuit 31 of FIG. 29 is composed of same components as those of the optimum filter coefficient selection circuit 31 of FIG. 24 but is different from the optimum filter coefficient selection circuit 31 of FIG. 24 in that the information of the position of the center of gravity outputted from the FFT interval control circuit 7 is inputted to the controller 51.

The controller 51 controls reading out from and writing into the memories 52 and 53 and outputs a trial coefficient representative of the width and the center position of the passband of the interpolation filter to the frequency interpolation circuit 54 and the optimum value selection circuit 57.

Figure 30A:
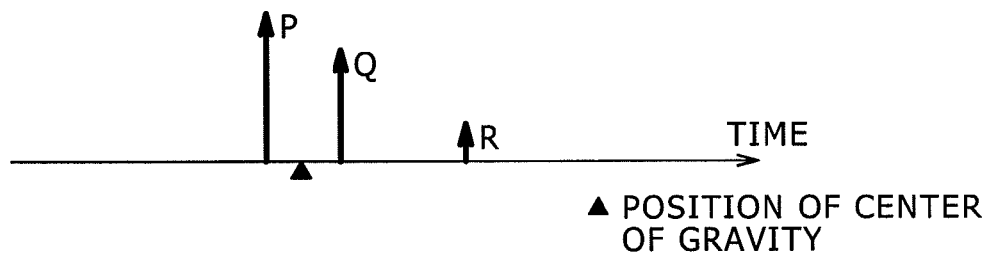
FIGS. 30A and 30B are diagrammatic views illustrating an example of a variation range of the center position of a passband of an interpolation filter shown in FIG. 28.
Figure 30B:
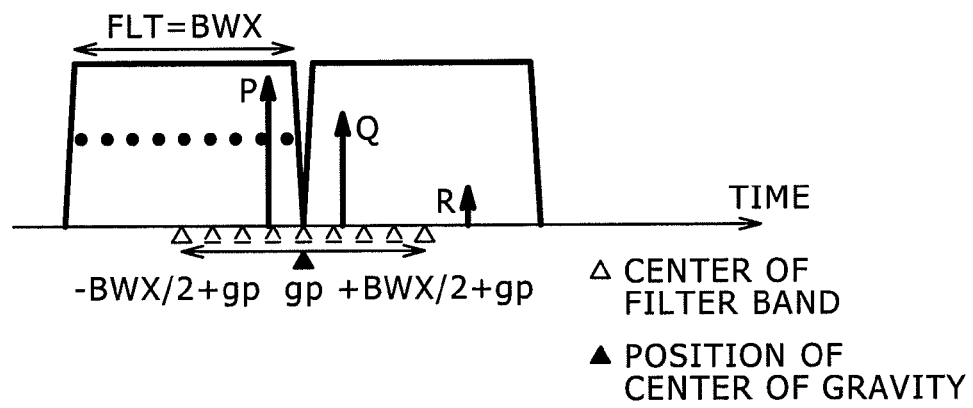

FIGS. 30A and 30B illustrate an example of the range of variation of the center position of the passband of an interpolation filter.

FIG. 30A illustrates that three paths P, Q and R exist, and an upwardly directed solid triangle represents a position determined as the position of the center of gravity.

In this instance, where the position of the center of gravity is represented by gp and the width of the passband of the interpolation filter is represented by BWX, the optimum filter coefficient selection circuit 31 changes the center position of the passband of the interpolation filter within the range of −BWX/2+gp to +BWX/2+gp as seen in FIG. 30B to carry out a frequency interpolation process.

By limiting the variation range of the center position of the passband of the interpolation filter in this manner, the number of times of trial to be carried out can be reduced in comparison with that in an alternative case wherein a frequency interpolation process is carried out changing the center position without a limit.

While it is described above that the position of the center of gravity is used as the reference for the variation range, any position may be used as the reference merely if it is included in a range from the position of a path along which a signal comes earliest to the position of another path along which the signal comes latest.

For example, the variation range may be set to a range which is centered at the position of the center between the position of a path along which a signal comes earliest and the position of another path along which the signal comes latest, determined based on the delay profile, and is extended by BWX/2 to the preceding and succeeding sides.

<Modification 3>

Figure 31:
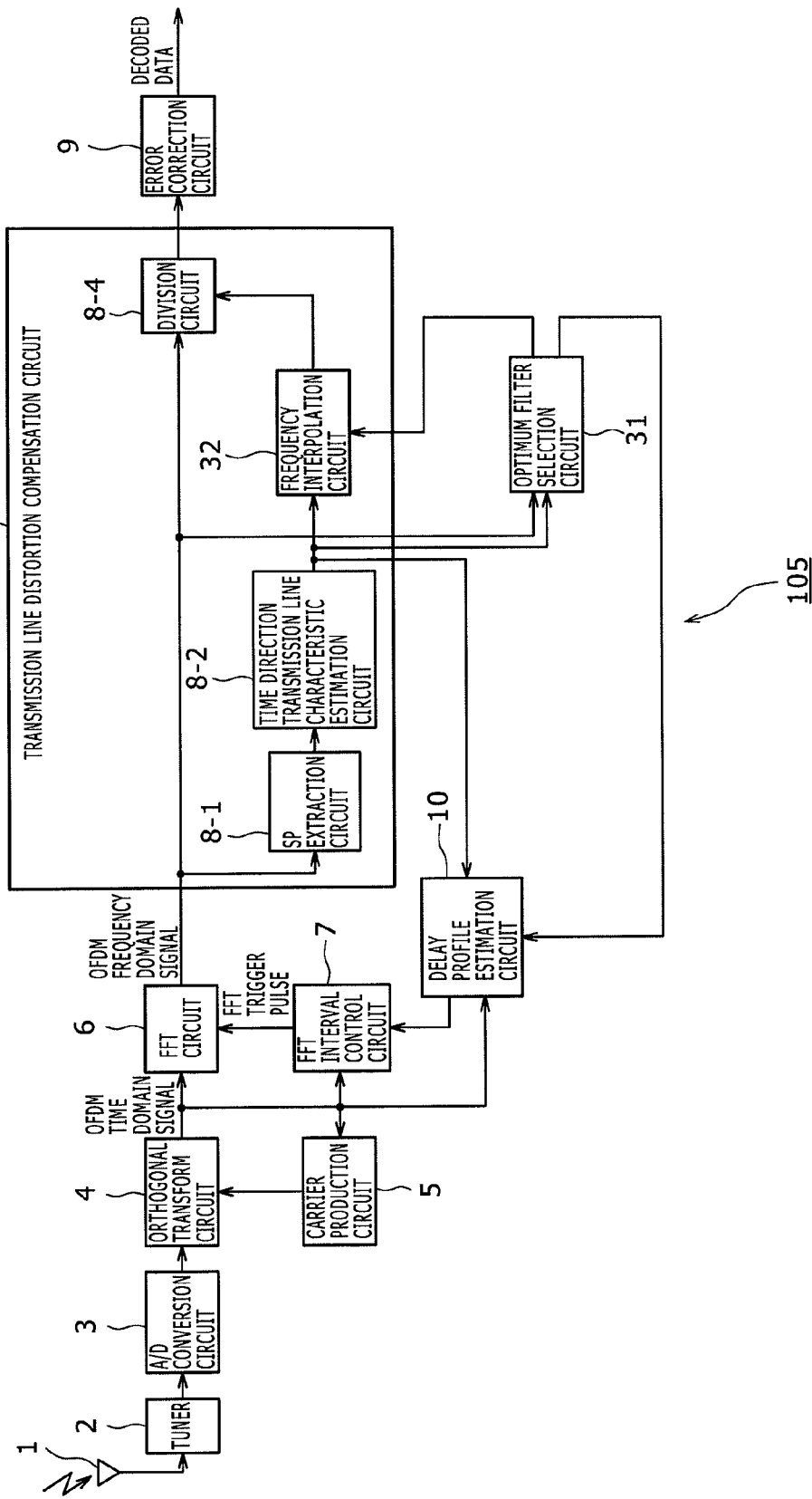
FIG. 31 is a block diagram showing an example of a configuration of another modified form of the OFDM receiver of FIG. 19.

FIG. 31 shows an example of a configuration of an OFDM receiver 105.

Referring to FIG. 31, the OFDM receiver 105 is a modification to but is different from the OFDM receiver 103 shown in FIG. 19 in that information of the center position of the passband of an optimum filter is fed back from the optimum filter coefficient selection circuit 31 to the delay profile estimation circuit 10.

Further, in the interpolation filter to be used by the frequency interpolation circuit 32, the width of the passband is fixed to Tu/3 [seconds] and merely the center position of the passband is variable. Also in the interpolation filter for trial to be used in a frequency interpolation process by the optimum filter coefficient selection circuit 31, the width of the passband is fixed to Tu/3 [seconds] and merely the center position of the passband is variable.

FIG. 32 shows an example of a configuration of the optimum filter coefficient selection circuit 31 shown in FIG. 31.

Referring to FIG. 31, the optimum filter coefficient selection circuit 31 shown is a modification to but is different from the optimum filter coefficient selection circuit 31 described hereinabove with reference to FIG. 24 in that the frequency interpolation circuit 54 adjusts the center position of the passband of the interpolation filter which has the passband of a width equal to Tu/3 [seconds] in accordance with a trial coefficient supplied from the controller 51 and carries out a frequency interpolation process.

Further, the optimum value selection circuit 57 selects an optimum filter based on trial results for all patterns and outputs a coefficient representative of the center position of the passband of the optimum filter to the frequency interpolation circuit 32.

Further, the optimum value selection circuit 57 outputs information representative of the center position of the passband of the optimum filter. The information outputted from the optimum value selection circuit 57 is inputted to the delay profile estimation circuit 10.

The delay profile estimation circuit 10 shown in FIG. 31 estimates a delay profile based on time direction characteristic estimation data supplied from the time direction transmission line characteristic estimation circuit 8-2 and the information supplied thereto from the optimum filter coefficient selection circuit 31 and representative of the center position of the passband of the optimum filter.

FIGS. 33A to 33D illustrate estimation of a delay profile.

Figure 33A:
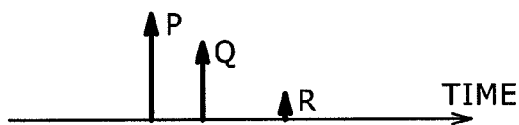
FIGS. 33A to 33D are diagrammatic views illustrating estimation of a delay profile.

Also FIG. 33A illustrates that three paths P, Q and R exist.

Figure 33B:
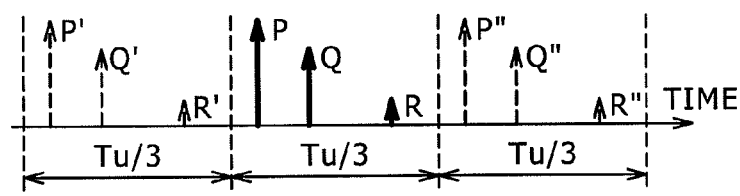

The delay profile estimation circuit 10 applies IFFT to time direction characteristic estimation data to determine a delay profile. From a characteristic of the IFFT, reflection of paths appears for every Tu/3 which is a reciprocal number to the distance (refer to FIG. 2) between SP signals as seen in FIG. 33B.

Although a configuration of desired paths extracted from entire paths including paths of reflection components is a delay profile, if merely a result of the IFFT is checked, then the delay profile estimation circuit 10 may not decide whether or not the path R' positioned preceding to the path P is a path of a reflection component or an actual path.

Therefore, a countermeasure for deciding whether or not each path is a path of a reflection component is required, and the center position of the passband of the optimum filter is used for the decision.

As described hereinabove, if all paths are not included in the passband of the interpolation filter, then the OFDM frequency domain signal after distortion compensation does not have desirable quality.

Also where a path of a reflection component which does not actually exist is included in the passband of the interpolation filter, the OFDM frequency domain signal does not have desirable quality.

In other words, selection of an optimum filter results in selection of an interpolation filter which does not include any path of a reflection component in the passband thereof. It is considered that all of actually existing paths are included but a path of a reflection component is not included in the passband of an optimum filter.

This is utilized by the delay profile estimation circuit 10 to estimate a delay profile.

Figure 33C:
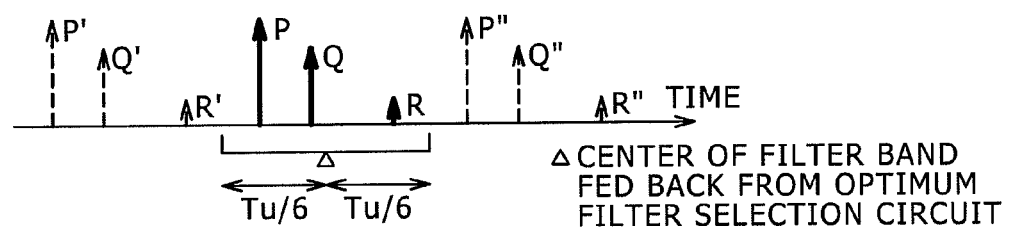
Figure 33D:
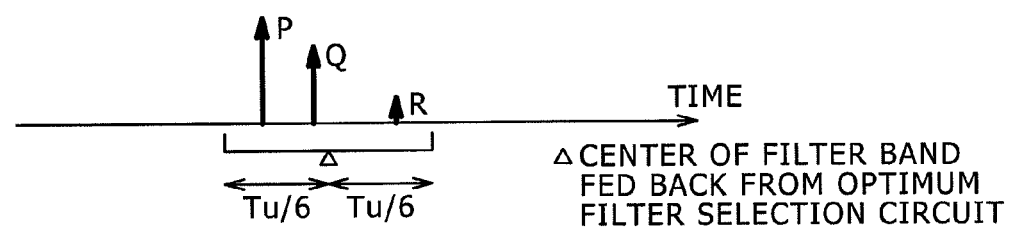

In particular, the delay profile estimation circuit 10 deletes paths other than those paths which are within the range from −Tu/6 to +Tu/6 around the position same as the center position of the passband of the optimum filter as seen in FIG. 33C and thereby extracts such desired paths as seen in FIG. 33D.

The configuration of the paths of FIG. 33D is same as that of the actual paths illustrated in FIG. 33A.

By using the center position of the passband of an optimum filter in this manner, such wrong recognition of the time relationship of paths that it is decided that, although a signal actually comes earliest along a path, another path along which the signal comes earlier exists can be prevented. Where the time relationship of paths is recognized correctly, the accuracy of a result of estimation of a delay profile can be enhanced.

While the series of processes described above can be executed by hardware, it may otherwise be executed by software. Where the series of processes is executed by software, a program which constructs the software is installed from a program recording medium into a computer incorporated in hardware for exclusive use or a personal computer, for example, for universal use which can execute various functions by installing various programs.

FIG. 34 shows an example of a configuration of hardware of a computer which executes the series of processes described hereinabove in accordance with a program.

Referring to FIG. 34, the computer shown includes a central processing unit (CPU) 71, a read only memory (ROM) 72 and a random access memory (RAM) 73 connected to each other by a bus 74.

Further, an input/output interface 75 is connected to the bus 74. An inputting section 76 including a keyboard, a mouse, a microphone and so forth, an outputting section 77 including a display unit, a speaker and so forth, a storage section 78 formed from a hard disk drive, a nonvolatile memory or the like, a communication section 79 formed from a network interface or the like, and a drive 80 for driving a removable medium 81 such as an optical disk or a semiconductor memory are connected to the input/output interface 75.

In the computer configured in such a manner as described above, the CPU 71 loads a program, for example, stored in the storage section 78 into the RAM 73 through the input/output interfaced 75 and the bus 74 and executes the program to carry out the series of processes described above.

The program for being executed by the CPU 71 is provided in a state wherein it is recorded in the recording medium 81 or is provided through a wire or wireless transmission medium such as a local area network, the Internet or a digital broadcast, and is installed into the hard disk drive built in the storage section 78.

It is to be noted that the program to be executed by the computer may be executed in a time series in accordance with the order as disclosed in the present application or may be executed in parallel or at a necessary timing such as when it is called.

While preferred embodiment of the present invention have been described using specific terms, such description is for illustrative purpose, and it is to be understood that changes and variations may be made without departing from the spirit or scope of the following claims.

The present application contains subject matter related to that disclosed in Japanese Priority Patent Application JP 2008-247909 filed in the Japan Patent Office on Sep. 26, 2008 and Japanese Priority Patent Application JP 2008-049890 filed in the Japan Patent Office on Feb. 29, 2008, the entire contents of which is hereby incorporated by reference.

It should be understood by those skilled in the art that various modifications, combinations, sub-combinations and alterations may occur depending on design requirements and other factor in so far as they are within the scope of the appended claims or the equivalents thereof.

What is claimed is:

1. A reception apparatus, comprising:
   extraction means for extracting a pilot signal from an orthogonal frequency division multiplexing (OFDM) frequency domain signal;
   transmission line characteristic estimation means for estimating a transmission line characteristic in a time direction based on the pilot signal extracted by said extraction means;
   interpolation means for carrying out an interpolation process of interpolating a transmission line characteristic in a frequency direction based on the transmission line characteristic in the time direction estimated by said transmission line characteristic estimation means using a plurality of interpolation filters having different filter bands from each other to produce a plurality of signals representative of transmission line characteristics of all subcarriers;
   compensation means for producing a plurality of transmission line distortion compensated signals, from which components of distortion of the corresponding transmission lines are removed, based on the orthogonal frequency division multiplexing (OFDM) frequency domain signal and the signals representative of the transmission line characteristics of all subcarriers produced by said interpolation means;
   detection means for detecting the quality of the transmission line distortion compensated signals produced by said compensation means; and
   selection means for selecting one of the transmission line distortion compensated signals produced by said compensation means based on a result of the detection by said detection means.

2. The reception apparatus according to claim 1, wherein said selection means selects that one of the transmission line distortion compensated signals produced by said compensation means which has the best quality.

3. The reception apparatus according to claim 1, wherein said interpolation means includes
   first interpolation means for carrying out the interpolation process using an interpolation filter of a first filter band; and
   second interpolation means for carrying out the interpolation process using an interpolation filter of a second filter band; and
   said compensation means includes
   first compensation means for producing a transmission line distortion compensated signal based on the orthogonal frequency division multiplexing (OFDM) frequency domain signal and a signal produced by said first interpolation means; and
   second compensation means for producing a transmission line distortion compensated signal based on the orthogonal frequency division multiplexing (OFDM) frequency domain signal and a signal produced by said second interpolation means.

4. The reception apparatus according to claim 1, further comprising control means for controlling the filter band of the interpolation filter to be used by said interpolation means so as to change the filter band of the interpolation filters used by said interpolation means for production of signals representative of the transmission line characteristics of all subcarriers based on which the transmission line distortion compensated signals which are not selected by said selection means are produced.

5. A reception method, comprising the steps of:
- extracting a pilot signal from an orthogonal frequency division multiplexing (OFDM) frequency domain signal;
- estimating a transmission line characteristic in a time direction based on the extracted pilot signal;
- carrying out an interpolation process of interpolating a transmission line characteristic in a frequency direction based on the estimated transmission line characteristic in the time direction using a plurality of interpolation filters having different filter bands from each other to produce a plurality of signals representative of transmission line characteristics of all subcarriers;
- producing a plurality of transmission line distortion compensated signals, from which components of distortion of the corresponding transmission lines are removed, based on the orthogonal frequency division multiplexing (OFDM) frequency domain signal and the produced signals representative of the transmission line characteristics of all subcarriers;
- detecting the quality of the produced transmission line distortion compensated signals; and
- selecting one of the transmission line distortion compensated signals based on a result of the detection of the quality of the transmission line distortion compensated signals.

6. A program for causing a computer to execute a process comprising the steps of:
- extracting a pilot signal from an orthogonal frequency division multiplexing (OFDM) frequency domain signal;
- estimating a transmission line characteristic in a time direction based on the extracted pilot signal;
- carrying out an interpolation process of interpolating a transmission line characteristic in a frequency direction based on the estimated transmission line characteristic in the time direction using a plurality of interpolation filters having different filter bands from each other to produce a plurality of signals representative of transmission line characteristics of all subcarriers;
- producing a plurality of transmission line distortion compensated signals, from which components of distortion of the corresponding transmission lines are removed, based on the orthogonal frequency division multiplexing (OFDM) frequency domain signal and the produced signals representative of the transmission line characteristics of all subcarriers;
- detecting the quality of the produced transmission line distortion compensated signals; and
- selecting one of the transmission line distortion compensated signals based on a result of the detection of the quality of the transmission line distortion compensated signals.

7. A reception apparatus, comprising:
- fast fourier transform (FFT) mathematical operation means for carrying out fast fourier transform (FFT) mathematical operation for an orthogonal frequency division multiplexing (OFDM) time domain signal;
- pilot signal extraction means for extracting pilot signals from an orthogonal frequency division multiplexing (OFDM) frequency domain signal obtained by carrying out the fast fourier transform (FFT) mathematical operation by said fast fourier transform (FFT) mathematical operation means;
- estimation means for estimating a characteristic of a transmission line corresponding to each of the pilot signals and interpolating the characteristic of the transmission line in a time direction to determine transmission line characteristics for every predetermined subcarriers;
- control means for controlling the width and the center position of the passband of an interpolation filter to be used for a frequency interpolation process of filtering the transmission line characteristics for every predetermined subcarriers to interpolate the transmission line characteristics in a frequency direction;
- interpolation means for carrying out a process of carrying out the frequency interpolation process using the interpolation filter to determine transmission line characteristics of all subcarriers while varying the width and the center position of the passband of the interpolation filter under the control of said control means with regard to the transmission line characteristics for every predetermined subcarriers determined from the orthogonal frequency division multiplexing (OFDM) frequency domain signals representative of the same symbol;
- distortion correction means for correcting distortion of the orthogonal frequency division multiplexing (OFDM) frequency domain signals representative of the same symbol using the transmission line characteristics of all subcarriers determined by said interpolation means;
- calculation means for calculating the quality of the orthogonal frequency division multiplexing (OFDM) frequency domain signals whose distortion is corrected;
- selection means for selecting, based on the qualities calculated by said calculation means, an interpolation filter which is used to obtain that one of the orthogonal frequency division multiplexing (OFDM) frequency domain signals after the distortion correction which exhibits the best quality;
- variable coefficient interpolation means for carrying out the frequency interpolation process for the transmission line characteristics for every predetermined subcarriers determined by said estimation means using an interpolation filter having the same characteristic as that of the interpolation filter selected by said selection means with regard to the width and the center position of the passband to determine the transmission line characteristics of all subcarriers; and
- equalization means for correcting distortion of the orthogonal frequency division multiplexing (OFDM) frequency domain signals using the transmission line characteristics of all subcarriers determined by said variable coefficient interpolation means to carry out equalization.

8. The reception apparatus according to claim 7, wherein said interpolation means carries out the frequency interpolation processes concurrently using interpolation filters which are different in the width and the center position of the passband from each other.

9. The reception apparatus according to claim 7, wherein said control means changes the center position of the passband of the interpolation filter within a range which is centered at a predetermined position between a path along which a signal arrives earliest and another path along which the signal arrives latest from among paths which form a delay profile and extends by an amount equal to one half a width of the passband of the interpolation filter in the opposite directions from the center.

10. A reception method, comprising the steps of:
- carrying out fast fourier transform (FFT) mathematical operation for an orthogonal frequency division multiplexing (OFDM) time domain signal;
- extracting pilot signals from an orthogonal frequency division multiplexing (OFDM) frequency domain signal obtained by carrying out the fast fourier transform (FFT) mathematical operation;

estimating a characteristic of a transmission line corresponding to each of the pilot signals and interpolating the characteristic of the transmission line in a time direction to determine transmission line characteristics for every predetermined subcarriers;

controlling the width and the center position of the passband of an interpolation filter to be used for a frequency interpolation process of filtering the transmission line characteristics for every predetermined subcarriers to interpolate the transmission line characteristics in a frequency direction;

carrying out a process of carrying out the frequency interpolation process using the interpolation filter to determine transmission line characteristics of all subcarriers while varying the width and the center position of the passband of the interpolation filter with regard to the transmission line characteristics for every predetermined subcarriers determined from the orthogonal frequency division multiplexing (OFDM) frequency domain signals representative of the same symbol;

correcting distortion of the orthogonal frequency division multiplexing (OFDM) frequency domain signals representative of the same symbol using the transmission line characteristics of all subcarriers;

calculating the quality of the orthogonal frequency division multiplexing (OFDM) frequency domain signals whose distortion is corrected;

selecting, based on the calculated qualities, an interpolation filter used to obtain that one of the orthogonal frequency division multiplexing (OFDM) frequency domain signals after the distortion correction which exhibits the best quality;

carrying out the frequency interpolation process for the transmission line characteristics for every predetermined subcarriers using an interpolation filter having the same characteristic as that of the selected interpolation filter with regard to the width and the center position of the passband to determine the transmission line characteristics of all subcarriers; and correcting distortion of the orthogonal frequency division multiplexing (OFDM) frequency domain signals using the determined transmission line characteristics of all subcarriers to carry out equalization.

11. A program for causing a computer to execute a process comprising the steps of:

carrying out fast fourier transform (FFT) mathematical operation for an orthogonal frequency division multiplexing (OFDM) time domain signal;

extracting pilot signals from an orthogonal frequency division multiplexing (OFDM) frequency domain signal obtained by carrying out the fast fourier transform (FFT) mathematical operation;

estimating a characteristic of a transmission line corresponding to each of the pilot signals and interpolating the characteristic of the transmission line in a time direction to determine transmission line characteristics for every predetermined subcarriers;

controlling the width and the center position of the passband of an interpolation filter to be used for a frequency interpolation process of filtering the transmission line characteristics for every predetermined subcarriers to interpolate the transmission line characteristics in a frequency direction;

carrying out a process of carrying out the frequency interpolation process using the interpolation filter to determine transmission line characteristics of all subcarriers while varying the width and the center position of the passband of the interpolation filter with regard to the transmission line characteristics for every predetermined subcarriers determined from the orthogonal frequency division multiplexing (OFDM) frequency domain signals representative of the same symbol;

correcting distortion of the orthogonal frequency division multiplexing (OFDM) frequency domain signals representative of the same symbol using the transmission line characteristics of all subcarriers;

calculating the quality of the orthogonal frequency division multiplexing (OFDM) frequency domain signals whose distortion is corrected;

selecting, based on the calculated qualities, an interpolation filter used to obtain that one of the orthogonal frequency division multiplexing (OFDM) frequency domain signals after the distortion correction which exhibits the best quality;

carrying out the frequency interpolation process for the transmission line characteristics for every predetermined subcarriers using an interpolation filter having the same characteristic as that of the selected interpolation filter with regard to the width and the center position of the passband to determine the transmission line characteristics of all subcarriers; and correcting distortion of the orthogonal frequency division multiplexing (OFDM) frequency domain signals using the determined transmission line characteristics of all subcarriers to carry out equalization.

12. A reception apparatus, comprising:

fast fourier transform (FFT) mathematical operation means for carrying out fast fourier transform (FFT) mathematical operation for an orthogonal frequency division multiplexing (OFDM) time domain signal;

pilot signal extraction means for extracting pilot signals from the orthogonal frequency division multiplexing (OFDM) frequency domain signal obtained by the fast fourier transform (FFT) mathematical operation carried out by said fast fourier transform (FFT) mathematical operation means;

estimation means for estimating a characteristic of a transmission line corresponding to each of the pilot signals to interpolate the characteristic to determine transmission line characteristics for every predetermined subcarriers;

control means for controlling the center position of the passband of an interpolation filter to be used for a frequency interpolation process of filtering the transmission line characteristics for every predetermined subcarriers to interpolate the transmission line characteristics in a frequency direction;

interpolation means for carrying out a process of carrying out the frequency interpolation process using the interpolation filter to determine transmission line characteristics of all subcarriers while varying the center position of the passband of the interpolation filter under the control of said control means with regard to the transmission line characteristics for every predetermined subcarriers determined from the orthogonal frequency division multiplexing (OFDM) frequency domain signals representative of the same symbol;

distortion correction means for correcting distortion of the orthogonal frequency division multiplexing (OFDM) frequency domain signals representative of the same symbol using the transmission line characteristics of all subcarriers determined by said interpolation means;

calculation means for calculating the quality of the orthogonal frequency division multiplexing (OFDM) frequency domain signals whose distortion is corrected;

selection means for selecting, based on the qualities calculated by said calculation means, an interpolation filter which is used to obtain that one of the orthogonal frequency division multiplexing (OFDM) frequency domain signals after the distortion correction which exhibits the best quality; and delay profile estimation means for determining a delay profile formed from paths included in a predetermined frequency band centered at a position same as the center position of the passband of the interpolation filter selected by said selection means from among paths in a frequency region obtained by applying inverse fast fourier transform (IFFT) to data representing the transmission line characteristics for every predetermined subcarriers estimated by said estimation means.

13. The reception apparatus according to claim 12, wherein the width of the predetermined frequency band is equal to the width of the passband of the interpolation filter.

14. A reception method, comprising the steps of:
carrying out fast fourier transform (FFT) mathematical operation for an orthogonal frequency division multiplexing (OFDM) time domain signal;
extracting pilot signals from the orthogonal frequency division multiplexing (OFDM) frequency domain signal obtained by carrying out the fast fourier transform (FFT) mathematical operation;
estimating a characteristic of a transmission line corresponding to each of the pilot signals to interpolate the characteristic to determine transmission line characteristics for every predetermined subcarriers;
controlling the center position of the passband of an interpolation filter to be used for a frequency interpolation process of filtering the transmission line characteristics for every predetermined subcarriers to interpolate the transmission line characteristics in a frequency direction;
carrying out a process of carrying out the frequency interpolation process using the interpolation filter to determine transmission line characteristics of all subcarriers while varying the center position of the passband of the interpolation filter with regard to the transmission line characteristics for every predetermined subcarriers determined from the orthogonal frequency division multiplexing (OFDM) frequency domain signals representative of the same symbol;
correcting distortion of the orthogonal frequency division multiplexing (OFDM) frequency domain signals representative of the same symbol using the determined transmission line characteristics of all subcarriers;
calculating the quality of the orthogonal frequency division multiplexing (OFDM) frequency domain signals whose distortion is corrected;
selecting, based on the calculated qualities, an interpolation filter used to obtain that one of the orthogonal frequency division multiplexing (OFDM) frequency domain signals after the distortion correction which exhibits the best quality; and
determining a delay profile formed from paths included in a predetermined frequency band centered at a position same as the center position of the passband of the selected interpolation filter from among paths in a frequency region obtained by applying inverse fast fourier transform (IFFT) to data representing the estimated transmission line characteristics for every predetermined subcarriers.

15. A program for causing a computer to execute a process comprising the steps of:
carrying out fast fourier transform (FFT) mathematical operation for an orthogonal frequency division multiplexing (OFDM) time domain signal;
extracting pilot signals from the orthogonal frequency division multiplexing (OFDM) frequency domain signal obtained by carrying out the fast fourier transform (FFT) mathematical operation;
estimating a characteristic of a transmission line corresponding to each of the pilot signals and interpolating the characteristic of the transmission line in a time direction to determine transmission line characteristics for every predetermined subcarriers;
controlling the center position of the passband of an interpolation filter to be used for a frequency interpolation process of filtering the transmission line characteristics for every predetermined subcarriers to interpolate the transmission line characteristics in a frequency direction;
carrying out a process of carrying out the frequency interpolation process using the interpolation filter to determine transmission line characteristics of all subcarriers while varying the center position of the passband of the interpolation filter with regard to the transmission line characteristics for every predetermined subcarriers determined from the orthogonal frequency division multiplexing (OFDM) frequency domain signals representative of the same symbol;
correcting distortion of the orthogonal frequency division multiplexing (OFDM) frequency domain signals representative of the same symbol using the determined transmission line characteristics of all subcarriers;
calculating the quality of the orthogonal frequency division multiplexing (OFDM) frequency domain signals whose distortion is corrected;
selecting, based on the calculated qualities, an interpolation filter used to obtain that one of the orthogonal frequency division multiplexing (OFDM) frequency domain signals after the distortion correction which exhibits the best quality; and
determining a delay profile formed from paths included in a predetermined frequency band centered at a position same as the center position of the passband of the selected interpolation filter from among paths in a frequency region obtained by applying inverse fast fourier transform (IFFT) to data representing the estimated transmission line characteristics for every predetermined subcarriers.

16. A reception apparatus, comprising:
an extraction section configured to extract a pilot signal from an orthogonal frequency division multiplexing (OFDM) frequency domain signal;
a transmission line characteristic estimation section configured to estimate a transmission line characteristic in a time direction based on the pilot signal extracted by said extraction section;
an interpolation section configured to carry out an interpolation process of interpolating a transmission line characteristic in a frequency direction based on the transmission line characteristic in the time direction estimated by said transmission line characteristic estimation section using a plurality of interpolation filters having different filter bands from each other to produce a plurality of signals representative of transmission line characteristics of all subcarriers;

a compensation section configured to produce a plurality of transmission line distortion compensated signals, from which components of distortion of the corresponding transmission lines are removed, based on the orthogonal frequency division multiplexing (OFDM) frequency domain signal and the signals representative of the transmission line characteristics of all subcarriers produced by said interpolation section;

a detection section configured to detect the quality of the transmission line distortion compensated signals produced by said compensation section; and a selection section configured to select one of the transmission line distortion compensated signals produced by said compensation section based on a result of the detection by said detection section.

17. A reception apparatus, comprising:

a fast fourier transform (FFT) mathematical operation section configured to carry out fast fourier transform (FFT) mathematical operation for an orthogonal frequency division multiplexing (OFDM) time domain signal;

a pilot signal extraction section configured to extract pilot signals from an orthogonal frequency division multiplexing (OFDM) frequency domain signal obtained by carrying out the fast fourier transform (FFT) mathematical operation by said fast fourier transform (FFT) mathematical operation section;

an estimation section configured to estimate a characteristic of a transmission line corresponding to each of the pilot signals and interpolate the characteristic of the transmission line in a time direction to determine transmission line characteristics for every predetermined subcarriers;

a control section configured to control the width and the center position of the passband of an interpolation filter to be used for a frequency interpolation process of filtering the transmission line characteristics for every predetermined subcarriers to interpolate the transmission line characteristics in a frequency direction;

an interpolation section configured to carry out a process of carrying out the frequency interpolation process using the interpolation filter to determine transmission line characteristics of all subcarriers while varying the width and the center position of the passband of the interpolation filter under the control of said control section with regard to the transmission line characteristics for every predetermined subcarriers determined from the orthogonal frequency division multiplexing (OFDM) frequency domain signals representative of the same symbol;

a distortion correction section configured to correct distortion of the orthogonal frequency division multiplexing (OFDM) frequency domain signals representative of the same symbol using the transmission line characteristics of all subcarriers determined by said interpolation section;

a calculation section configured to calculate the quality of the orthogonal frequency division multiplexing (OFDM) frequency domain signals whose distortion is corrected;

a selection section configured to select, based on the qualities calculated by said calculation section, an interpolation filter which is used to obtain that one of the orthogonal frequency division multiplexing (OFDM) frequency domain signals after the distortion correction which exhibits the best quality;

a variable coefficient interpolation section configured to carry out the frequency interpolation process for the transmission line characteristics for every predetermined subcarriers determined by said estimation section using an interpolation filter having the same characteristic as that of the interpolation filter selected by said selection section with regard to the width and the center position of the passband to determine the transmission line characteristics of all subcarriers; and an equalization section configured to correct distortion of the orthogonal frequency division multiplexing (OFDM) frequency domain signals using the transmission line characteristics of all subcarriers determined by said variable coefficient interpolation section to carry out equalization.

18. A reception apparatus, comprising:

a fast fourier transform (FFT) mathematical operation section configured to carry out fast fourier transform (FFT) mathematical operation for an orthogonal frequency division multiplexing (OFDM) time domain signal;

a pilot signal extraction section configured to extract pilot signals from the orthogonal frequency division multiplexing (OFDM) frequency domain signal obtained by the fast fourier transform (FFT) mathematical operation carried out by said fast fourier transform (FFT) mathematical operation section;

an estimation section configured to estimate a characteristic of a transmission line corresponding to each of the pilot signals to interpolate the characteristic to determine transmission line characteristics for every predetermined subcarriers;

a control section configured to control the center position of the passband of an interpolation filter to be used for a frequency interpolation process of filtering the transmission line characteristics for every predetermined subcarriers to interpolate the transmission line characteristics in a frequency direction;

an interpolation section configured to carry out a process of carrying out the frequency interpolation process using the interpolation filter to determine transmission line characteristics of all subcarriers while varying the center position of the passband of the interpolation filter under the control of said control section with regard to the transmission line characteristics for every predetermined subcarriers determined from the orthogonal frequency division multiplexing (OFDM) frequency domain signals representative of the same symbol;

a distortion correction section configured to correct distortion of the orthogonal frequency division multiplexing (OFDM) frequency domain signals representative of the same symbol using the transmission line characteristics of all subcarriers determined by said interpolation section;

a calculation section configured to calculate the quality of the orthogonal frequency division multiplexing (OFDM) frequency domain signals whose distortion is corrected;

a selection section configured to select, based on the qualities calculated by said calculation section, an interpolation filter which is used to obtain that one of the orthogonal frequency division multiplexing (OFDM) frequency domain signals after the distortion correction which exhibits the best quality; and a delay profile estimation section configured to determine a delay profile formed from paths included in a predetermined frequency band centered at a position same as the center position of the passband of the interpolation filter selected by said selection section from among paths in a frequency region obtained by applying inverse fast fourier transform (IFFT) to data representing the transmission line characteristics for every predetermined subcarriers estimated by said estimation section.

* * * * *